(12) United States Patent
Lee

(10) Patent No.: US 11,768,347 B2
(45) Date of Patent: Sep. 26, 2023

(54) LENS DRIVING DEVICE, CAMERA MODULE AND OPTICAL DEVICE

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/644,040

(22) Filed: Dec. 13, 2021

(65) Prior Publication Data

US 2022/0099918 A1 Mar. 31, 2022

Related U.S. Application Data

(63) Continuation of application No. 16/615,599, filed as application No. PCT/KR2018/005670 on May 17, 2018, now Pat. No. 11,249,277.

(30) Foreign Application Priority Data

May 22, 2017 (KR) .......................... 10-2017-0062654
Jun. 30, 2017 (KR) .......................... 10-2017-0083072
(Continued)

(51) Int. Cl.
*G02B 7/09* (2021.01)
*G03B 3/10* (2021.01)
(Continued)

(52) U.S. Cl.
CPC .................. *G02B 7/09* (2013.01); *G03B 3/10* (2013.01); *G03B 5/02* (2013.01); *G03B 13/36* (2013.01); *G03B 17/12* (2013.01)

(58) Field of Classification Search
CPC ........ G02B 7/09; G02B 7/08; G02B 27/0006; G02B 13/0035; G03B 3/10; G03B 5/02;
(Continued)

(56) References Cited

U.S. PATENT DOCUMENTS 9,621,017 B2   4/2017  Lee et al.
2012/0057066 A1   3/2012  Kawai
(Continued)

FOREIGN PATENT DOCUMENTS

CN   105324712 A   2/2016
CN   105527691 A   4/2016
(Continued)

OTHER PUBLICATIONS

Office Action dated Dec. 21, 2021 in Korean Application No. 10-2017-0133881.
(Continued)

*Primary Examiner* — Lin Ye
*Assistant Examiner* — Tuan H Le
(74) *Attorney, Agent, or Firm* — SALIWANCHIK, LLOYD & EISENSCHENK

(57) ABSTRACT

The first embodiment of the present invention relates to a lens driving device comprising: a cover including an upper plate and a lateral plate extending from the upper plate; a bobbin arranged to move in a first direction within the cover; a coil arranged at the bobbin; a magnet which is arranged at the cover and faces the coil; and a base which is arranged below the bobbin and coupled to the cover, wherein the bobbin includes: a first surface facing the upper plate of the cover; a second surface which faces upwards and is arranged lower than the first surface; a first protrusion which is arranged at the first surface of the bobbin and overlapped with the upper plate of the cover in a first direction; and a groove concavely formed downwards on the second surface of the bobbin.

20 Claims, 33 Drawing Sheets

(30) Foreign Application Priority Data

Aug. 31, 2017 (KR) ........................ 10-2017-0110762
Oct. 16, 2017 (KR) ........................ 10-2017-0133881

(51) Int. Cl.
   *G03B 5/02* (2021.01)
   *G03B 13/36* (2021.01)
   *G03B 17/12* (2021.01)

(58) Field of Classification Search
   CPC .............................. G03B 13/36; G03B 17/12;
       G03B 2205/0069; G03B 30/00; G03B
       3/02; G03B 2205/0015; G03B 2205/0038;
       H02K 41/031; H04N 5/2253; H04N
       5/22521; H04N 5/23287; H04N 5/2257
   See application file for complete search history.

(56) References Cited

U.S. PATENT DOCUMENTS

| | | | |
|---|---|---|---|
| 2013/0182136 A1 | 7/2013 | Ishizue | |
| 2014/0247389 A1 | 9/2014 | Lee | |
| 2016/0187668 A1 | 6/2016 | Hayashi | |
| 2016/0282580 A1* | 9/2016 | Koyama | G02B 7/08 |
| 2017/0235094 A1 | 8/2017 | Osaka et al. | |
| 2017/0363837 A1* | 12/2017 | Fan | H04N 5/22521 |
| 2018/0095204 A1* | 4/2018 | Lin | G02B 5/003 |
| 2018/0180838 A1* | 6/2018 | Wu | G02B 7/021 |
| 2019/0222729 A1 | 7/2019 | Yoshikawa | |
| 2020/0057242 A1* | 2/2020 | Osaka | H04N 5/2254 |

FOREIGN PATENT DOCUMENTS

| | | |
|---|---|---|
| JP | 2008-281820 A | 11/2008 |
| JP | 2010-190923 A | 9/2010 |
| JP | 2014-66935 A | 4/2014 |
| JP | 2015-34911 A | 2/2015 |
| KR | 10-2006-0130857 A | 12/2006 |
| KR | 10-2013-0044502 A | 5/2013 |
| KR | 10-2016-0009389 A | 1/2016 |
| KR | 10-2016-0021562 A | 2/2016 |
| KR | 10-2016-0022656 A | 3/2016 |
| KR | 10-2016-0041919 A | 4/2016 |
| KR | 10-2016-0057721 A | 5/2016 |
| KR | 10-2016-0077916 A | 7/2016 |
| KR | 10-2016-0103437 A | 9/2016 |
| KR | 10-2017-0029984 A | 3/2017 |
| KR | 10-2017-0110953 A | 10/2017 |

OTHER PUBLICATIONS

International Search Report in International Application No. PCT/KR2018/005670, filed May 17, 2018.
Office Action dated Mar. 3, 2021 in Chinese Application No. 201880033732.7.
Supplementary European Search Report dated Jan. 25, 2021 in European Application No. 18805222.9.
Office Action dated Sep. 8, 2021 in Korean Application No. 10-2017-0062654.
Notice of Allowance dated Sep. 13, 2021 in U.S. Appl. No. 16/615,599.
Office Action dated Sep. 22, 2022 in Korean Application No. 10-2022-0069171.
Office Action dated Jan. 30, 2023 in Korean Application No. 10-2022-0055484.
Office Action dated Feb. 21, 2023 in Korean Application No. 10-2022-0080879.
Office Action dated Jun. 1, 2023 in Chinese Application No. 202211054391.6.

* cited by examiner ial stage application of International Patent Applica-
LENS DRIVING DEVICE, CAMERA MODULE AND OPTICAL DEVICE

CROSS-REFERENCE TO RELATED APPLICATIONS

This application is a continuation of U.S. application Ser. No. 16/615,599, filed Nov. 21, 2019; which is the U.S. national stage application of International Patent Application No. PCT/KR2018/005670, filed May 17, 2018, which claims the benefit under 35 U.S.C. § 119 of Korean Application No. 10-2017-0062654, filed May 22, 2017; 10-2017-0083072, filed Jun. 30, 2017; 10-2017-0110762, filed Aug. 31, 2017; and 10-2017-0133881, filed Oct. 16, 2017; the disclosures of each of which are incorporated herein by reference in their entirety.

TECHNICAL FIELD

The present embodiment relates to a lens driving device, a camera module, and an optical device.

BACKGROUND ART

The following description provides background information for the present embodiment and does not describe the prior art.

As various portable terminals are widely spread and commonly used, and wireless Internet services has been commercialized, the demands of consumers related to portable terminals have been diversified and various kinds of additional devices have been installed in portable terminals.

Among them, there is a camera module for photographing a subject as a photograph or a moving picture. Meanwhile, in recent camera modules, an autofocus function that automatically adjusts focus according to the distance of a subject is applied. At this time, the autofocus function can be performed using the electromagnetic interaction between a coil and a magnet.

However, in a conventional camera module, as a bobbin moves, foreign matters can be generated due to the grounding of the bobbin, therefore there is a problem that the generated foreign matters are scattered and affects the lens, the filter, the image sensor, and the like.

Further, in the conventional camera module, a terminal for providing a current to the coil can be deformed by the impact, which is a problem.

In addition, on the other hand, a display panel disposed on the front surface of an optical device frame is becoming wider at the request of a consumer. As shown in FIG. 23, the width of the display panel can be enlarged as the bezel size of the optical device is reduced. To reduce the bezel size of the optical device, the cover glass must be moved to the edge of the frame.

A cover glass, which is a glass that protects the camera module, and the center of the cover glass is located on the optical axis of the camera module.

If the optical axis of the lens module can be shifted to the edge of the frame in the camera module, the coverglass can be moved more to the edge of the frame than the camera module of the same size. As a result, the bezel size of the optical device is reduced, and the width of the display panel can be widened.

Further, the lens driving device includes a cover for protecting the built-in parts, and the cover is separated from the lens driving device (cover pulling out phenomenon) due to an external impact.

DETAILED DESCRIPTION OF THE INVENTION

Technical Subject

The first embodiment is intended to provide a lens driving device including a bobbin having a structure for capturing foreign matters.

It is also intended to provide a lens driving device having a structure in which captured foreign matters will not be re-scattered again.

The second embodiment is intended to provide a lens driving device including a structure in which deformation of a terminal is minimized.

Also, it is intended to provide a camera module including the lens driving device.

The third embodiment is intended to provide a lens driving device capable of performing an autofocus function and, at the same time, reducing the bezel size of the optical device by shifting the optical axis of the lens module from the center, a camera module including the lens driving device, and an optical device including the camera module.

The fourth embodiment is intended to provide a lens driving device requiring high pulling out force, a camera module including the lens driving device, and an optical device including the camera module.

Technical Solution

A lens driving device according to the first embodiment may include: a cover including an upper plate and a lateral plate extending from the upper plate; a bobbin arranged to move in a first direction within the cover; a coil arranged at the bobbin; a magnet which is arranged at the cover and faces the coil; and a base which is arranged below the bobbin and coupled to the cover, wherein the bobbin includes: a first surface facing the upper plate of the cover; a second surface which faces upwards and is arranged lower than the first surface; a first protrusion which is arranged at the first surface of the bobbin and overlapped with the upper plate of the cover in a first direction; and a groove concavely formed downwards on the second surface of the bobbin.

The first surface, the first protrusion, the groove, and the second surface may be sequentially arranged in the radial direction from the central axis of the bobbin.

The groove may include a first groove and a second groove concavely formed downwards from the first groove.

At least a portion of the first groove may be overlapped with the coil in the first direction. The first surface, the first protrusion, the second groove, the first groove, and the second surface may be sequentially arranged in a radial direction from a central axis of the bobbin.

A plurality of second grooves may be spaced apart from each other and arranged in the first groove.

The lens driving device may further include a dust trap arranged in the first groove.

The lens driving device may further include an upper elastic member coupled to an upper surface of the bobbin, wherein the upper elastic member may include: an outer side portion; an inner side portion coupled to the bobbin; and a connecting portion connecting the outer side portion and the inner side portion, wherein the groove may be overlapped with the connecting portion in the first direction.

The bobbin may include a second protrusion and a third protrusion arranged in the first surface and spaced apart from each other, wherein a portion of the inner side portion is arranged between the second protrusion and the third protrusion, and wherein a portion of the inner side portion arranged between the second protrusion and the third protrusion may be fixed to the first surface by an adhesive.

The lens driving device further includes a housing arranged between the cover and the bobbin, wherein the magnet may be arranged in the housing.

The groove may be arranged at the circumference of at least a portion of a surface extended downwards from the upper surface of the first surface and the first protrusion.

A camera module according to the present embodiment may comprise: a printed circuit board; an image sensor arranged on the printed circuit board; a cover including an upper plate and a lateral plate extending from the upper plate; a bobbin arranged to move in a first direction within the cover; a lens coupled to the bobbin and disposed over the image sensor; a coil arranged at the bobbin; a magnet which is arranged at the cover and faces the coil; and a base which is arranged below the bobbin and coupled to the cover, wherein the upper surface of the bobbin includes: a first surface; a second surface disposed below the first surface; a third surface disposed above the first surface and facing the upper surface of the cover; and a fourth surface disposed between the second surface and the third surface.

A lens driving device according to the second embodiment includes: a cover including an upper plate and a lateral plate extending in a vertical direction from the upper plate; a bobbin arranged within the cover; a coil arranged at the bobbin; a magnet disposed between the lateral plate of the cover and the bobbin and facing the coil; a base disposed below the bobbin and coupled with the lateral plate of the cover; and an elastic member coupled to a lower surface of the bobbin, wherein the elastic member includes a first elastic unit and a second elastic unit spaced apart from each other, the first elastic unit is connected to one end of the coil, the second elastic unit is connected to the other end of the coil, the base includes a protruded portion protruded from the lower surface of the base, wherein the elastic member includes an inner side portion coupled to a lower surface of the bobbin, an outer side portion arranged on an upper surface of the base, a connecting portion connecting the inner side portion and the outer side portion, and a terminal portion extending from the outer side portion and arranged at the protruded portion, and wherein the protrude portion includes a first surface facing the terminal portion, a second surface arranged on the opposite side of the first surface, and a first groove concavely formed upward on the lower surface of the protruded portion and extending from the first surface to the second surface, and the first groove may be arranged above the lower end of the terminal portion.

An adhesive for fixing the terminal portion to the protruded portion may further be included.

The protruded portion further includes a second groove arranged on the first surface of the protruded portion, and the second groove may be extended in the vertical direction.

The base may include a third groove concavely formed inwards on a side surface of the base and having the terminal portion arranged therein, and a first inclined surface disposed between the upper surface of the base and the third groove of the base.

The lower surface of the protruded portion includes a second inclined surface disposed on both sides of the first groove, and the second inclined surface may be formed such that the length of the protruded portion from the lower surface of the base becomes shorter as the distance from the first groove is increased.

The base further includes a fourth groove disposed on a lower surface of the base, and at least a portion of the protruded portion may be disposed in the fourth groove.

The lens driving device further includes a housing disposed between the cover and the bobbin, and the magnet may be disposed in the housing.

The base further includes four pillar portions protruded from the upper surface of the base, the housing includes four accommodating portions for respectively accommodating the four pillar portions, two pillar portions of the four pillar portions are spaced apart from the outer side surface of the base, the outer side portion of the elastic member includes a coupling portion disposed on an upper surface of the base disposed between the two pillar portions and an outer side surface of the base, and the terminal portion may be extended in the vertical direction from the coupling portion.

The base includes a step portion disposed on an outer circumferential surface of the base and on which the lower end of the lateral plate of the cover is disposed, the step portion includes a fifth groove disposed on an upper surface of the step portion, and the lateral plate of the cover may include a sixth groove disposed on a lower surface of the side lateral plate of the cover at a position corresponding to the fifth groove.

A camera module according to the second embodiment comprises: a printed circuit board; a sensor base disposed on an upper surface of the printed circuit board; an image sensor disposed on the printed circuit board; a cover disposed on the printed circuit board; a bobbin disposed within the cover; a lens coupled to the bobbin and disposed over the image sensor; a coil disposed in the bobbin; a magnet disposed on the cover and facing the coil; a base disposed on an upper surface of the sensor base and coupled with the cover; and an elastic member coupled to the bobbin and the base and electrically connected to the coil, wherein the base includes a protruded portion protrueDEd from a lower surface of the base, the sensor base has a shape corresponding to the protrusion and includes a groove for receiving the protrusion, and the elastic member includes an inner portion coupled to a lower surface of the bobbin, an outer portion coupled to an upper surface of the base, a connecting portion connecting the inner portion and the outer portion, and a terminal portion extending from the outer portion and disposed along the protrusion, wherein the terminal portion is fixed to the protruded portion by an adhesive, and the protruded portion includes a first surface facing the terminal portion, a second surface disposed on the opposite side of the first surface, and a groove concavely formed upward on the lower surface of the protruded portion and extended from the first surface to the second surface, and wherein the lower end of the first surface of the protruded portion is disposed above the lower end of the terminal portion at least in part, and an inner surface of a portion of the terminal portion protruding downwards from the protruded portion may be supported by the sensor base.

A lens driving device according to the third embodiment comprises: a cover; a housing disposed within the cover; a bobbin disposed in the housing and having a hole in a vertical direction; a coil disposed on an outer circumferential surface of the bobbin; and a magnet disposed in the housing and disposed corresponding to the coil, wherein the cover includes a first lateral plate, a second lateral plate connected to the first lateral plate, a third lateral plate disposed opposite to the first lateral plate and connected to the second lateral plate, and a fourth lateral plate connected to the third lateral plate and the first lateral plate, wherein the housing includes a first side portion disposed at a position corresponding to the first lateral plate of the cover, a second side portion disposed at a position corresponding to the second lateral plate of the cover, and a third side portion disposed at a position corresponding to the fourth lateral plate of the cover, wherein the outer side surface of the coil disposed at a position corresponding to the third lateral plate of the cover faces the inner side surface of the third lateral plate of the cover, and the shortest distance between the central axis of the hole of the bobbin in the vertical direction and the first lateral plate of the cover may be longer than the shortest distance between the central axis of the hole of the bobbin in the vertical direction and the third lateral plate of the cover.

The shortest distance between the central axis of the hole of the bobbin in the vertical direction and the second lateral plate of the cover is equal to the shortest distance between the central axis of the hole of the bobbin in the vertical direction and the fourth lateral plate of the cover, the shortest distance between the central axis of the hole of the bobbin in the vertical direction and the second lateral plate of the cover is shorter than the shortest distance between the central axis of the hole of the bobbin in the vertical direction and the first lateral plate of the cover, and the shortest distance between the central axis of the hole of the bobbin in the vertical direction and the second lateral plate of the cover may be longer than the shortest distance between the central axis of the hole of the bobbin in the vertical direction and the third lateral plate of the cover.

The housing may not be disposed between the bobbin and the third lateral plate of the cover in a horizontal direction.

The cover includes a 1-1 corner portion disposed between the first lateral plate and the second lateral plate, a 1-2 corner portion disposed between the second lateral plate and the third lateral plate, a 1-3 corner portion disposed between the third lateral plate and the fourth lateral plate, and a 1-4 corner portion disposed between the fourth lateral plate and the first lateral plate, and the housing includes a 2-1 corner portion disposed at a position corresponding to the 1-1 corner portion of the cover, a 2-2 corner portion disposed at a position corresponding to the 1-2 corner portion of the cover, a 2-3 corner portion disposed at a position corresponding to the 1-3 corner portion of the cover, and a 2-4 corner portion disposed at a position corresponding to the 1-4 corner portion of the cover, wherein the housing may further include a rib connecting the 2-2 corner portion and the 2-3 corner portion.

The rib may connect a lower portion of the 2-2 corner portion and a lower portion of the 2-3 corner portion.

The rib includes a first rib portion disposed between the 2-2 corner portion and the 2-3 corner portion, and a second rib portion connecting the outer surface of the 2-2 corner portion and the outer surface of the 2-3 corner portion, wherein the second rib portion may be longer than the first rib portion.

The first rib portion and the second rib portion may be formed integrally.

The first rib portion and the second rib portion may be protruded downwards from the housing.

The magnet may include a first magnet disposed on the second side portion and a second magnet disposed on the third side portion.

The cover may have a rectangular shape and may further include an upper plate having a hole formed in a vertical direction, wherein the upper plate may be connected to the first lateral plate, the second lateral plate, the third lateral plate, and the fourth lateral plate.

The difference between the shortest distance between the central axis of the bobbin in the vertical direction and the first lateral plate and the shortest distance between the central axis of the hole of the bobbin in the vertical direction and the third lateral plate may be 0.15 mm or more and 0.8 mm or less.

A camera module according to the third embodiment comprises: a lens driving device; a lens module disposed in the lens driving device; a substrate disposed below the lens driving device; and an image sensor mounted on the substrate and disposed on an optical axis of the lens module, wherein the lens driving device includes: a cover; a housing disposed within the cover; a bobbin disposed in the housing and having a hole in a vertical direction; a coil disposed on an outer circumferential surface of the bobbin; and a magnet disposed in the housing and corresponding to the coil, wherein the cover includes a first lateral plate, a second lateral plate connected to the first lateral plate, a third lateral plate disposed on the opposite side of the first lateral plate and connected to the second lateral plate, and a fourth lateral plate connected to the third lateral plate and the first lateral plate, wherein the housing includes a first side portion disposed at a position corresponding to the first lateral plate of the cover, a second side portion disposed at a position corresponding to the second lateral plate of the cover, and a third side portion disposed at a position corresponding to the fourth lateral plate of the cover, and wherein The outer side surface of the coil disposed at a position corresponding to the third lateral plate of the cover faces to the inner side surface of the third lateral plate of the cover, and the shortest distance between the central axis of the hole of the bobbin in the vertical direction and the first lateral plate of the cover may be longer than the shortest distance between the center axis of the hole of the bobbin in the vertical direction and the third lateral plate of the cover.

A camera module according to the forth embodiment comprises: a cover; a bobbin disposed in the cover; a first coil disposed in the bobbin; a magnet opposed to the first coil; and a base disposed under the cover, wherein the cover includes a upper plate, a first lateral plate extending downward from the upper plate, and a first protruded portion located on a lower surface of the first lateral plate, wherein the base includes a body on which the first lateral plate is disposed and a first groove on which the first protruded portion is disposed, and wherein the first protruded portion may be partially curved or bent so as to be disposed in the first groove.

The first groove may be formed by recessing the lower surface of the body, and the first protruded portion may be protruded downwards from the lower surface of the first lateral plate and may be curved or bent toward the first groove.

The first protruded portion includes a 1-1 portion protruded downwards from a lower surface of the first lateral plate and a 1-2 portion curved or bent in the 1-1 portion, and the first groove may include a 1-1 groove formed by recessing the outer surface of the body and disposed with the 1-1 portion, and a 1-2 groove formed by recessing the lower surface of the body and disposed with the 1-2 portion.

The 1-1 groove may be extended from the upper surface of the body to the lower surface of the body, and the 1-2 groove may be extended to one side of the 1-1 groove.

The 1-2 groove may be extended vertically to a direction in which the 1-1 groove is extended from a lower portion of the 1-1 groove.

The body is divided into an upper end portion and a lower end portion by a height difference of an upper surface, the lower end portion is located at an edge of the upper end portion, the first lateral plate is disposed at the lower end portion, the first groove is formed by recessing a lower surface of the lower end portion of the body, and the first protruded portion may be protruded downward from a lower surface of the first lateral plate and may be curved or bent toward the first groove.

The first protruded portion includes a 1-1 portion protruding downward from a lower surface of the first lateral plate and a 1-2 portion curved or bent in the 1-1 portion, and the first groove may include a 1-1 groove formed by recessing the outer side surface of the upper end portion of the body and the outer side surface of the lower end portion of the body and disposed with the 1-1 portion, and a 1-2 groove formed by recessing the lower surface of the lower end portion of the body and disposed with the 1-2 portion.

The cover further includes a second lateral plate extending downward from the upper plate and positioned on the opposite side of the first lateral plate, a second protruded portion located on a lower surface of the first lateral plate and spaced apart from the first protruded portion, a third protruded portion located on a lower surface of the second lateral plate, and a third protruded portion located on a lower surface of the second lateral plate and spaced apart from the third protruded portion, the base further comprises a second groove in which the second protruded portion is arranged, a third groove in which the third protruded portion is arranged, and a fourth groove in which the fourth protruded portion is arranged, and the first protruded portion and the third protruded portion may be disposed faced to each other, and the second protruded portion and the fourth protruded portion may be disposed facing to each other.

A camera module according to the fourth embodiment comprises: a cover; a bobbin disposed in the cover; a lens module disposed in the bobbin; a first coil disposed in the bobbin; a magnet facing the first coil; a base disposed below the cover; a main board disposed below the base; and an image sensor mounted on the main board, wherein the cover includes a upper plate, a first lateral plate extending downward from the upper plate, and a first protruded portion located on a bottom surface of the first lateral plate, wherein the base includes a body on which the first lateral plate is disposed and a first groove on which the first protruded portion is disposed and wherein the first protruded portion may be partially curved or bent so as to be disposed in the first groove.

An optical device according to the fourth embodiment comprises: a main body; a display panel disposed on one surface of the main body; and a camera module disposed in the main body and electrically connected to the display panel, wherein the camera module includes: a cover; a housing disposed within the cover; a lens module disposed in the bobbin; a first coil disposed in the bobbin; a magnet facing the first coil; a base disposed below the cover; a main board disposed below the base; and an image sensor mounted on the main board, wherein the cover includes a upper plate, a first lateral plate extending downward from the upper plate, and a first protruded portion located on a bottom surface of the first lateral plate, wherein the base includes a body on which the first lateral plate is disposed and a first groove on which the first protruded portion is disposed and wherein the first protruded portion may be partially curved or bent so as to be disposed in the first groove.

Advantageous Effects

Through the first embodiment, it is possible to capture the foreign matters generated due to the grinding of the bobbin and the foreign matter flowing in through the hole of the cover.

Also, the captured foreign matters may not be re-scattered again.

Through the second embodiment, the terminals are firmly fixed to the base, so that deformation of the terminals can be minimized.

In the lens driving device of the third embodiment, the center axis of the hole of the bobbin in the vertical direction is moved (shifted) and disposed toward the horizontal direction from the center of the cover which is an exterior member. Therefore, the optical axis of the lens module mounted on the hole of the bobbin is also shifted and disposed toward the horizontal direction. As a result, the size of the bezel of the optical device can be reduced so that the display panel can be widened.

In the lens driving device of the fourth embodiment, the cover is stably fixed to the base by the protruded portions that are bent or curved and disposed in the grooves of the base, and it is not easily separated by the external force. Further, a camera module and an optical device including the lens driving device are provided.

BEST MODE

Figure 1:
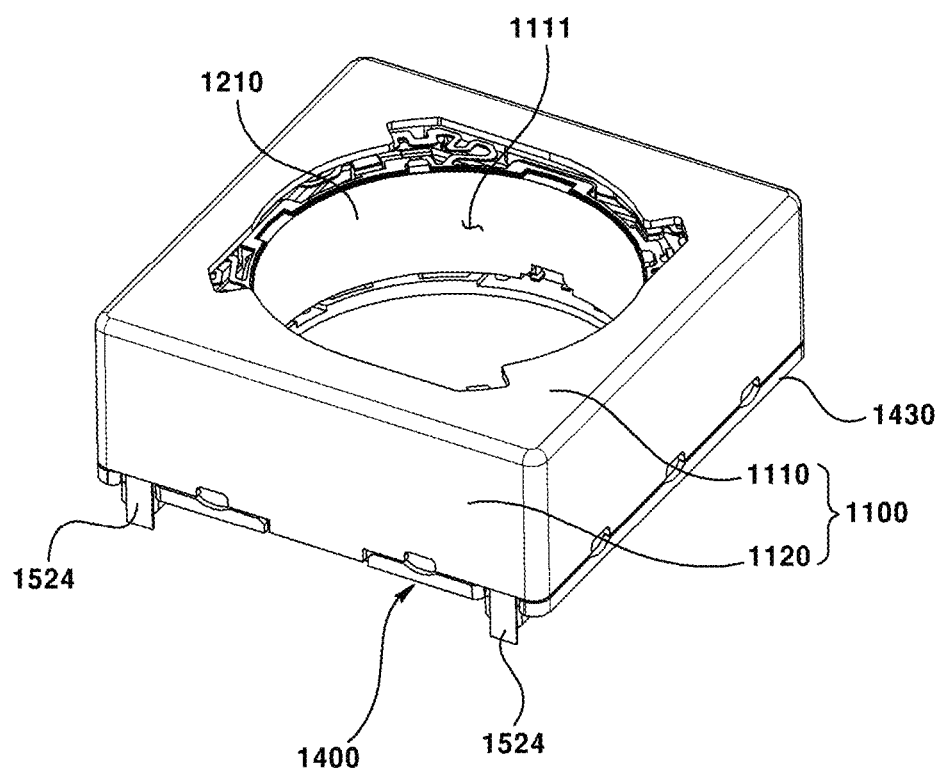
FIG. 1 is a perspective view showing a lens driving device according to the first embodiment.

Hereinafter, some embodiments of the present invention will be described with reference to the accompanying drawings. However, the technical spirit of the present invention is not limited to some embodiments described.

In describing the components of the embodiment of the present invention, terms such as first, second, A, B, (a), and (b) may be used. These terms are merely intended to distinguish the components from other components, and the terms do not limit the nature, order or sequence of the components.

When a component is described as being "connected", "coupled", or "jointed" to another component, the component may be directly connected, coupled, or jointed to the other component, however, it should be understood that another element may be "connected", "coupled" or "jointed" between components.

The 'optical axis direction' used below is defined as the optical axis direction of the lens coupled to the lens driving device. On the other hand, 'optical axis direction' can correspond to 'vertical direction', 'z axis direction', and the like.

The "auto focus function" used below is defined as the function that automatically focuses on the subject by moving the lens in the direction of the optical axis according to the distance of the subject so that clear images of the subject can be obtained on the image sensor. Meanwhile, "auto focus" could be mixed with "AF (auto focus)."

Hereinafter, the configuration of an optical device according to this embodiment will be described with reference to the drawings.

The optical device may be any one among a mobile phone, a mobile phone, a smart phone, a portable smart device, a digital camera, a laptop computer, a digital broadcast terminal, a personal digital assistants (PDA), a portable multimedia player (PMP). However, the type of the optical device is not limited thereto, and any device for taking images or photographs may be included in the optical device.

The optical device may comprise a main body. The main body can form the appearance of the optical device. The main body can accommodate the camera module. A display section may be disposed on one surface of the main body. For example, the display unit and the camera module may be disposed on one surface of the main body and the camera module may be additionally disposed on the other surface (the surface located opposite to the one surface) of the main body.

The optical device may include a display section. The display unit may be disposed on one surface of the main body. The display section can output the image photographed by the camera module.

The optical device may include a camera module. The camera module may be disposed in the main body. At least a part of the camera module may be accommodated inside the main body. The plurality of camera modules may be provided. The camera module may be disposed on one surface of the main body and on each of the other surfaces of the main body. The camera module can take an image of a subject.

The camera module can perform auto focus (AF) function. The camera module can perform an auto focus feedback (AF feedback) control. At this time, the camera module may be referred to as a 'closed loop auto focus (CLAF) camera module'. The camera module can perform optical image stabilization (OIS) function. At this time, the camera module may be referred to as an 'OIS module'. The camera module can perform the optical image stabilization feedback control. The camera module according to the present embodiment can be applied to both of the two camera modules of the dual camera module or to any one of the camera modules.

In the present invention, the camera module that can be interpreted in the same sense as the camera device is described as an example, however, the camera module may be interpreted as including a camera device.

Hereinafter, the configuration of the camera module according to the first embodiment will be described with reference to the drawings.

Figure 10:
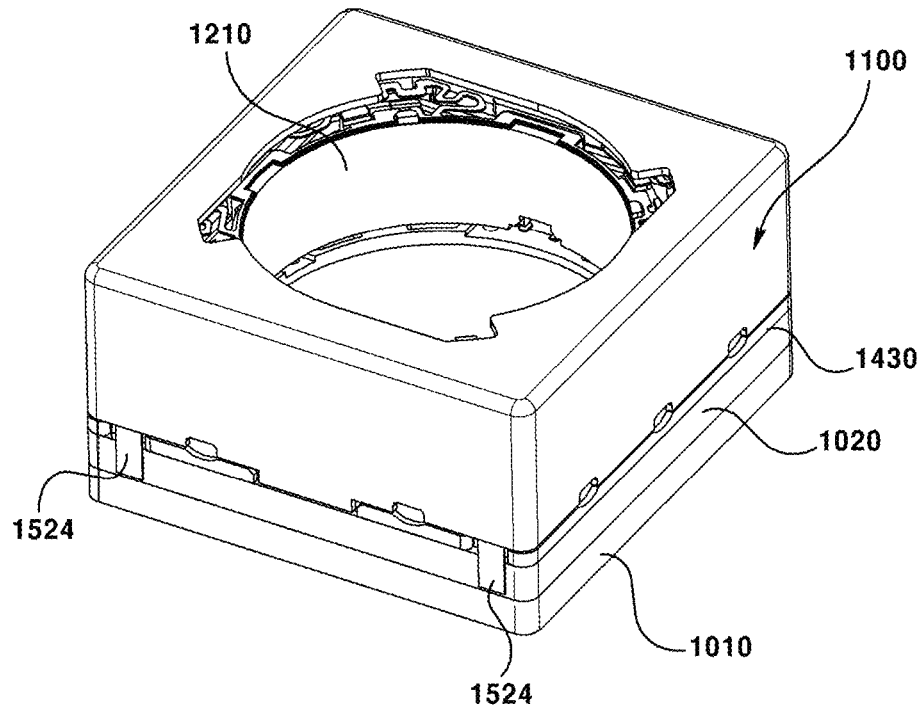
FIG. 10 is a perspective view of a camera module according to the first embodiment.

FIG. 10 is a perspective view of a camera module according to the first embodiment.

The camera module may include a lens module. The lens module may include at least one lens. The lens module may include a lens and a barrel. The lens module may be coupled to the bobbin 1210 of the lens driving device. The lens module may be coupled to the bobbin 1210 by screw-coupling and/or adhesives. The lens module can move integrally with the bobbin 1210. The lens may be coupled to the bobbin 1210 and disposed above the image sensor.

The camera module may include a filter. The filter may include an infrared filter. The infrared filter can block the light of the infrared region from entering the image sensor. An infrared filter may be disposed between the lens module and the image sensor. In one example, an infrared filter may be disposed in the sensor base 1020 disposed between the lens driving device and the printed circuit board 1010. Alternatively, an infrared filter may be disposed in a base 1400.

The camera module may include a printed circuit board 1010. A lens driving device may be disposed on the printed circuit board 1010. At this time, a sensor base 1020 may be disposed between the printed circuit board 1010 and the lens driving device. The printed circuit board 1010 may be electrically connected to the lens driving device. An image sensor may be disposed on the printed circuit board 1010. The printed circuit board 1010 may be electrically connected to the image sensor.

The camera module may comprise an image sensor. The image sensor may be disposed on the printed circuit board 1010. The image sensor can be electrically connected to the printed circuit board 1010. In one example, the image sensor may be coupled to the printed circuit board 1010 by surface mounting technology (SMT). As another example, the image sensor may be coupled to the printed circuit board 1010 by a flip chip technique. The image sensor can be disposed so that the lens and the optical axis coincide. That is, the optical axis of the image sensor and the optical axis of the lens can be aligned. The image sensor can convert the light irradiated to the effective image area of the image sensor into an electrical signal. The image sensor may be any one among a charge coupled device (CCD), a metal oxide semiconductor (MOS), a CPD, and a CID.

The camera module may include a control unit. The control unit may be disposed on the printed circuit board 1010. The control unit can control the direction, intensity, amount, and/or amplitude of the current supplied to the coil 1220 of the lens driving device. The control unit controls the lens driving device to perform the autofocus function and/or the optical image stabilization function. Furthermore, the control unit may perform autofocus feedback control and/or optical image stabilization feedback control on the lens driving device. In more detail, the control unit can detect the position of the lens and/or the bobbin 1210 in real time by the sensor, and control the current applied to the coil 1220 to move the lens to a more accurate position. That is, the controller can detect the position of the bobbin 1210 and readjust the position of the bobbin 1210 based on the position thereof.

Hereinafter, the configuration of the lens driving device according to the first embodiment will be described with reference to the drawings.

Figure 2:
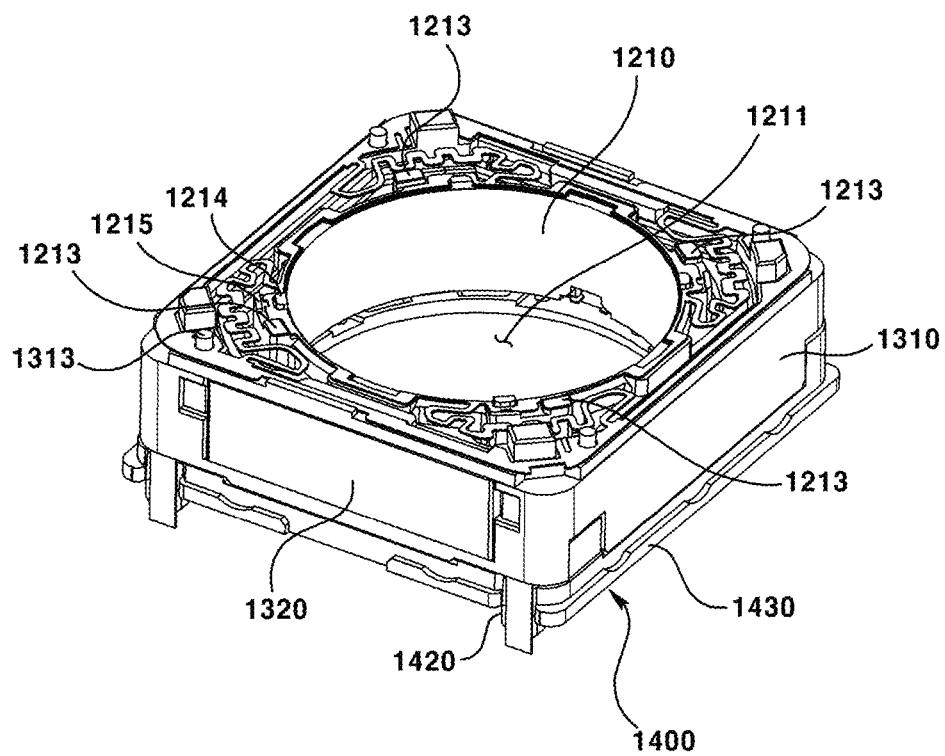
FIG. 2 is a perspective view showing a state in which the cover is omitted in FIG. 1.
Figure 3:
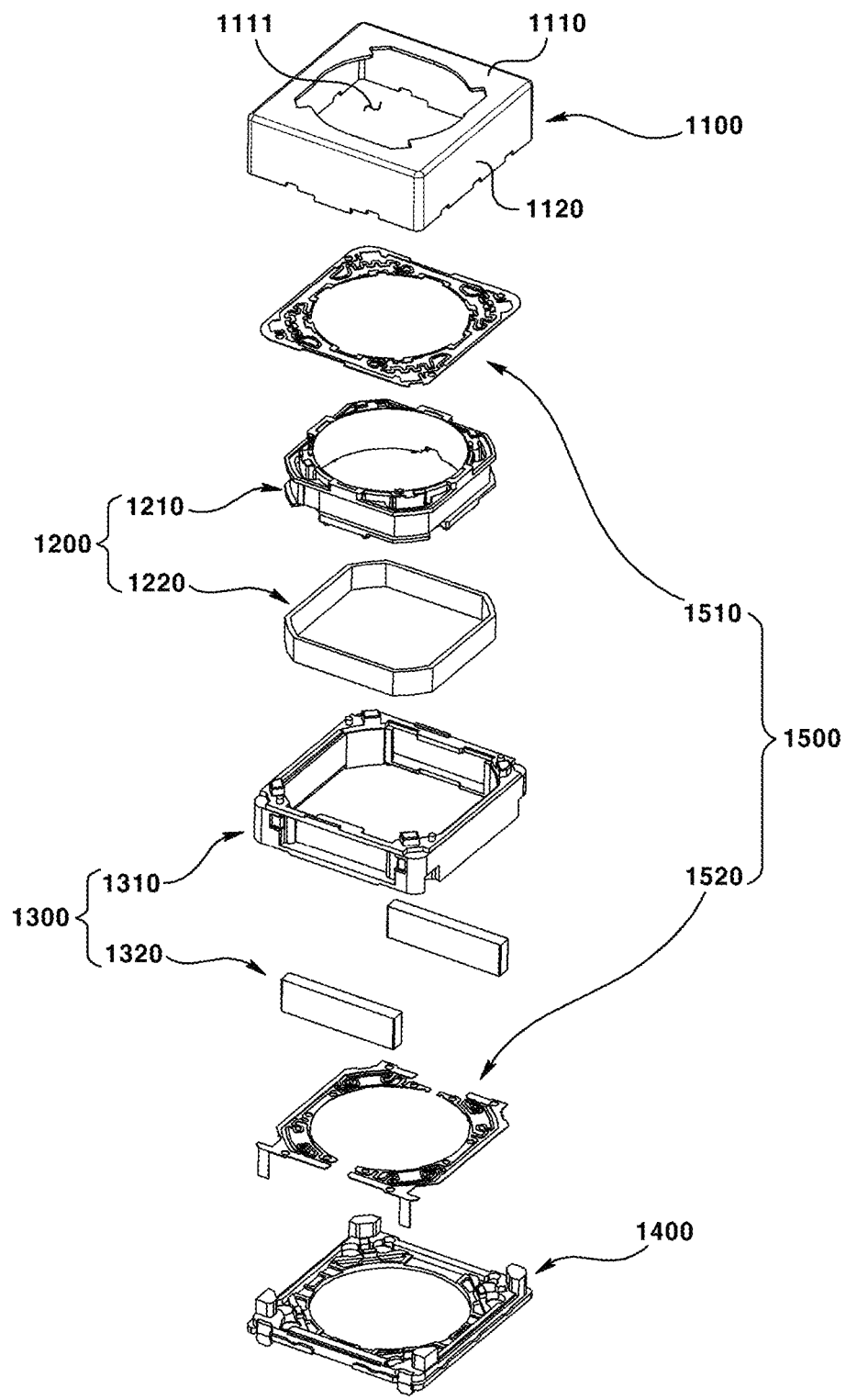
FIG. 3 is an exploded perspective view showing the lens driving device according to the first embodiment.
Figure 4:
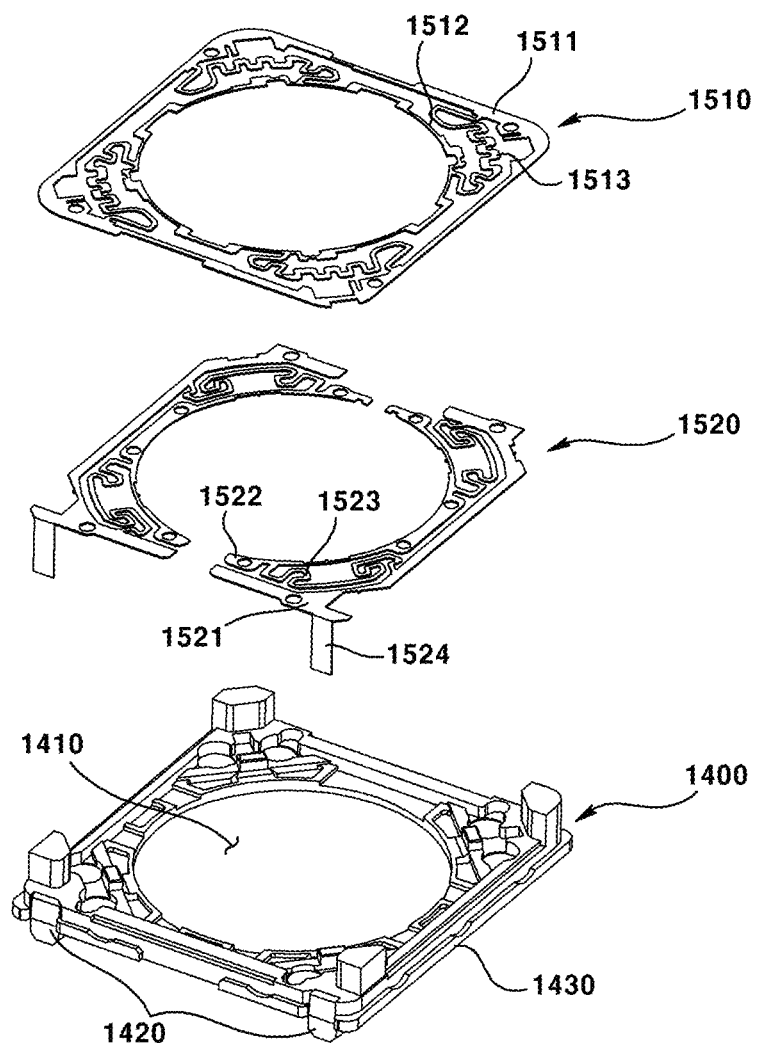
FIG. 4 is an exploded perspective view showing a part of the configuration of the lens driving device according to the first embodiment.
Figure 5:
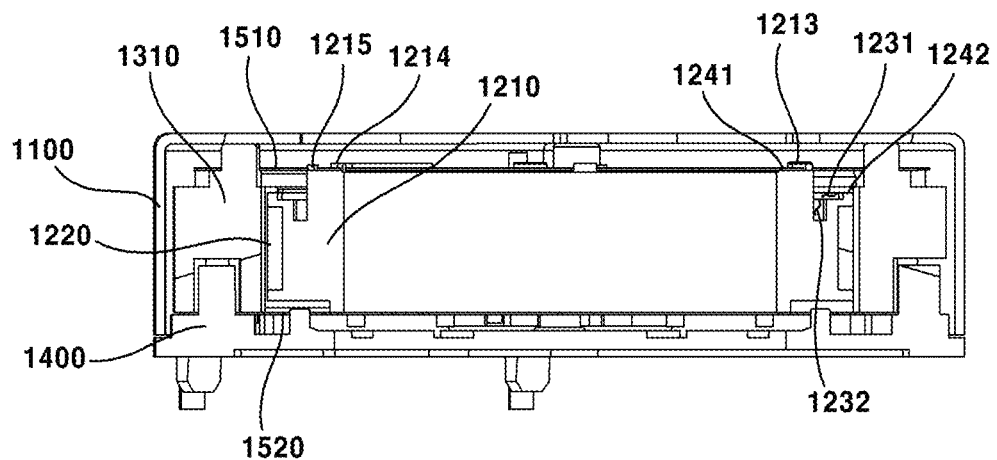
FIG. 5 is a cross-sectional view of the lens driving device according to the first embodiment.
Figure 6:
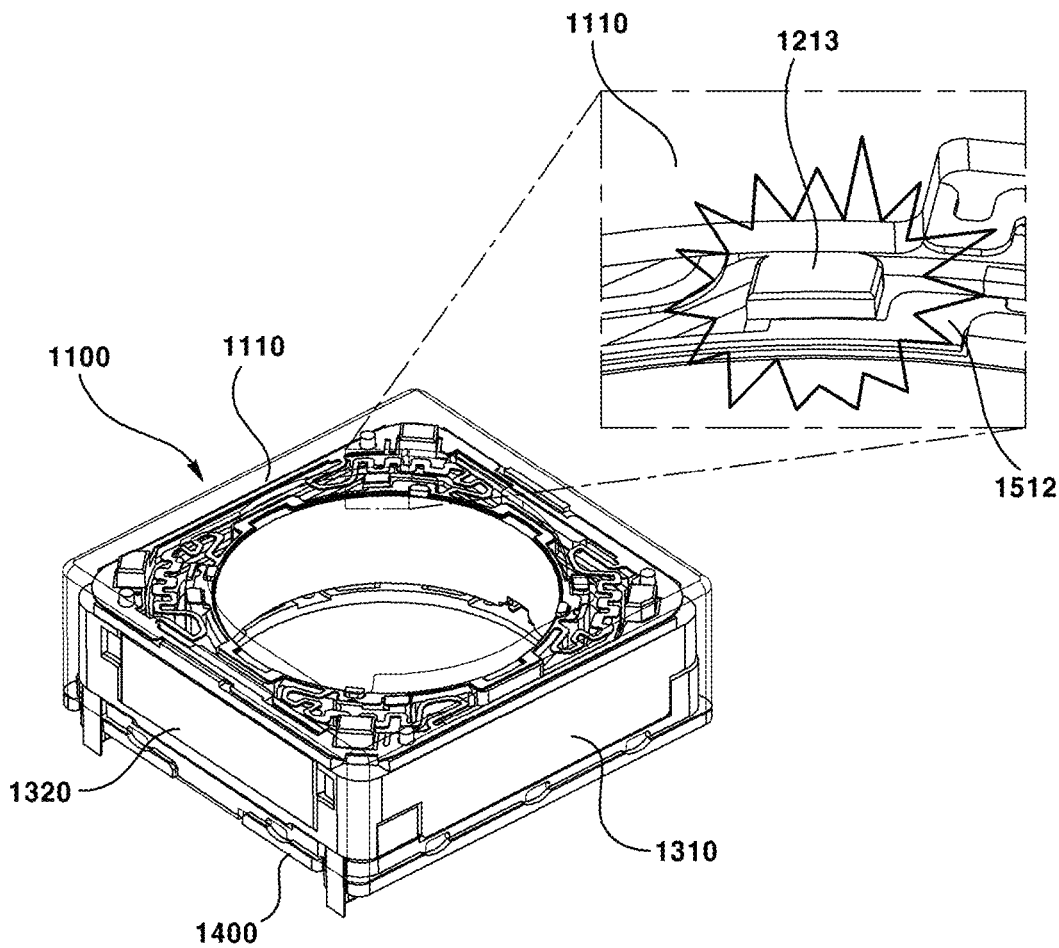
FIG. 6 is a see-through view and a partial enlarged view of the lens driving device according to the first embodiment.
Figure 7:
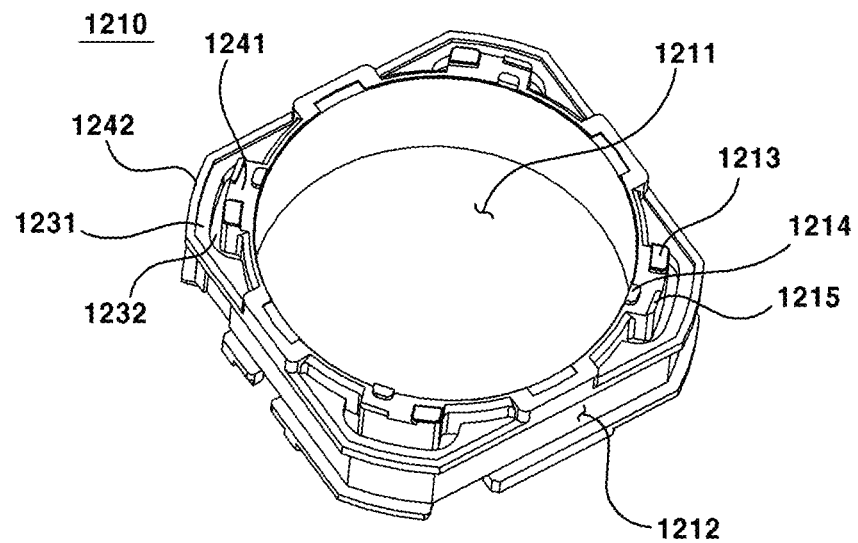
FIG. 7 is a perspective view of the bobbin of the lens driving device according to the first embodiment.
Figure 8:
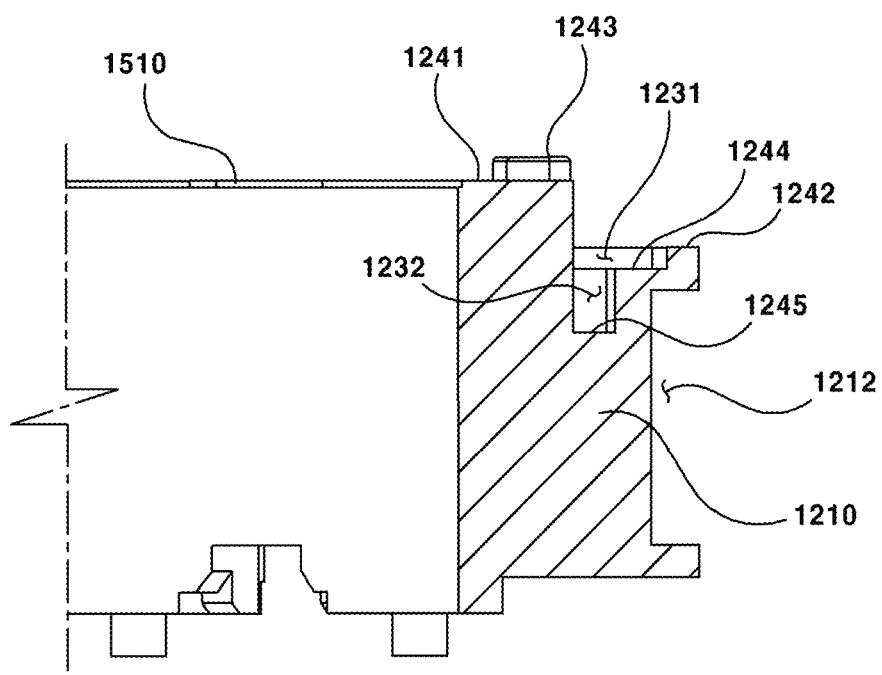
FIG. 8 is a cross-sectional view showing a part of the bobbin of the lens driving device according to the first embodiment.
Figure 9:
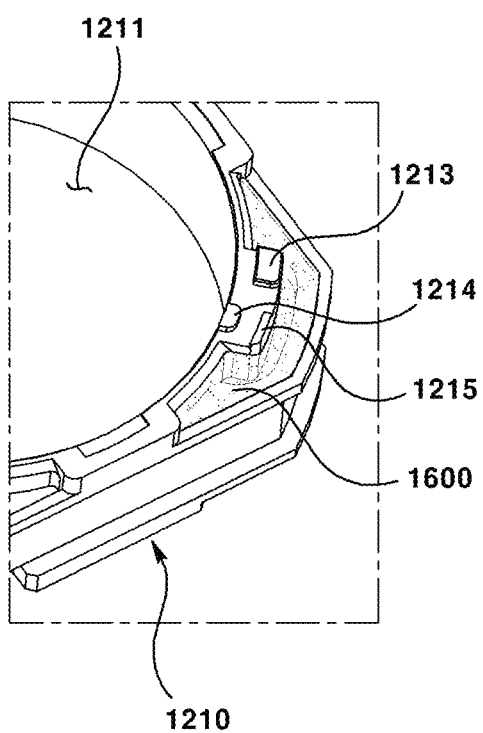
FIG. 9 is a perspective view showing a state in which a dust trap is applied to a bobbin of the lens driving device according to the first embodiment.

FIG. 1 is a perspective view showing a lens driving device according to the first embodiment; FIG. 2 is a perspective view showing a state in which the cover is omitted in FIG. 1; FIG. 3 is an exploded perspective view showing the lens driving device according to the first embodiment; FIG. 4 is an exploded perspective view showing a part of the configuration of the lens driving device according to the first embodiment; FIG. 5 is a cross-sectional view of the lens driving device according to the first embodiment; FIG. 6 is a see-through view and a partial enlarged view of the lens driving device according to the first embodiment; FIG. 7 is a perspective view of the bobbin of the lens driving device according to the first embodiment; FIG. 8 is a cross-sectional view showing a part of the bobbin of the lens driving device according to the first embodiment; and FIG. 9 is a perspective view showing a state in which a dust trap is applied to a bobbin of the lens driving device according to the first embodiment.

The lens driving device may be a voice coil motor (VCM). The lens driving device can move the bobbin 1210 in the optical axis direction. The lens driving device can move the bobbin 1210 in a direction perpendicular to the optical axis.

The lens driving device may include a cover 1100. The cover 1100 may be non-magnetic. The cover 1100 may not include a structure corresponding to an inner yoke. That is, the distance between the cover 1100 and the first protrusion 1213 of the bobbin 1210 can limit the upward movement of the bobbin 1210. The cover 1100 may be coupled to the base 1400. The cover 1100 can accommodate the housing 1310 therein. The cover 1100 can form an appearance of the lens driving device. The cover 1100 may be in the form of a hexahedron with a lower surface opened. The cover 1100 may be formed of a metal material. At this time, the cover 1100 may be referred to as a 'cover can'. The cover 1100 may be formed by bending a metal plate material. The cover 1100 may be connected to the ground portion of the printed circuit board 1010. Through this, the cover 1100 can be grounded (earthed). The cover 1100 may block electromagnetic interference (EMI). At this time, the cover 1100 may be referred to as an 'EMI shield can.'

The cover 1100 may include an upper plate 1110. The cover 1100 may include a lateral plate 1120. The cover 1100 may include an upper plate 1110 and a lateral plate 1120 extending from the upper plate 1110. The cover 1100 may include an upper plate 1110 and a lateral plate 1120 that extends downward from an outer periphery or edge of the upper plate 1110. The lower end of the lateral plate 1120 of the cover 1100 may be disposed at the step portion 1430 of the base 1400. The inner surface of the lateral plate 1120 of the cover 1100 may be coupled to the base 1400 by an adhesive.

The upper plate 1110 may include a hole 1111. The hole 1111 may be formed in the upper plate 1110 of the cover 1100. The hole 1111 may expose the lens, but it is not limited thereto. The size of the hole 1111 may be larger than the diameter of the lens module so that the lens module can be inserted and assembled through the hole 1111. The light introduced through the hole 1111 can pass through the lens.

At this time, the light passing through the lens can be converted into an electrical signal in the image sensor and can be obtained as an image. An adhesive for fixing the bobbin 1210 and the inner side portion 1512 of the upper elastic member 1510 through the hole 1111 can be injected. A dust trap 1600 to be applied to the grooves 1231 and 1232 of the bobbin 1210 through the holes 1111 may be further injected but in other embodiments the dust trap 1600 may not be applied.

The lens driving device may include the mover 1200. The mover 1200 may be coupled with a lens. The mover 1200 can move integrally with the lens. The mover 1200 can move through interaction with the stator 1300. The mover 1200 can move during AF driving. At this time, the mover 1200 may be referred to as an 'AF mover'.

The mover 1200 may include a bobbin 1210. The bobbin 1210 may be disposed within the housing 1310. The bobbin 1210 may be arranged to move in the first direction inside the housing 1310. At this time, the first direction may be the optical axis direction. The bobbin 1210 may be disposed in the hole 1311 of the housing 1310. The bobbin 1210 may be movably coupled to the housing 1310. The bobbin 1210 can move in the direction of the optical axis with respect to the housing 1310. A lens may be coupled to the bobbin 1210. The bobbin 1210 and the lens may be coupled by a screw-coupling and/or an adhesive. A coil 1220 may be coupled to the bobbin 1210. An upper elastic member 1510 may be coupled to an upper surface or an upper portion of the bobbin 1210. A lower elastic member 1520 may be coupled to a lower surface or a lower portion of the bobbin 1210. The bobbin 1210 may be coupled to the elastic member 1500 by thermal fusion welding and/or an adhesive.

The bobbin 1210 in this first embodiment may include: a first surface 1241; a second surface 1242 disposed below the first surface 1241; a first protrusion 1213 disposed on the first surface 1241 of the bobbin 1210 and overlaps with the upper plate 1110 of the cover 1100 in the first direction (optical axis direction); and grooves 1231 and 1232 concavely formed downward from the second surface 1242 of the bobbin. At this time, the first surface 1241 and the second surface 1242 are upper surfaces of the bobbin 1210 and facing the inner surface of the upper plate 1110 of the cover 1100. At least a portion of the grooves 1231 and 1232 may be disposed beside the first protrusion 1213. The grooves 1231 and 1232 may be disposed on the second surface 1242 of the bobbin 1210 and at least a portion thereof may be disposed beside the first protrusion 1213. With this structure, foreign matters generated by the collision between the first protrusion 1213 and the upper plate 1110 of the cover 1100 can be captured in the grooves 1231 and 1232.

In the first embodiment, the upper surface of the bobbin 1210 may include: a first surface 1241; a second surface 1242 disposed below the first surface 1241; a third surface 1243 disposed above the first surface 1241 and facing the upper plate 1110 of the cover 1100; a fourth surface 1244 disposed below the second surface 1242 and disposed between the second surface 1242 and the third surface 1243 in the horizontal direction; and/or a fifth surface 1245. At this time, the third surface 1243 may be formed by the first protrusion 1213. The third surface 1243 may be the upper surface of the first protrusion 1213. The fourth surface 1244 may be formed by the first groove 1231. The fifth surface 1245 may be formed by the second groove 1232.

In the first embodiment, the first surface 1241, the first protrusion 1213, the grooves 1231 and 1232, and the second surface 1242 may be sequentially arranged in the radial direction of the central axis of the bobbin 1210. In the first embodiment, the first surface 1241, the first protrusion 1213, the second groove 1232, the first groove 1231, and the second surface 1242 may be sequentially arranged in the radial direction of the central axis of the bobbin 1210. In the first embodiment, the first surface 1241, the first protrusion 1213, the second groove 1232, the second groove 1232, and the second surface 1242 may be sequentially arranged in the radial direction of the central axis of the bobbin 1210. In the first embodiment, the first surface 1241, the first protrusion 1213, the second groove 1232, the first groove 1231, and the second surface 1242 may be sequentially arranged in the radial direction of the central axis of the bobbin 1210. That is, in the first embodiment, only any one of the first groove 1231 and the second groove 1232 can be disposed or formed on the bobbin 1210.

The bobbin 1210 may include a hole 1211. The hole 1211 can penetrate the bobbin 1210 in the optical axis direction. The lens module can be accommodated in the hole 1211. For example, a thread corresponding to a thread formed on the outer circumferential surface of the lens module may be disposed on the inner circumferential surface of the bobbin 1210 forming the hole 1211.

The bobbin 1210 may include a coil coupling portion 1212. A coil 1220 may be coupled to the coil coupling portion 1212. The coil coupling portion 1212 may be disposed on the outer circumferential surface of the bobbin 1210. The coil coupling portion 1212 may include a groove formed by recessing a part of the outer side surface of the bobbin 1210. At this time, the coil 1220 can be accommodated in the groove of the coil coupling portion 1212. The coil coupling portion 1212 may be formed integrally with the outer circumferential surface of the bobbin 1210.

The bobbin 1210 may include a first protrusion 1213. The first protrusion 1213 may be disposed on the first surface 1241 of the bobbin 1210. The first protrusion 1213 may overlap with the upper plate 1110 of the cover 1100 in the first direction (optical axis direction). With this structure, when the bobbin 1210 moves in the first direction, the first protrusion 1213 of the bobbin 1210 can be in contact with the upper plate 1110 of the cover 1100. That is, the distance between the first protrusion 1213 of the bobbin 1210 and the upper plate 1110 of the cover 1100 can determine the upward moving distance of the bobbin 1210. At this time, the first protrusion 1213 may be referred to as a 'stopper'. In one example, the distance between the first protrusion 1213 of the bobbin 1210 and the cover 1100 may be 0.27 mm. At this time, the distance between the bobbin 1210 and the connecting portion 1513 of the upper elastic member 1510 may be 0.32 mm. The distance between the first protrusion 1213 of the bobbin 1210 and the cover 1100 may be 0.22 to 0.32 mm. In addition, the distance between the bobbin 1210 and the connecting portion 1513 of the upper elastic member 1510 may be 0.27 to 0.37 mm.

The bobbin 1210 may include a second protrusion 1214 and a third protrusion 1215 disposed on the first surface 1241 and spaced apart from each other. The bobbin 1210 may include a second protrusion 1214. The bobbin 1210 may include a third protrusion 1215. The second protrusion 1214 and the third protrusion 1215 may be disposed for coupling the upper elastic member 1510 and the bobbin 1210. The second protrusion 1214 may be disposed on the first surface 1241 of the bobbin 1210. The third protrusion 1215 may be disposed on the first surface 1241 of the bobbin 1210. The second protrusion 1214 and the third protrusion 1215 may be spaced apart from each other. The side surface of the second protrusion 1214 and the side surface of the third protrusion 1215 can be faced with each other. An inner side portion 1512 of the upper elastic member 1510 may be disposed between the second protrusion 1214 and the third protrusion 1215. At this time, an adhesive may be disposed on the second protrusion 1214, the third protrusion 1215, and the inner side portion 1512. The second protrusion 1214 and the third protrusion 1215 may have different shapes. The second protrusion 1214 may be disposed inside the inner side portion 1512 of the upper elastic member 1510 and the third protrusion 1215 may be disposed outside the inner side portion 1512 of the upper elastic member 1510.

The bobbin 1210 may include grooves 1231 and 1232. In the first embodiment, grooves of any one of the first groove 1231 and the second groove 1232 may be arranged. That is, either the first groove 1231 or the second groove 1232 may be omitted. The grooves 1231 and 1232 may be disposed adjacent to the first protrusion 1213. The grooves 1231 and 1232 may be disposed around the first protrusion 1213. The grooves 1231 and 1232 may be disposed adjacent to the first protrusion 1231. The grooves 1231 and 1232 may be disposed around the first protrusion 1213. The grooves 1231 and 1232 can capture foreign matters generated by the grinding of the first protrusion 1213 of the bobbin 1210. The grooves 1231 and 1232 may include a first groove 1231 and a second groove 1232. The grooves 1231 and 1232 may be disposed around at least a part of the surface (vertical surface) extending downward from the upper surface of the first surface 1241 and the first protrusion 1213. The vertical surface may connect the upper surface of the first surface 1241 and the first protrusion 1231 to the grooves 1231 and 1232. More specifically, the vertical surface may connect the first surface 1241 and the upper surface of the first protrusion 1231 to the fifth surface 1245 formed by the second groove 1232.

The bobbin 1210 may include a first groove 1231. The first groove 1231 may be disposed on the second surface 1242 of the bobbin 1210. At least a portion of the first groove 1231 may be disposed beside the first protrusion 1213. The first groove 1231 may be disposed around the first protrusion 1213. The first groove 1231 may be disposed adjacent to the first protrusion 1231. At least a portion of the first groove 1231 may be disposed around the first protrusion 1213. At least a part of the first groove 1231 may be overlapped with the coil 1220 in the first direction (optical axis direction). The first groove 1231 may be overlapped with the connecting portion 1513 of the upper elastic member 1510 in the first direction (optical axis direction). The first groove 1231 may be formed to have a shallower depth than the second groove 1232.

The bobbin 1210 may include a second groove 1232. The bobbin 1210 may include a second groove 1232 disposed in the first groove 1231 and recessed more than the first groove 1231. The second groove 1232 may be concavely formed downward in the first groove 1231. The second groove 1232 may be formed in the first groove 1231 at a depth deeper than the first groove 1231. The width of the second groove 1232 may be narrower than the width of the first groove 1231. One of the second grooves 1232 may be disposed in one of the first grooves 1231. For example, the second grooves 1232 may be provided in four and arranged in pairs in the four first grooves 1231. The first groove 1231 and the second groove 1232 may be disposed at the corners of the bobbin 1210 one by one. Alternatively, a plurality of second grooves 1232 may be disposed in a single first groove 1231 spaced apart from one another. At this time, the shape of the second groove 1232 may include a circular shape, a polygonal shape, or a closed curve shape. The first groove 1231 may be formed at a depth of 0.07 to 0.13 mm from the second surface 1242. The second groove 1231 may be formed at a depth of 0.25 to 0.35 mm from the second surface 1242.

The bobbin 1210 may include a first surface 1241. The first surface 1241 may face upward. The first surface 1241 may be part of the upper surface of the bobbin 1210. At least a portion of the first surface 1241 may be faced with the upper plate 1110 of the cover 1100. The first surface 1241 may be disposed above the second surface 1242. The first surface 1241 of the bobbin 1210 may be in contact with the inner circumferential surface of the bobbin 1210. The first surface 1241 may be disposed more inward than the second surface 1242.

The bobbin 1210 may include a second surface 1242. The second surface 1242 may face upward. Second surface 1242 may be a portion of the upper surface of bobbin 1210. The second surface 1242 may be disposed lower than the first surface 1241. The second surface 1242 of the bobbin 1210 may be in contact with the outer circumferential surface of the bobbin 1210. The second surface 1242 may be disposed more outer side than the first surface 1241.

The bobbin 1210 may include a third surface 1243. The third surface 1243 may be formed by the first protrusion 1213. The third surface 1243 may be the upper surface of the first protrusion 1213. The third surface 1243 may face upward. The third surface 1243 may be a portion of the upper surface of the bobbin 1210. The third surface 1243 may be disposed more upward than the first surface 1241. The third surface 1243 can be faced with the upper plate 1110 of the cover 1100. The third surface 1243 can be contact with the upper plate 1110 of the cover 1100 by the movement of the bobbin 1210.

The bobbin 1210 may include a fourth surface 1244. The fourth surface 1244 may be formed by the first groove 1231. The fourth surface 1244 may face upward. The fourth surface 1244 may be a portion of the upper surface of the bobbin 1210. The fourth surface 1244 may be disposed lower than the second surface 1242. The fourth surface 1244 may be disposed between the second surface 1242 and the third surface 1243.

The bobbin 1210 may include a fifth surface 1245. The fifth surface 1245 may be formed by the second groove 1232. The fifth surface 1245 may face upward. The fifth surface 1245 may be a portion of the upper surface of the bobbin 1210. The fifth surface 1245 may be disposed lower than the second surface 1242. The fifth surface 1245 may be disposed lower than the fourth surface 1244. The fifth surface 1245 may be disposed between the second surface 1242 and the third surface 1243. The fifth surface 1245 may be disposed between the third surface 1243 and the fourth surface 1244.

The first surface 1241, the second surface 1242, the third surface 1243, the fourth surface 1244, and the fifth surface 1245 may all be parallel. Alternatively, any two or more of the first surface 1241, the second surface 1242, the third surface 1243, the fourth surface 1244, and the fifth surface 1245 may be parallel. The upper surface of the bobbin 1210 may be formed by the first surface 1241, the second surface 1242, the third surface 1243, the fourth surface 1244, and the fifth surface 1245.

The lens driving device may include a dust trap 1600. The dust trap 1600 may be disposed on at least any one of the bottom surface (the fourth surface 1244 and the fifth surface 1245) of the grooves 1231 and 1232 and the side surface. The dust trap 1600 may have the effect of inhibiting the foreign matters captured in the grooves 1231 and 1232 of the bobbin 1210 from being re-scattered again. Dust trap 1600 may be viscous. However, the dust trap 1600 can be distinguished from a member such as grease (lubricant) applied between the bobbin 1210 and the lens. The dust trap 1600 may be disposed in the first groove 1231. In addition, the dust trap 1600 may be disposed in the second groove 1232. In addition, the dust trap 1600 may be disposed in both the first groove 1231 and the second groove 1232. The dust trap 1600 may be disposed on the fourth side 1244 of the bobbin 1210. The dust trap 1600 may be disposed on the fifth surface 1245 of bobbin 1210. The dust trap 1600 can be injected through the hole 1111 of the upper plate 1110 of the cover 1100 in a state in which the assembly of the lens driving device is completed.

The mover 1200 may include a coil 1220. The coil 1220 may be disposed on the bobbin 1210. The coil 1220 may be disposed between the bobbin 1210 and the housing 1310. The coil 1220 may be disposed on the outer peripheral surface of the bobbin 1210. The coil 1220 may be wound directly on the bobbin 1210. Alternatively, the coil 1220 may be coupled to the bobbin 1210 in a direct-wound state. The coil 1220 may be faced with the magnet 1320. The coil 1220 may be electromagnetically interacted with the magnet 1320. In this case, when a current is supplied to the coil 1220 and an electromagnetic field is formed around the coil 1220, the coil 1220 can move with respect to the magnet 1320 by the electromagnetic interaction between the coil 1220 and the magnet 1320. The coil 1220 may be integrally formed.

The coil 1220 may include a pair of lead wires (first and second lead wires) for power supply. At this time, one end (first lead wire) of the coil 1220 is coupled with the first lower elastic unit 1520a, and the other end (second lead wire) of the coil 1220 can be coupled with the second lower elastic unit 1520b. That is, the coil 1220 can be electrically connected to the lower elastic member 1520. More specifically, the coil 1220 can be sequentially supplied with current through the printed circuit board 1010 and the lower elastic member 1520.

The lens driving device may include a stator 1300. The stator 1300 may be fixed relative to the image sensor disposed on the printed circuit board 1010. The stator 1300 can move the mover 1200 through interaction. The stator 1300 can movably support the mover 1200. Hereinafter, the base 1400 is described as a separate structure from the stator 1300, however, the base 1400 may be understood as a separate structure from the stator 1300 and may be understood as one configuration of the stator 1300.

The stator 1300 may include a housing 1310. However, the housing 1310 may be omitted. In this case, the magnet 1320 can be coupled to the inner surface of the lateral plate 1120 of the cover 1100 with an adhesive. The housing 1310 may be disposed outside the bobbin 1210. The housing 1310 may accommodate at least a portion of the bobbin 1210. The housing 1310 may be disposed within the cover 1100. The housing 1310 may be disposed between the cover 1100 and the bobbin 1210. The housing 1310 may be formed of a material different from that of the cover 1100. The housing 1310 may be formed of an insulating material. The housing 1310 may be formed of an injection mold. A magnet 1320 may be disposed in the housing 1310. The housing 1310 and the magnet 1320 may be bonded together by an adhesive. An upper elastic member 1510 may be coupled to the upper surface or upper portion of the housing 1310. A lower elastic member 1520 may be coupled to a lower surface or a lower portion of the housing 1310. The housing 1310 may be coupled to the elastic member 1500 by thermal fusion welding and/or an adhesive. The housing 1310 may include four side portions and four corner portions disposed between the four side portions.

The housing 1310 may include a hole 1311. The hole 1311 may be formed in the housing 1310. The hole 1311 may be formed to penetrate the housing 1310 in the optical axis direction. A bobbin 1210 may be disposed in the hole 1311. The hole 1311 may be formed in a shape corresponding to the bobbin 1210 at least in part. The inner circumferential surface of the housing 1310 forming the hole 1311 may be spaced apart from the outer circumferential surface of the bobbin 1210.

The housing 1310 may include a magnet coupling portion 1312. A magnet 1320 may be coupled to the magnet coupling portion 1312. The magnet coupling portion 1312 may include a hole penetrating the side portion of the housing 1310. The magnet coupling portion 1312 may be formed on each of the two side portions of the housing 1310.

The housing 1310 may include an upper coupling portion 1313. The upper coupling portion 1313 may be disposed on the upper surface of the housing 1310. The upper coupling portion 1313 may include a protrusion protruding from the upper surface of the housing 1310. The protrusions of the upper coupling portion 1313 may be coupled by thermal fusion welding and/or an adhesive while being inserted into the holes of the upper elastic member 1510.

The stator 1300 may include a magnet 1320. The magnet 1320 may be disposed on the cover 1100. The magnet 1320 may be disposed on the inner surface of the lateral plate 1120 of the cover 1100. The magnet 1320 may be disposed in the housing 1310. The magnet 1320 may be fixed to the housing 1310 by an adhesive. The housing 1310 is omitted and the magnet 1320 can be coupled to the inner surface of the lateral plate 1120 of the cover 1100. The magnet 1320 may be disposed between the bobbin 1210 and the housing 1310. The magnet 1320 may be faced with the coil 1220. Magnet 1320 may electromagnetically interact with the coil 1220. The magnet 1320 can be used for AF driving. The magnet 1320 may be disposed on the side portion of the housing 1310. At this time, the magnet 1320 may be a flat plate magnet having a flat plate shape. Alternatively, the magnet 1320 may be disposed at the corner portion of the housing 1310 or at the corner portion of the cover 1100. At this time, the magnet 1320 may be a corner magnet in the shape of a hexahedron having an inner side surface wider than the outer side surface.

The lens driving device may include a base 1400. The base 1400 may be disposed below the bobbin 1210. The base 1400 may be disposed below the housing 1310. The base 1400 may be coupled with the cover 1100. The base 1400 may be disposed in the sensor base 1020. The base 1400 may be disposed on the printed circuit board 1010. Alternatively, the base 1400 may be disposed directly on the upper surface of the printed circuit board 1010.

The base 1400 may include a hole 1410. The hole 1410 may be formed at the center of the base 1400. The hole 1410 may be formed to penetrate the base 1400 in the optical axis direction. Light passing through the lens through the hole 1410 can be incident on the image sensor.

The base 1400 may include a terminal accommodating portion 1420. The terminal accommodating portion 1420 may be provided with a terminal portion 1524 of the lower elastic member 1520. The terminal accommodating portion 1420 may include a groove formed by recessing a portion of the side surface of the base 1400. The width of the terminal accommodating portion 1420 may be formed to correspond to the width of the terminal portion 1524 of the lower elastic member 1520.

The base 1400 may include a step portion 1430. The step portion 1430 may be formed on the side surface of the base 1400. The step portion 1430 can be formed around the outer circumferential surface of the base 1400. The step portion 1430 may be formed by protruding or recessing a portion of the side surface of the base 1400. The lower end of the lateral plate 1120 of the cover 1100 may be disposed on the step portion 1430.

The lens driving device may include an elastic member 1500. The elastic member 1500 may be coupled to the bobbin 1210 and the housing 1310. The elastic member 1500 can elastically support the bobbin 1210. The elastic member 1500 may have elasticity at least in part. The elastic member 1500 can movably support the bobbin 1210. The elastic member 1500 can support the movement of the bobbin 1210 during AF driving. At this time, the elastic member 1500 may be referred to as an 'AF supporting member'.

The elastic member 1500 may include an upper elastic member 1510. The upper elastic member 1510 may be coupled to the bobbin 1210 and the housing 1310. The upper elastic member 1510 may be coupled to the upper surface or the upper portion of the housing 1310 and the upper surface or the upper portion of the bobbin 1210. The upper elastic member 1510 may be integrally formed. The upper elastic member 1510 may be formed of a plate spring.

The upper elastic member 1510 includes an outer side portion 1511 coupled to the housing 1310, an inner side portion 1512 coupled to the bobbin 1210, and a connecting portion 1513 connecting the outer side portion 1511 and the inner side portion 1512.

The upper elastic member 1510 may include an outer side portion 1511. The outer side portion 1511 may be coupled to the housing 1310. The outer side portion 1511 may be coupled to the upper surface or the upper portion of the housing 1310. The outer side portion 1511 may include a hole or a groove which is coupled with the protrusion of the upper coupling portion 1313 of the housing 1310. The outer side portion 1511 may be fixed to the housing 1310 by an adhesive.

The upper elastic member 1510 may include an inner side portion 1512. A portion of the inner side portion 1512 may be disposed between the second protrusion 1214 and the third protrusion 1215 of the bobbin 1210. A portion of the inner side portion 1512 disposed between the second protrusion 1214 and the third protrusion 1215 can be fixed to the first surface 1241 of the bobbin 1210 by an adhesive. The inner side portion 1512 can be coupled to the bobbin 1210. The inner side portion 1512 can be coupled to the upper surface or the upper portion of the bobbin 1210. The inner side portion 1512 may include a hole or groove coupled to the protrusion of bobbin 1210. The inner side portion 1512 can be fixed to the bobbin 1210 by an adhesive.

The upper elastic member 1510 may include a connection portion 1513. The connecting portion 1513 can be faced with the grooves 1231 and 1232 of the bobbin 1210. The connecting portion 1513 may overlap the grooves 1231 and 1232 of the bobbin 1210 in the optical axis direction. There is a clearance between the connecting portion 1513 and the bobbin 1210, and a moving space of the connecting portion 1513 can be secured through the clearance. The connecting portion 1513 can connect the outer side portion 1511 and the inner side portion 1512. The connecting portion 1513 can elastically connect the outer side portion 1511 and the inner side portion 1512. The connecting portion 1513 may have elasticity. At this time, the connecting portion 1513 may be referred to as an 'elastic portion'. The connecting portion 1513 may be formed by bending two or more times.

The elastic member 1500 may include a lower elastic member 1520. The lower elastic member 1520 may be coupled to the bobbin 1210 and the housing 1310. The lower elastic member 1520 may be coupled to the lower surface or lower portion of the housing 1310 and the lower surface or lower portion of the bobbin 1210. The lower elastic member 1510 may be formed of a plate spring.

The lower elastic member 1520 may include first and second lower elastic units 1520a and 1520b that are spaced apart from each other. Each of the first and second lower elastic units 1520a and 1520b may be coupled with the coil 1220 by soldering. The first and second lower elastic units 1520a and 1520b may connect the printed circuit board 1010 and the coil 1220.

The lower elastic member 1520 may include an outer side portion 1521. The outer side portion 1521 can be coupled to the housing 1310. The outer side portion 1521 may be coupled to the lower surface or lower portion of the housing 1310. The outer side portion 1521 may include a hole or groove coupled to the protrusion of the housing 1310. The outer side portion 1521 can be fixed to the housing 1310 by an adhesive.

The lower elastic member 1520 may include an inner side portion 1522. The inner side portion 1522 can be coupled to the bobbin 1210. The inner side portion 1522 may be coupled to the lower surface or lower side of the bobbin 1210. The inner side portion 1522 may include a hole or groove coupled to the protrusion of the bobbin 1210. The inner side portion 1522 can be fixed to the bobbin 1210 by an adhesive.

The lower elastic member 1520 may include a connecting portion 1523. The connecting portion 1523 can connect the outer side portion 1521 and the inner side portion 1522. The connecting portion 1523 can elastically connect the outer portion 1521 and the inner side portion 1522. The connecting portion 1523 may have elasticity. At this time, the connecting portion 1523 may be referred to as an 'elastic portion'. The connecting portion 1523 may be formed by bending two or more times.

The lower elastic member 1520 may include a terminal portion 1524. The terminal portion 1524 may be extended from the outer side portion 1521. The terminal portion 1524 can be coupled to the printed circuit board 1010 by soldering. The terminal portion 1524 may be disposed in the terminal accommodating portion 1420 of the base 1400. The terminal portion 1524 may be formed integrally with the outer side portion 1521. Alternatively, the terminal portion 1524 may be formed as a separate member from the outer side portion 1521.

In the first embodiment, when an electric current is applied to the coil 1220 through the printed circuit board 1010 and the lower elastic member 1520, an electromagnetic field is generated around the coil 1220. In this case, the coil 1220, the bobbin 1210, and the lens move integrally by the interaction between the electromagnetic field of the coil 1220 and the electromagnetic field of the magnet 1320. Such movement of the lens corresponds to movement toward or away from the image sensor disposed on the printed circuit board 1010 along the optical axis direction. Therefore, in the first embodiment, focus adjustment can be performed by controlling the current supplied to the coil 1220.

In the first embodiment, the driving amount of the bobbin 1210 can be determined in the space between the stopper (the first protrusion 1213) located on the upper side of the bobbin 1210 and the inner wall of the cover 1100. The lens driving device of the first embodiment is an actuator applied to a dual camera module, and the cover 1100 is made of a non-magnetic material and may not include the shape of an inner yoke or the like and a structure corresponding thereto.

In the structure as in the first embodiment, foreign matters may be generated between the stoppers (first protrusion 1213) of the bobbin 1210 and the cover 1100. In the first embodiment, a primary foreign matter capturing grooves (second grooves 1232) may be located around the impact portion of the stopper (first protrusion 1213) of the bobbin 1210. In addition, the depth of a secondary foreign matter capturing grooves (first grooves 1231) may be further reduced compared to the primary foreign matter capturing grooves (second grooves 1232). That is, the bobbin 1210 may have grooves 1231 and 1232 of a double-stopper structure. A side wall may exist around the secondary foreign matter capturing grooves (first grooves 1231). That is, a triple-stopper structure may be formed in the bobbin 1210. Such a structure can have an effect of capturing foreign matters caused by impact and foreign matters being introduced upward. On the other hand, the coil 1220 can be directly wound under the side wall. The side wall may be disposed along the outer circumference of the bobbin 1210.

In the first embodiment, a dust trap solution agent may be sprayed around the capturing grooves 1231 and 1232. At this time, the dust trap solution agent may include an epoxy or the like. Through this, it may be expected that the effect that the captured foreign matters are not re-scattered again.

At least a part of the configurations in the first embodiment can be replaced with the configurations of the second to fourth embodiments which will be described later. In addition, the remaining configurations except for the detailed configuration of the bobbin 1210 having a structure for capturing the foreign matters and the like, or the detailed configuration corresponding thereto, may be replaced with the configurations of the second to fourth embodiments which will be described later.

Hereinafter, a configuration of the camera module according to the second embodiment will be described with reference to the drawings.

Figure 22:
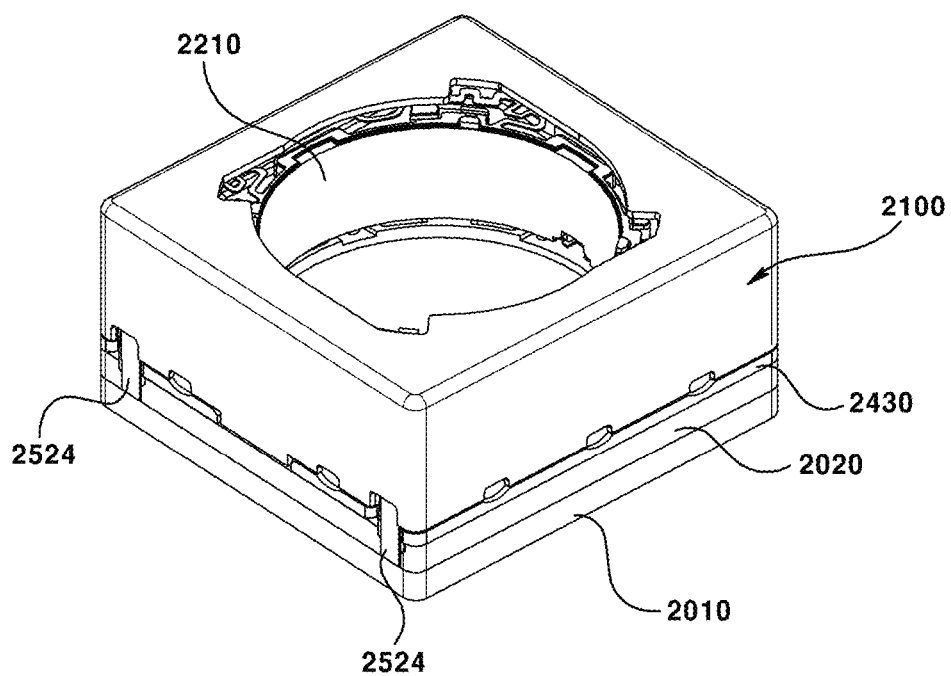
FIG. 22 is a perspective view of a part of the configuration of the camera module according to the second embodiment.
Figure 23:
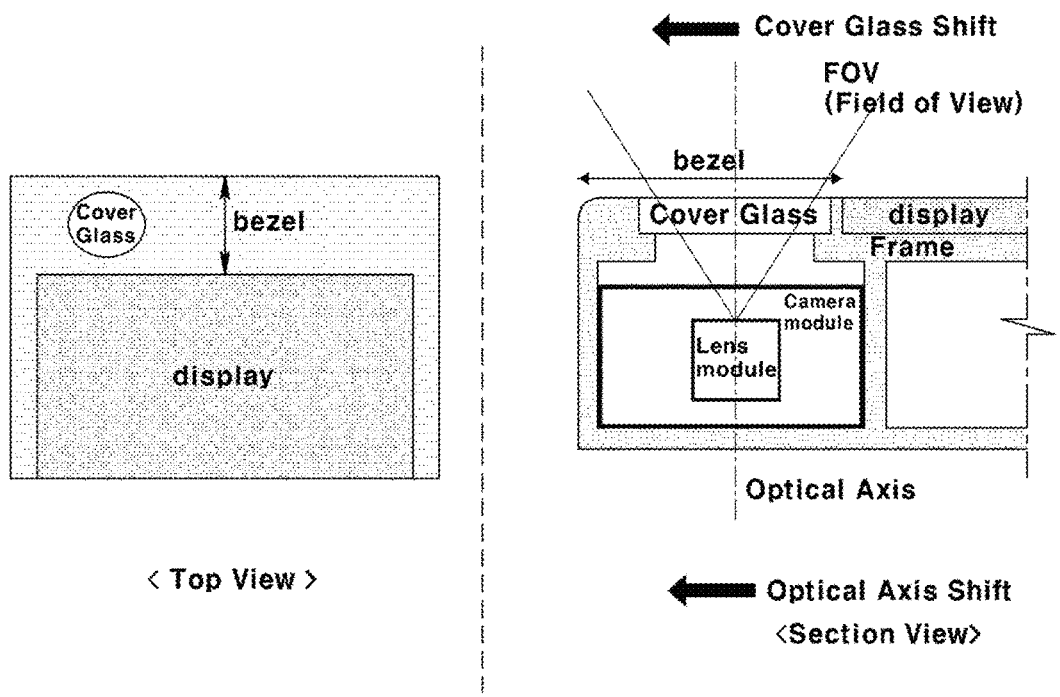
FIG. 23 is a conceptual view showing a method of reducing the bezel size of the optical device.

FIG. 22 is a perspective view of a part of the configuration of the camera module according to the second embodiment.

The camera module may include a lens module 2030. The lens module 2030 may include at least one lens. The lens module 2030 may include a lens and a barrel. The lens module 2030 can be coupled to the bobbin 2210 of the lens driving device. The lens module 2030 may be coupled to the bobbin 2210 by screw-coupling and/or adhesives. The lens module 2030 can move integrally with the bobbin 2210. The lens may be coupled to the bobbin 2210 and disposed above the image sensor.

The camera module may include a filter. The filter may include an infrared filter. The infrared filter can block the light of the infrared region from incidenting on the image sensor. An infrared filter may be disposed between the lens module 2030 and the image sensor. For example, the infrared filter may be disposed in a sensor base 2020 disposed between the lens driving device and the printed circuit board 2010. As a modified example, the infrared filter may be disposed in the base 2400.

The camera module may include a printed circuit board 2010. A lens driving device may be disposed on the printed circuit board 2010. At this time, the sensor base 2020 may be disposed between the printed circuit board 2010 and the lens driving device. The printed circuit board 2010 may be electrically connected to the lens driving device. An image sensor may be disposed on the printed circuit board 2010. The printed circuit board 2010 may be electrically connected to the image sensor.

The camera module may include an image sensor. The image sensor may be disposed on the printed circuit board 2010. The image sensor may be electrically connected to the printed circuit board 2010. As an example, the image sensor may be coupled to the printed circuit board 2010 by surface mounting technology (SMT). As another example, the image sensor may be coupled to the printed circuit board 2010 by a flip chip technique. The image sensor can be arranged so that the lens and the optical axis coincide. That is, the optical axis of the image sensor and the optical axis of the lens can be aligned. The image sensor can convert the light irradiated to the effective image area of the image sensor into an electrical signal. The image sensor may be any one of a charge coupled device (CCD), a metal oxide semiconductor (MOS), a CPD, and a CID.

The camera module may include a control unit. The control unit may be disposed on the printed circuit board 2010. The control unit can control the direction, intensity, amount and/or amplitude of the current supplied to a coil 2220 of the lens driving device. The control unit controls the lens driving device to perform the autofocus function and/or the optical image stabilization function. Furthermore, the control unit may perform autofocus feedback control and/or optical image stabilization feedback control on the lens driving device. More specifically, the control unit can detect the position of the lens and/or the bobbin 2210 in real time with the sensor, and control the current applied to the coil 2220 to move the lens to a more accurate position. That is, the controller senses the position of the bobbin 2210, and based on this, it can reposition the bobbin 2210.

Hereinafter, the configuration of the lens driving device according to the second embodiment will be described with reference to the drawings.

Figure 11:
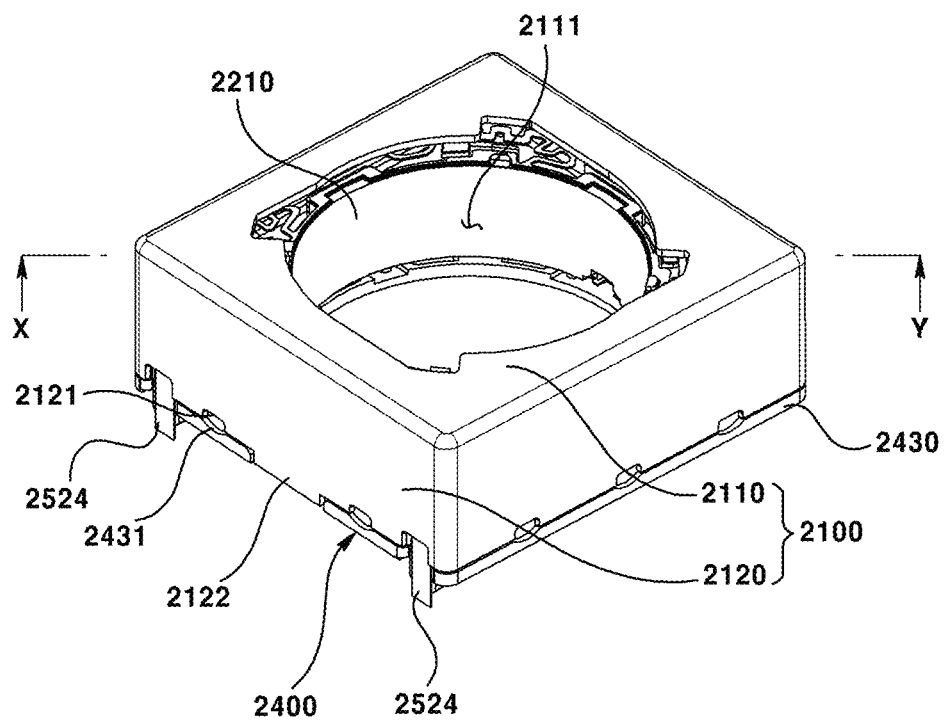
FIG. 11 is a perspective view of the lens driving device according to the second embodiment.
Figure 12:
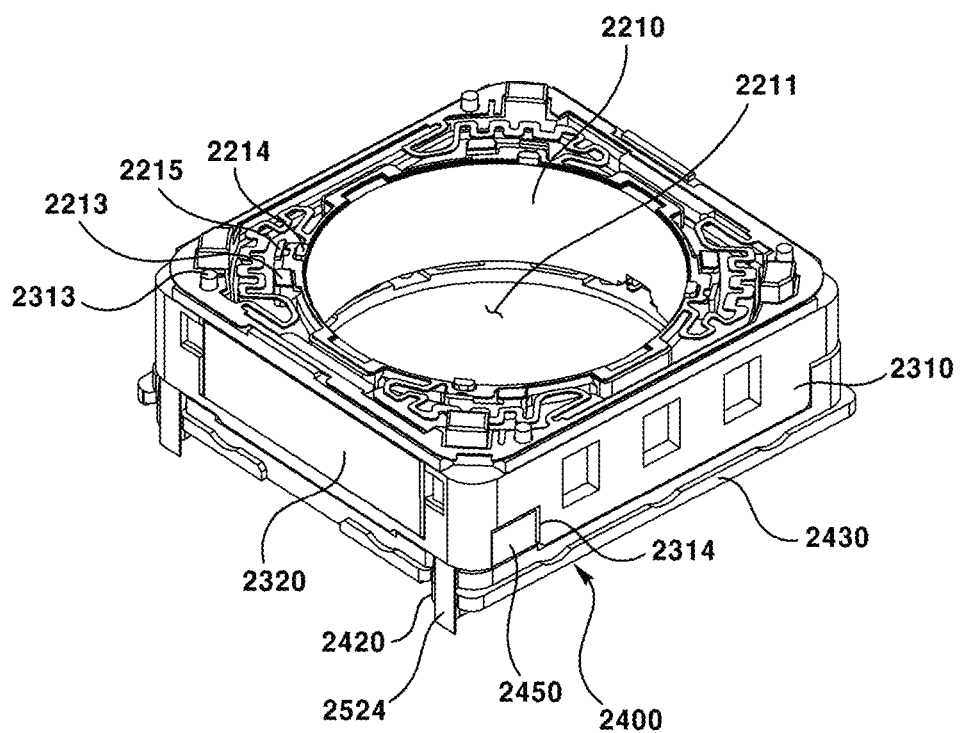
FIG. 12 is a perspective view showing a state in which the cover is omitted in FIG. 11.
Figure 13:
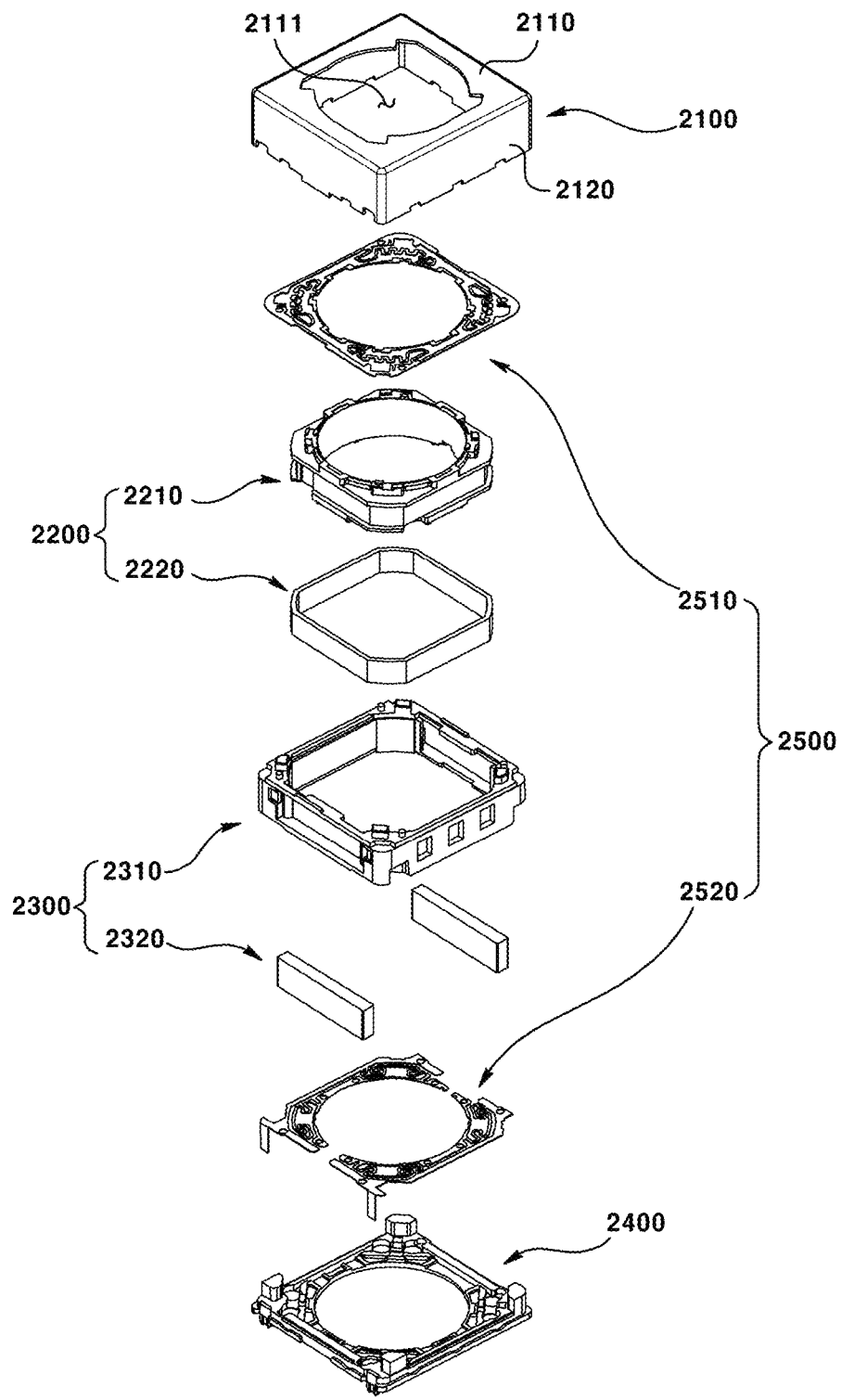
FIG. 13 is an exploded perspective view of the lens driving device according to the second embodiment.
Figure 14:
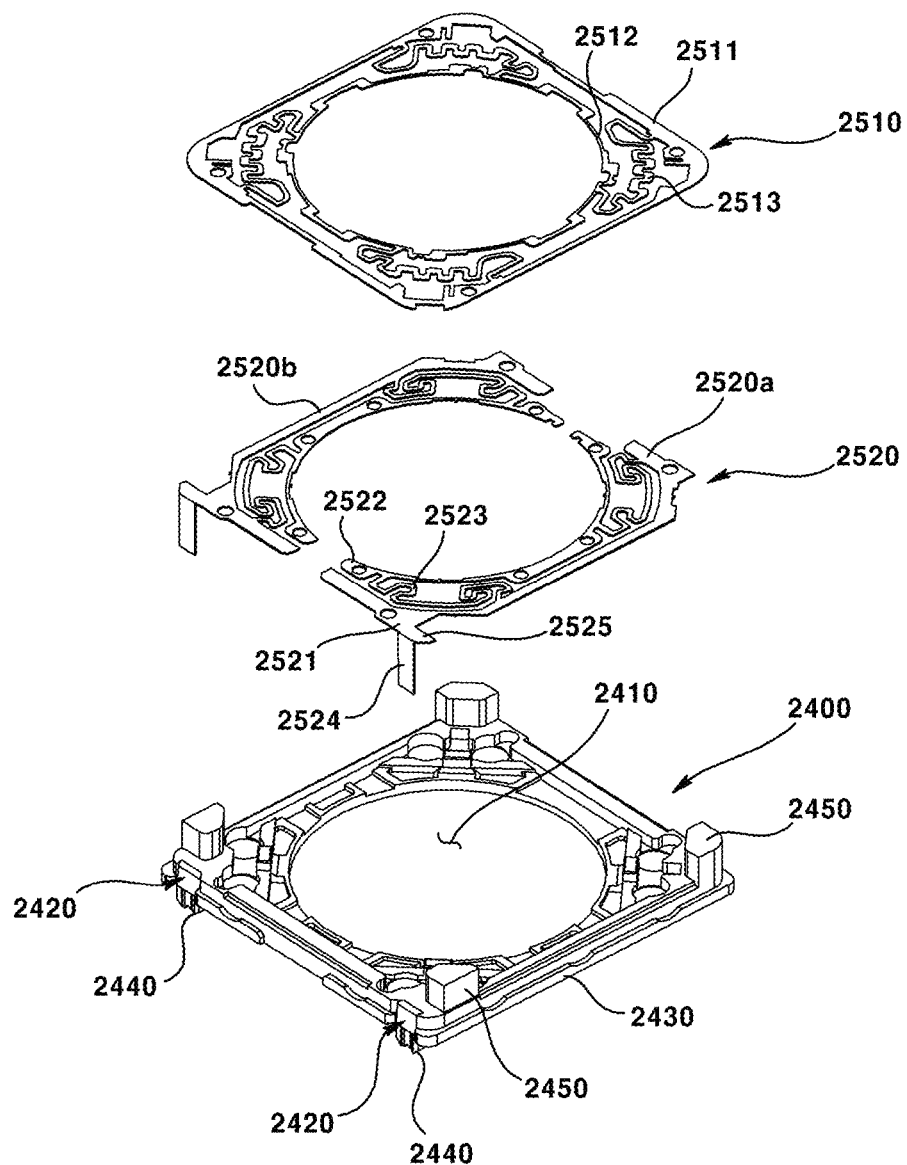
FIG. 14 is an exploded perspective view of a part of the configuration of the lens driving device according to the second embodiment.
Figure 15:
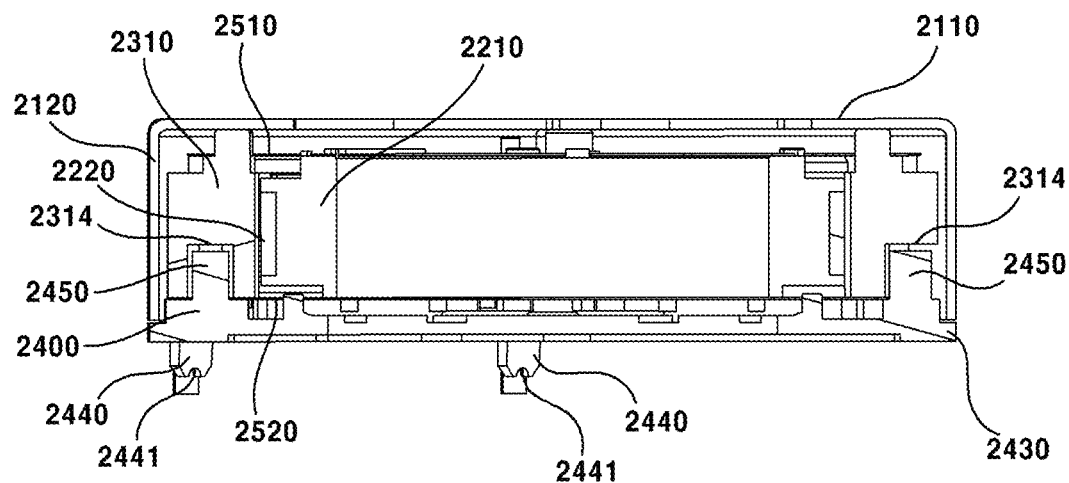
FIG. 15 is a cross-sectional view taken along the line X-Y in FIG. 11.
Figure 16:
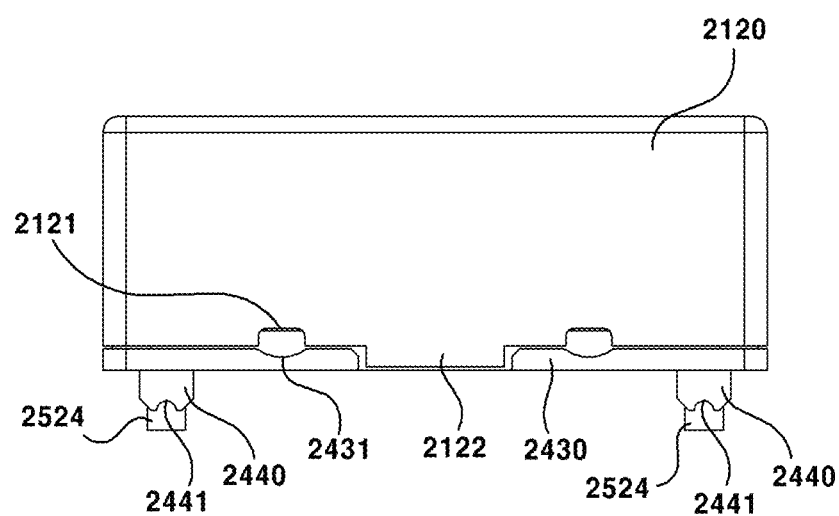
FIG. 16 is a side view of the lens driving device according to the second embodiment.
Figure 17:
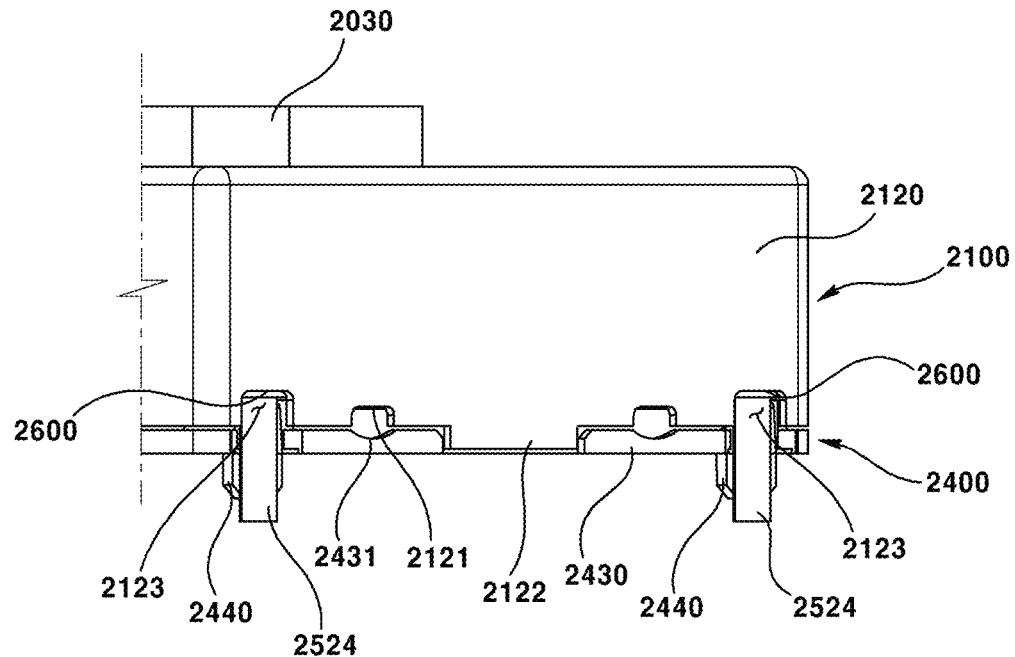
FIG. 17 is a view of a part of a lens driving device to which a lens is coupled.
Figure 18:
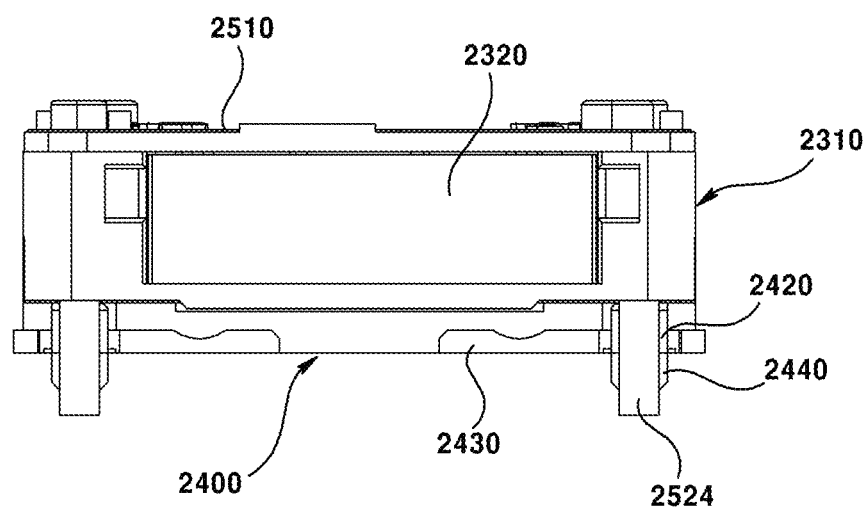
FIG. 18 is a side view of the lens driving device according to the second embodiment with the cover omitted.
Figure 19:
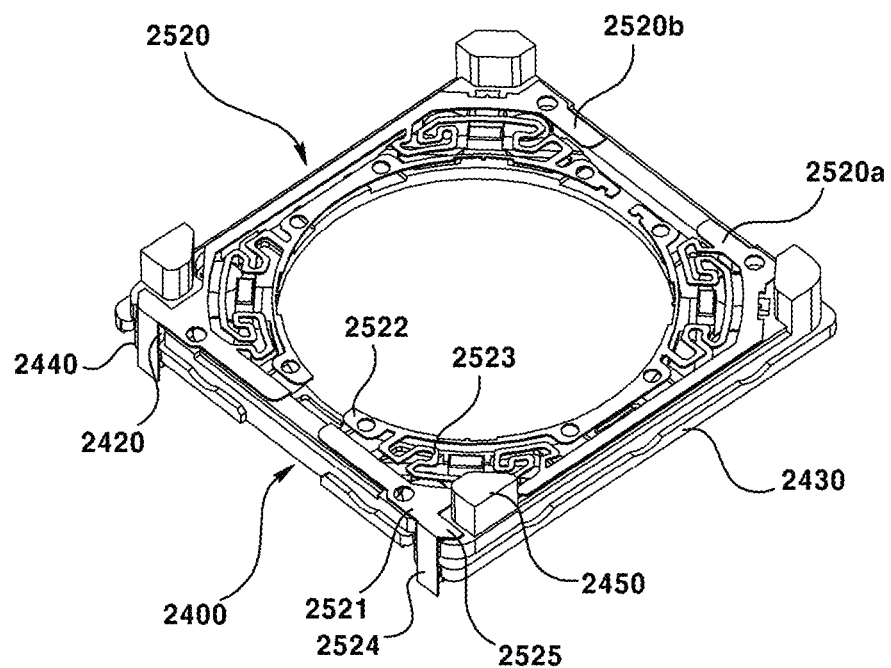
FIG. 19 is a perspective view of a part of the configuration of the lens driving device according to the second embodiment.
Figure 20:
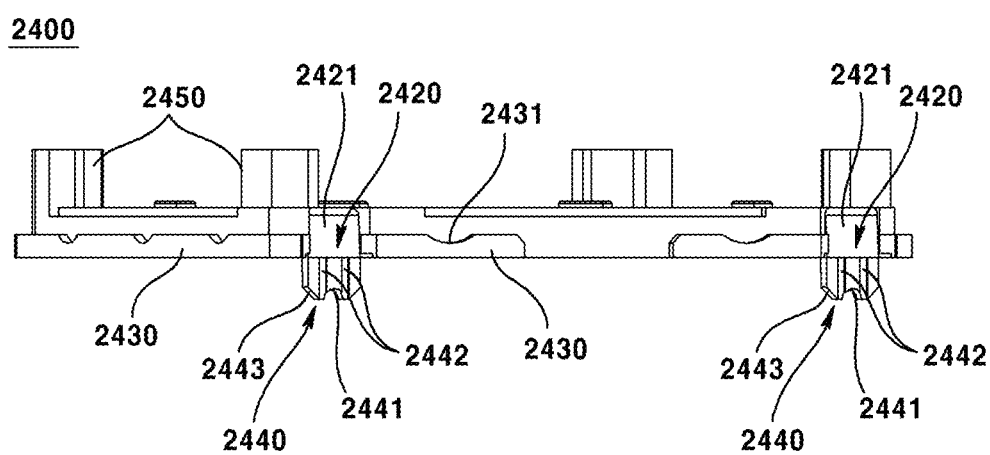
FIG. 20 is a view of the base of the lens driving device according to the second embodiment.
Figure 21:
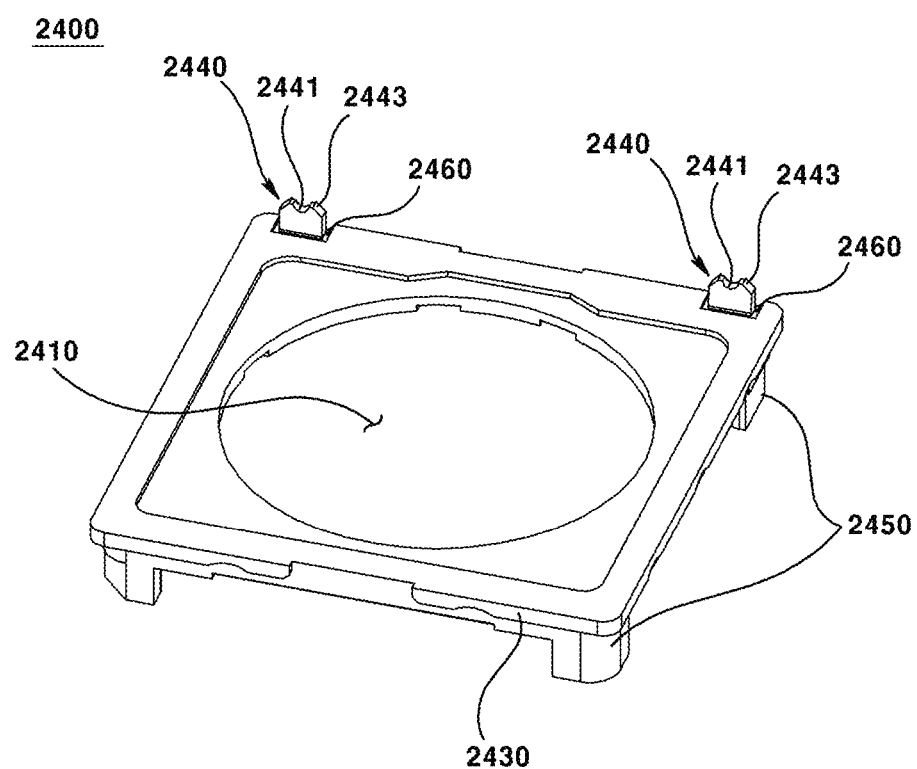
FIG. 21 is a bottom perspective view of the base of the lens driving device according to the second embodiment.

FIG. 11 is a perspective view of the lens driving device according to the second embodiment; FIG. 12 is a perspective view showing a state in which the cover is omitted in FIG. 11; FIG. 13 is an exploded perspective view of the lens driving device according to the second embodiment; FIG. 14 is an exploded perspective view of a part of the configuration of the lens driving device according to the second embodiment; FIG. 15 is a cross-sectional view taken along the line X-Y in FIG. 11; FIG. 16 is a side view of the lens driving device according to the second embodiment; FIG. 17 is a view of a part of a lens driving device to which a lens is coupled; FIG. 18 is a side view of the lens driving device according to the second embodiment with the cover omitted; FIG. 19 is a perspective view of a part of the configuration of the lens driving device according to the second embodiment; FIG. 20 is a view of the base of the lens driving device according to the second embodiment; and FIG. 21 is a bottom perspective view of the base of the lens driving device according to the second embodiment.

The lens driving device may be a voice coil motor (VCM). The lens driving device can move the bobbin 2210 in the optical axis direction. The lens driving device can move the bobbin 2210 in a direction perpendicular to the optical axis.

The lens driving device may include a cover 2100. The cover 2100 may be non-magnetic. The cover 2100 may not include a configuration corresponding to an inner yoke. That is, the distance of the upward movement of the bobbin 2210 can be limited by the distance between the cover 2100 and the first protrusion 2213 of the bobbin 2210. The cover 2100 may be coupled to the base 2400. The cover 2100 can accommodate a housing 2310 therein. The cover 2100 can form the appearance of the lens driving device. The cover 2100 may be in the form of a hexahedron with a bottom open. The cover 2100 may be formed of a metal material. At this time, the cover 2100 may be called as a 'cover can'. The cover 2100 may be formed by bending a metal plate material. The cover 2100 may be connected to the ground portion of the printed circuit board 2010. Through this, the cover 2100 can be grounded (earthed). The cover 2100 may block electromagnetic interference (EMI). At this time, the cover 2100 may be referred to as an 'EMI shield can'.

The cover 2100 may include an upper plate 2110. The cover 2100 may include a lateral plate 2120. The cover 2100 may include an upper plate 2110 and a lateral plate 2120 extending from the upper plate 2110. The cover 2100 may include an upper plate 2110 and a lateral plate 2120 extending downward from the outer circumference or edge of the upper plate 2110. The lower end of the lateral plate 2120 of the cover 2100 may be disposed at a step portion 2430 of the base 2400. The inner surface of the lateral plate 2120 of the cover 2100 can be coupled to the base 2400 by an adhesive.

The upper plate 2110 may include a hole 2111. The hole 2111 may be formed in the upper plate 2110 of the cover 2100. The hole 2111 may expose the lens upward, but is not limited thereto. The size of the hole 2111 may be larger than the diameter of the lens module so that the lens module can be inserted and assembled through the hole 2111. The light introduced through the hole 2111 can pass through the lens. At this time, the light passing through the lens can be converted into an electrical signal in the image sensor and can be obtained as an image. An adhesive for fixing the bobbin 2210 and the inner side portion 2512 of the upper elastic member 2510 through the hole 2111 can be injected.

The lateral plate 2120 may include a groove 2121 (hereinafter referred to as a 'sixth groove') formed in the lower surface of the lateral plate 2120. The groove 2121 of the lateral plate 2120 may be disposed at a position corresponding to the groove 2431 of the step portion 2430 of the base 2400. An adhesive may be applied between the groove 2121 of the lateral plate 2120 and the groove 2431 of the base 2400.

The lateral plate 2120 may include a protrusion 2122 projecting from the lower end of the lateral plate 2120. At this time, the base 2400 may include a shape corresponding to the protrusion 2122. More specifically, in the portion corresponding to the protrusion 2122 of the lateral plate 2120, the stepped portion 2430 of the base 2400 can be omitted. An adhesive may be disposed between the protrusion 2122 of the lateral plate 2120 and the outer side surface of the base 2400. That is, the protrusion 2122 of the lateral plate 2120 can be fixed to the base 2400 by an adhesive.

The lateral plate 2120 may include an avoidance groove 2123 (hereinafter referred to as a 'seventh groove') concavely formed upward at the lower end of the lateral plate 2120. The avoidance groove 2123 may be disposed at a position corresponding to a terminal portion 2524. An adhesive 2600 for fixing the terminal portion 2524 can be applied to the periphery of the avoidance groove 2123. At least a portion of the terminal portion 2524 can be exposed to the outside through the avoidance groove 2123. Due to the avoidance groove 2123, a phenomenon in which the metal cover 2100 and the terminal portion 2524 come into contact with each other, thereby causing a short may also be inhibited.

The lens driving device may include a mover 2200. The mover 2200 can be coupled with the lens. The mover 2200 can move integrally with the lens. The mover 2200 can be moved through interaction with a stator 2300. The mover 2200 can be moved during AF driving. At this time, the mover 2200 may be referred to as an 'AF mover'.

The mover 2200 may include a bobbin 2210. The bobbin 2210 may be disposed inside the housing 2310. The bobbin 2210 may be disposed within the cover 2100. The bobbin 2210 may be arranged to move in a first direction. At this time, the first direction may be the optical axis direction. The bobbin 2210 may be disposed in the hole 2311 of the housing 2310. The bobbin 2210 may be movably coupled to the housing 2310. The bobbin 2210 can move in the direction of the optical axis with respect to the housing 2310. A lens may be coupled to the bobbin 2210. The bobbin 2210 and the lens can be coupled by a screw-coupling and/or an adhesive. A coil 2220 may be coupled to the bobbin 2210. An upper elastic member 2510 may be coupled to the upper surface or upper portion of the bobbin 2210. A lower elastic member 2520 may be coupled to a lower surface or a lower portion of the bobbin 2210. The bobbin 2210 may be coupled to an elastic member 2500 by thermal fusion welding and/or an adhesive.

The bobbin 2210 may include a hole 2211. The hole 2211 can penetrate the bobbin 2210 in the optical axis direction. The lens module can be accommodated in the hole 2211. For example, a thread corresponding to a thread formed on the outer circumferential surface of the lens module may be disposed on the inner circumferential surface of the bobbin 2210 wherein the hole 2211 is formed.

The bobbin 2210 may include a coil coupling portion 2212. A coil 2220 may be coupled to the coil coupling portion 2212. The coil coupling portion 2212 may be disposed on the outer circumferential surface of the bobbin 2210. The coil coupling portion 2212 may include a groove formed by recessing a portion of the outer side surface of the bobbin 2210. At this time, the coil 2220 can be accommodated in the groove of the coil coupling portion 2212. The coil coupling portion 2212 may be integrally formed with the outer circumferential surface of the bobbin 2210.

The bobbin 2210 may include a first protrusion 2213. The first protrusion 2213 may be disposed on the upper surface of the bobbin 2210. The first protrusion 2213 may be overlapped with the upper plate 2110 of the cover 2100 in a first direction (optical axis direction). With this structure, when the bobbin 2210 moves in the first direction, the first protrusion 2213 of the bobbin 2210 can contact the upper plate 2110 of the cover 2100. That is, the distance between the first protrusion 2213 of the bobbin 2210 and the upper plate 2110 of the cover 2100 can determine the upward moving distance of the bobbin 2210. At this time, the first protrusion 2213 may be referred to as a 'stopper'.

The bobbin 2210 may include a second protrusion 2214 and a third protrusion 2215 disposed on the upper surface of the bobbin 2210 and spaced apart from each other. The bobbin 2210 may include a second protrusion 2214. The bobbin 2210 may include a third protrusion 2215. The second protrusion 2214 and the third protrusion 2215 may be disposed for coupling the upper elastic member 2510 and the bobbin 2210. The second protrusion 2214 may be disposed on the upper surface of the bobbin 2210. The third protrusion 2215 may be disposed on the upper surface of the bobbin 2210. The second protrusion 2214 and the third protrusion 2215 may be spaced apart from each other. The side surface of the second protrusion 2214 and the side surface of the third protrusion 2215 can be opposed to each other. An inner side portion 2512 of the upper elastic member 2510 may be disposed between the second protrusion 2214 and the third protrusion 2215. At this time, an adhesive may be disposed on the second protrusion 2214, the third protrusion 2215, and the inner side portion 2512. The second protrusion 2214 and the third protrusion 2215 may have different shapes. The second protrusion 2214 may be disposed inside the inner side portion 2512 of the upper elastic member 2510 and the third protrusion 2215 may be disposed outside the inner side portion 2512 of the upper elastic member 2510.

The mover 2200 may include a coil 2220. The coil 2220 may be disposed on the bobbin 2210. The coil 2220 may be disposed between the bobbin 2210 and the housing 2310. The coil 2220 may be disposed between the lateral plate 2120 of the cover 2100 and the bobbin 2210. The coil 2220 may be disposed on the outer circumferential surface of the bobbin 2210. The coil 2220 may be wound directly on the bobbin 2210. Alternatively, the coil 2220 may be coupled to the bobbin 2210 in a direct-wound state. The coil 2220 can face the magnet 2320. The coil 2220 may electromagnetically interact with the magnet 2320. In this case, when an electric current is supplied to the coil 2220 and an electromagnetic field is formed around the coil 2220, the coil 2220 can be moved with respect to the magnet 2320 by the electromagnetic interaction between the coil 2220 and the magnet 2320. The coil 2220 may be integrally formed.

The coil 2220 may include a pair of lead wires (first and second lead wires) for supplying power. At this time, one end (first lead wire) of the coil 2220 is coupled to a first lower elastic unit 2520a and the other end (second lead wire) of the coil 2220 may be coupled to a second lower elastic unit 2520b. That is, the coil 2220 can be electrically connected to the lower elastic member 2520. More specifically, the coil 2220 can be sequentially supplied with current through the printed circuit board 2010 and the lower elastic member 2520.

The lens driving device may include a stator 2300. The stator 2300 may be fixed with respect to the image sensor disposed on the printed circuit board 2010. The stator 2300 can move the mover 2200 through interaction. The stator 2300 can movably support the mover 2200. Hereinafter, the base 2400 will be described as a separate structure from the stator 2300, however, the base 2400 may be understood as a separate structure from the stator 2300 or may be understood as one configuration of the stator 2300.

The stator 2300 may include a housing 2310. However, the housing 2310 may be omitted. In this case, the magnet 2320 can be coupled to the inner surface of the lateral plate 2120 of the cover 2100 with an adhesive. The housing 2310 may be disposed outside the bobbin 2210. The housing 2310 can accommodate at least a portion of the bobbin 2210. The housing 2310 may be disposed within the cover 2100. The housing 2310 may be disposed between the cover 2100 and the bobbin 2210. The housing 2310 may be formed of a material different from that of the cover 2100. The housing 2310 may be formed of an insulating material. The housing 2310 may be formed of an injection molding. A magnet 2320 may be disposed in the housing 2310. The housing 2310 and the magnet 2320 may be coupled together by an adhesive. An upper elastic member 2510 may be coupled to the upper surface or upper portion of the housing 2310. A lower elastic member 2520 may be coupled to a lower surface or a lower portion of the housing 2310. The housing 2310 may be coupled to the elastic member 2500 by thermal fusion welding and/or adhesive. The housing 2310 may include four sides and four corner portions disposed between the four side portions.

The housing 2310 may include a hole 2311. The hole 2311 may be formed in the housing 2310. The hole 2311 may be formed to penetrate the housing 2310 in the direction of the optical axis. A bobbin 2210 may be disposed in the hole 2311. The hole 2311 may be formed in a shape corresponding to the bobbin 2210 at least in part. The inner circumferential surface of the housing 2310 forming the hole 2311 may be spaced apart from the outer circumferential surface of the bobbin 2210.

The housing 2310 may include a magnet coupling portion 2312. A magnet 2320 may be coupled to the magnet coupling portion 2312. The magnet coupling portion 2312 may include a hole that penetrates through the side portion of the housing 2310. The magnet coupling portion 2312 may be formed on each of the two side portions of the housing 2310.

The housing 2310 may include an upper coupling portion 2313. The upper coupling portion 2313 may be disposed on the upper surface of the housing 2310. The upper coupling portion 2313 may include a protrusion protruding from the upper surface of the housing 2310. The protrusions of the upper coupling portion 2313 may be coupled by thermal fusion welding and/or adhesive while being inserted into the holes of the upper elastic member 2510.

The stator 2300 may include a magnet 2320. The magnet 2320 may be disposed on the cover 2100. The magnet 2320 may be disposed on the inner surface of the lateral plate 2120 of the cover 2100. The magnet 2320 may be disposed between the lateral plate 2120 of the cover 2100 and the bobbin 2210. The magnet 2320 may be disposed in the housing 2310. The magnet 2320 can be fixed to the housing 2310 by an adhesive. The housing 2310 is omitted and the magnet 2320 can be coupled to the inner surface of the lateral plate 2120 of the cover 2100. The magnet 2320 may be disposed between the bobbin 2210 and the housing 2310. The magnet 2320 can be faced with the coil 2220. Magnet 2320 may electromagnetically interact with coil 2220. The magnet 2320 can be used for AF driving. The magnet 2320 may be disposed on the side portion of the housing 2310. At this time, the magnet 2320 may be a flat plate magnet having a flat plate shape. As a modified example, the magnet 2320 may be disposed at the corner portion of the housing 2310 or at the corner portion of the cover 2100. At this time, the magnet 2320 may be a corner magnet in the shape of a hexahedron having an inner side surface wider than the outer side surface.

The lens driving device may include a base 2400. The base 2400 may be disposed under the bobbin 2210. The base 2400 may be disposed under the housing 2310. The base 2400 can be coupled with the lateral plate 2120 of the cover 2100. The base 2400 may be disposed in the sensor base 2020. At this time, the base 2400 may include a protruded portion 2440, and the sensor base 2020 may include a shape corresponding to the protruded portion 2440. That is, the sensor base 2020 may include a groove that accommodates at least a portion of the protruded portion 2440. The sensor base 2020 may be formed and coupled on the lower surface of the base 2400. The sensor base 2020 can support the lower surface of the base 2400. The upper surface of the sensor base 2020 and the lower surface of the base 2400 can be in contact with each other. The base 2400 may be disposed on the printed circuit board 2010. As a modified example, the base 2400 may be disposed directly on the upper surface of the printed circuit board 2010. In the second embodiment, the inner side surface of the portion of the terminal portion 2524 protruding lower than the protruded portion 2440 can be supported by the sensor base 2020.

The base 2400 may include a hole 2410. The hole 2410 may be formed at the center of the base 2400. The hole 2410 may be formed to penetrate the base 2400 in the optical axis direction. Light passing through the lens through the hole 2410 can be incident on the image sensor.

The base 2400 may include a terminal accommodating groove 2420 (hereinafter referred to as a 'third groove'). The terminal accommodating groove 2420 may be provided with a terminal portion 2524 of the lower elastic member 2520. The terminal accommodating groove 2420 may be recessed inward on the side surface of the base 2400. The terminal accommodating groove 2420 may be formed by recessing a portion of the side surface of the base 2400. The width of the terminal accommodating groove 2420 may be formed corresponding to the width of the terminal portion 2524 of the lower elastic member 2520. The terminal accommodating groove 2420 may include an outer side surface (hereinafter referred to as a fourth surface) which faces the terminal portion 2524. At this time, the outer side surface (fourth surface) of the terminal accommodating groove 2420 may include an inclined surface 2421 (hereinafter referred to as a 'first inclined surface') forming an obtuse angle with the upper surface of the base 2400 have. Since the outer side surface of the terminal accommodating groove 2420 is formed as the inclined surface 2421 in the second embodiment, the terminal 2524 is inhibited from being deformed by being interfered with the base 2400 in the process of assembling the terminal portion 2524 to the base 2400. The inclined surface 2421 can guide the lower end of the terminal portion 2524 in the process of assembling the terminal portion 2524 to the base 2400. That is, the lower end of the terminal portion 2524 can slide along the inclined surface 2421. With this structure, deformation of the terminal portion 2524, which may occur in the process of assembling the base 2400 and the terminal portion 2524, can be inhibited.

The base 2400 may include a step portion 2430. The step portion 2430 may be formed on the side surface of the base 2400. The step portion 2430 may be disposed on the outer circumferential surface of the base 2400. The step portion 2430 can be formed around the outer circumferential surface of the base 2400. The step portion 2430 may be formed by protruding or recessing a portion of the side surface of the base 2400. A lower end of the lateral plate 2120 of the cover 2100 may be disposed on the step portion 2430.

The step portion 2430 may include a groove 2431 (hereinafter, may be referred to as a 'fifth groove') disposed on the upper surface of the step portion 2430. The groove 2431 of the step portion 2430 may be disposed at a position corresponding to the groove 2121 of the lateral plate 2120 of the cover 2100.

The base 2400 may include a protruded portion 2440. The protruded portion 2440 may be referred to as a 'guide wall'. The protruded portion 2440 can be protruded from the lower surface of the base 2400. The protruded portion 2440 may include a first surface facing the terminal portion 2524. The protruded portion 2440 may include a second surface disposed opposite the first surface. The protruded portions 2440 may be provided in two. The two protruded portions 2440 may be spaced apart from each other. Two terminal portions 2524 can be arranged in pairs in the two protruded portions 2440. The protruded portion 2440 can support the inner surface of the terminal portion 2524. Through this, the occurrence of warpage of the terminal portion 2524 in the inward direction of the base 2400 due to an impact or the like can be inhibited.

In the second embodiment, the lower end of the first surface (outer side surface) of the protruded portion 2440 may be disposed above the lower end of the terminal portion 2524 at least in part. With this structure, at least a portion of the inner side surface of the terminal portion 2524 can be exposed to the inside. An adhesive may be applied to the exposed portion of the inner side surface of the terminal portion 2524, and the applied adhesive may flow between the terminal portion 2524 and the protruded portion 2440.

The protruded portion 2440 may include an injection groove 2441 (hereinafter referred to as a 'first groove'). The injection groove 2441 may be concavely formed upward on the lower surface of the protruded portion 2440. The injection groove 2441 may be extended from the first surface to the second surface. The injection groove 2441 may be extended from the first surface to the second surface in a predetermined shape. The injection groove 2441 may be disposed above the lower end of the terminal portion 2524. The injection groove 2441 may be formed in the shape of a semicircle. The adhesive may be injected into the injection groove 2441 between the protruded portion 2440 and the terminal portion 2524 through the structure described in the second embodiment.

The protruded portion 2440 may include a guide groove 2442 (hereinafter referred to as a 'second groove'). The guide groove 2442 may be disposed on the first surface (the surface facing the terminal portion 2524) of the protruded portion 2440. The guide groove 2442 may be extended in the longitudinal direction of the third surface (the surface facing the first surface of the protruded portion 2440) of the terminal portion 2524. That is, the guide groove 2442 can be extended in the vertical direction. The guide groove 2442 may be extended in the longitudinal direction of the first surface of the protruded portion 2440. The guide groove 2442 can be extended in the direction of the optical axis. A total of four guide grooves 2442 may be disposed two per each of the two protruded portions 2440.

The protruded portion 2440 may include an inclined surface 2443 (hereinafter referred to as a 'second inclined surface'). The lower surface of the protruded portion 2440 may include a curved surface formed by the injection groove 2441. The lower surface of the protruded portion 2440 may include an inclined surface 2443 disposed on both sides of the curved surface of the injection groove 2441. The inclined surface 2443 may be formed so that the length of the protruded portion 2440 from the lower surface of the base 2400 becomes shorter as the distance from the injection groove 2441 increases. The base 2400 may be disposed in the sensor base 2020 and the sensor base 2020 may include a shape corresponding to the protruded portions 2440. The sensor base 2020 may include a shape corresponding to the injection groove 2441 and the slope 2443 of the protruded portion 2440.

The base 2400 may include pillar portions 2450. The base 2400 may include four pillar portions 2450 protruded from the upper surface of the base 2400. At this time, the housing 2310 may include four accommodating portions 2314 that respectively accommodate the four pillar portions 2450 of the base 2400. That is, the four pillar portions 2450 of the base 2400 can be paired and coupled with the four accommodating portions 2314 of the housing 2310 The two pillar portions 2450 of the four pillar portions 2450 may be spaced apart from the outer side surface of the base 2400. At this time, a coupling portion 2525 of the lower elastic member 2520 may be disposed in the clearance between the two pillar portions 2450 and the outer side surface of the base 2400.

The base 2400 may include an accommodating groove 2460 (hereinafter referred to as a 'fourth groove'). The accommodating groove 2460 may be disposed on the lower surface of the base 2400. The accommodating groove 2460 can cover the protruded portion 2440. The accommodating groove 2460 may be formed around the protruded portion 2440. The accommodating groove 2460 may be formed by a groove digging structure on the lower surface of the base 2400. The accommodating groove 2460 inhibits the excessively coated bond (adhesive) from overflowing to the mounting surface of the base 2400 and the housing 2310. That is, the accommodating groove 2460 functions as a reservoir (tank) of the excessively applied bond.

The lens driving device may include an elastic member 2500. The elastic member 2500 may be coupled to the bobbin 2210 and the housing 2310. The elastic member 2500 can elastically support the bobbin 2210. The elastic member 2500 may have elasticity at least in part. The elastic member 2500 can movably support the bobbin 2210. The elastic member 2500 can support the movement of the bobbin 2210 during AF driving. At this time, the elastic member 2500 may be referred to as an 'AF supporting member'.

The elastic member 2500 may include an upper elastic member 2510. The upper elastic member 2510 may be coupled to the bobbin 2210 and the housing 2310. The upper elastic member 2510 may be coupled to an upper surface or upper portion of the housing 2310 and an upper surface or upper portion of the bobbin 2210. The upper elastic member 2510 may be integrally formed. The upper elastic member 2510 may be formed of a plate spring.

The upper elastic member 2510 includes an outer side portion 2511 coupled to the housing 2310, an inner side portion 2512 coupled to the bobbin 2210, and a connecting portion 2513 connecting the outer side portion 2511 and the inner side portion 2512.

The upper elastic member 2510 may include an outer side portion 2511. The outer side portion 2511 can be coupled to the housing 2310. The outer side portion 2511 may be coupled to the upper surface or the upper portion of the housing 2310. The outer side portion 2511 may include a hole or a groove coupled to the protrusion of the upper coupling portion 2313 of the housing 2310. The outer side portion 2511 can be fixed to the housing 2310 by an adhesive.

The upper elastic member 2510 may include an inner side portion 2512. A portion of the inner side portion 2512 may be disposed between the second protrusion 2214 and the third protrusion 2215 of the bobbin 2210. A portion of the inner side portion 2512 disposed between the second protrusion 2214 and the third protrusion 2215 can be fixed to the upper surface of the bobbin 2210 by an adhesive. The inner side portion 2512 can be coupled to the bobbin 2210. The inner side portion 2512 can be coupled to the upper surface or the upper side of the bobbin 2210. The inner side portion 2512 may include a hole or a groove coupled to the protrusion of the bobbin 2210. The inner side portion 2512 can be fixed to the bobbin 2210 by an adhesive.

The upper elastic member 2510 may include a connecting portion 2513. There is a clearance between the connecting portion 2513 and the bobbin 2210, and a moving space for the connecting portion 2513 can be secured through the clearance. The connecting portion 2513 can connect the outer side portion 2511 and the inner side portion 2512. The connecting portion 2513 can elastically connect the outer side portion 2511 and the inner side portion 2512. The connecting portion 2513 may have elasticity. At this time, the connecting portion 2513 may be referred to as an 'elastic portion'. The connecting portion 2513 may be formed by bending two or more times.

The elastic member 2500 may include a lower elastic member 2520. The lower elastic member 2520 can be coupled to the bobbin 2210 and the housing 2310. The lower elastic member 2520 can be coupled to the lower surface or the lower portion of the housing 2310. The lower elastic member 2520 may be coupled to the lower surface or lower portion of the bobbin 2210. The lower elastic member 2510 may be formed of a plate spring.

The terminal portion 2524 may be integrally formed with the lower elastic member 2520 in the second embodiment. In this case, the thickness of the terminal portion 2524 is made equal to the thickness of the lower elastic member 2520. However, in recent years, as the size of the camera module is reduced, the thickness of the lower elastic member 2520 is getting thinner since the electromagnetic force between the magnet 2320 and the coil 2220 is decreased due to the reduction in size of the magnet 2320, decrease in the number of the magnets 2320, and the like. In the second embodiment, since two magnets 2320 are provided the thickness of the lower elastic member 2520 can be made thinner as compared with a model including four magnets 2320, and the thickness of the terminal portion 2524 integrally formed with the lower elastic member 2520 can be reduced. Therefore, the terminal portion 2524 of the second embodiment can be very vulnerable to deformation due to impact due to its thin thickness. However, the second embodiment can minimize the deformation of the terminal portion 2524 by providing the structure of the protruded portion 2440 or the like of the base 2400.

As a modified example, the terminal portion 2524 and the lower elastic member 2520 may be formed as separate members. More specifically, the terminal portion 2524 may be formed as a separate member from the outer side portion 2521. In this case, the terminal portion 2524 and the outer side portion 2521 can be coupled by solder or the like. On the other hand, the terminal portion 2524 may include a portion overlapping with the outer side portion 2521 for coupling with the outer side portion 2521. However, when using a detachable terminal type as in the modified example, a cost increase of more than 10% may occur due to an increase in the number of parts and an increase in the number of processes, as compared with the integrated terminal type.

The lower elastic member 2520 may include first and second lower elastic units 22520a and 22520b that are spaced apart from each other. Each of the first and second lower elastic units 22520a and 22520b may be coupled with the coil 2220 by soldering. The first and second lower elastic units 22520a and 22520b may connect the printed circuit board 2010 and the coil 2220. The first lower elastic unit 2520a may be connected to one end of the coil 2220 and the second lower elastic unit 2520b may be connected to the other end of the coil 2220. That is, current can be supplied to the coil 2220 through the lower elastic member 2520.

The lower elastic member 2520 may include an outer side portion 2521. The outer side portion 2521 may be disposed on the upper surface of the base 2400. The outer side portion 2521 can be coupled with the protrusion on the upper surface of the base 2400. The outer side portion 2521 may be coupled to the housing 2310. The outer side portion 2521 may be coupled to the lower surface or lower portion of the housing 2310. The outer side portion 2521 may include a hole or groove coupled to the protrusion of the housing

2310. The outer side portion 2521 can be fixed to the housing 2310 by an adhesive.

The outer side portion 2521 of the lower elastic member 2520 may include a coupling portion 2525 disposed between the two pillar portions 2450 of the base 2400 and the outer side surface of the base 2400. At this time, the terminal portion 2524 may be extended from the coupling portion 2525.

The lower elastic member 2520 may include an inner side portion 2522. The inner side portion 2522 can be coupled to the bobbin 2210. The inner side portion 2522 may be coupled to the lower surface or lower portion of the bobbin 2210. The inner side portion 2522 may include a hole or a groove coupled to the protrusion of the bobbin 2210. The inner side portion 2522 can be fixed to the bobbin 2210 by an adhesive.

The lower elastic member 2520 may include a connecting portion 2523. The connecting portion 2523 can connect the outer side portion 2521 and the inner side portion 2522. The connecting portion 2523 can elastically connect the outer side portion 2521 and the inner side portion 2522. The connecting portion 2523 may have elasticity. At this time, the connecting portion 2523 may be referred to as an 'elastic portion'. The connecting portion 2523 may be formed by bending two or more times.

The lower elastic member 2520 may include a terminal portion 2524. The terminal portion 2524 may include two terminals. The terminal portion 2524 may be extended from the outer side portion 2521. The terminal portion 2524 may be disposed on the protruded portion 2440 of the base 2400. The terminal portion 2524 may be extended along the protruded portion 2440. The terminal portion 2524 can be fixed to the lateral plate 2120 of the cover 2100 by an adhesive 2600. The terminal portion 2524 can be fixed to the protruded portion 2440 by an adhesive. The terminal portion 2524 can be coupled to the printed circuit board 2010 by soldering. The terminal portion 2524 can be disposed in the terminal accommodating portion 2420 of the base 2400. The terminal portion 2524 may be formed integrally with the outer side portion 2521. As a modified example, the terminal portion 2524 may be formed as a separate member from the outer side portion 2521. The lower end of the terminal portion 2524 may be disposed below the lower end of the protruded portion 2440. That is, the terminal portion 2524 may be protruded downward from the protruded portion 2440. At this time, the inner side surface of the lower end of the terminal portion 2524 can be supported by the sensor base 2020. The terminal portion 2524 may include a first terminal and a second terminal that are spaced apart from each other. Each of the first terminal and the second terminal may be disposed adjacent to each of the corner portions of the base 2400. That is, the first terminal may be disposed adjacent to the first corner portion of the base 2400, and the second terminal may be disposed adjacent to the second corner portion of the base 2400. Each of the first terminal and the second terminal may be disposed closer to the corner of the one side surface of the base 2400 than the center of the one side surface of the base 2400.

As a modified example, the protruded portion 2440 can be extended to the lower end of the terminal portion 2524. That is, the protruded portion 2440 may be disposed to support the inner side surface of the lower end portion of the terminal portion 2524.

The lens driving device may include an adhesive (not shown) (hereinafter referred to as a 'first adhesive'). The adhesive may be disposed between the terminal portion 2524 and the protruded portion 2440. The adhesive can fix the terminal portion 2524 to the protruded portion 2440. The adhesive may be injected through the injection groove 2441 of the protruded portion 2440 and flow along the guide groove 2442 to be hardened to fix the terminal portion 2524 to the protruded portion 2440.

In the second embodiment, as compared with the model in which the adhesive 2600 is disposed only on the terminal portion 2524 and the lateral plate 2120 of the cover 2100, since additional adhesive is disposed on the terminal portion 2524 and the protruded portion 2440, so that the occurrence of deformation can be minimized due to the increase in the fixing force of the terminal portion 2524. More specifically, in the second embodiment, the upper portion of the terminal portion 2524 is fixed to the lateral plate 2120 of the cover 2100 by an adhesive 2600, and the lower portion of the terminal portion 2524 may be fixed to the protruded portion 2440 of the base 2400 by an adhesive.

The lens driving device may include an adhesive 2600 (hereinafter referred to as a 'second adhesive'). The adhesive 2600 may be disposed between the terminal portion 2524 and the lateral plate 2120 of the cover 2100. The adhesive 2600 may be disposed near the upper portion of the terminal portion 2524 and the avoidance groove 2123 of the lateral plate 2120 of the cover 2100. That is, the upper portion of the terminal portion 2524 can be fixed to the lateral plate 2120 of the cover 2100 by the adhesive 2600.

In the second embodiment, a guide wall (protruded portion 2440) may be disposed on the base 2400 so that the terminal is not deformed. The protruded portion 2440 can support the inner surface of the terminal portion 2524. As a result, the occurrence of warpage of the terminal portion 2524 in the inward direction of the base 2400 due to an impact or the like can be inhibited.

In the second embodiment, a semicircular shape can be applied to the guide wall to apply a bond (adhesive). An injection groove 2441 in the shape of a semi-circle is disposed at the lower end portion of the protruded portion 2440 and an adhesive can be injected between the protruded portion 2440 and the terminal portion 2524 through the injection groove 2441. Through this, the entire terminal portion 2524 can be fixed to the base 2400.

In the second embodiment, a groove structure having a predetermined shape can be disposed in order to maximize the bond flow. A guide groove 2442 is formed on the outer side surface of the protruded portion 2440 to maximize the flow of the adhesive.

In the second embodiment, a curved shape (inclined surface 2421) may be disposed on the upper portion of the base 2400 so as not to be deformed in the process of assembling the terminal portion 2524. When the base 2400 and the terminal are assembled, the curved shape (inclined surface 2421) may be disposed on a certain portion of the upper side of the base 2400 to inhibit interference. In this case, deformation of the terminal caused by the assembling of the base 2400 can be inhibited.

At least some of the configurations in the second embodiment can be replaced with the configurations of the first embodiment described above and the third and fourth embodiments which will be described later. In addition, the remaining configurations except for the detailed configurations of the cover 2100 and the base 2400 having a structure in which the deformation of the terminal is minimized, and the detailed configurations combined therewith or corresponding thereto may be replaced with that of the first embodiment described above or the third and fourth configurations which will be described later.

The optical device according to the third embodiment includes a frame which is an exterior member, a display unit (display panel) disposed on one surface of the frame for displaying information, a cover glass disposed on one surface of the frame and spaced apart from the display unit (display panel), and a camera module disposed inside the frame and having a field of view (FOV) overlapping at least a portion of the cover glass. The camera module photographs an image or a photograph, and can be electrically connected to a display unit (display panel). An image photographed by the camera module can be reproduced on the display unit.

Hereinafter, the configuration of the 'camera module' according to the third embodiment will be described. The camera module of the third embodiment may include a lens driving device 3000, a lens module, an infrared cut filter (not shown), a substrate (not shown), an image sensor (not shown), and a controller (not shown). The lens driving device 3000 will be described in detail below, and the remaining configuration will be described first.

The lens module may include a lens and a lens barrel. The lens module may include one or more lenses (not shown) and a lens barrel for accommodating one or more lenses. However, one configuration of the lens module is not limited to the lens barrel, and any holder structure can be used as long as it can support one or more lenses. The lens module is coupled to the lens driving device 3000 and can move together with the lens driving device 3000. The lens module may be coupled to the inside of the lens driving device 3000 as an example. The lens module can be screw-coupled to the lens driving device 3000 as an example. The lens module can be coupled to the lens driving device 3000 by an adhesive (not shown) as an example. Light passing through the lens module can be irradiated to the image sensor.

An infrared cutoff filter can block the light of the infrared region from incidenting on the image sensor. The infrared cut filter may be located, for example, between the lens module and the image sensor. The infrared cutoff filter may be located in a holder member (not shown) provided separately from the base 3800. However, the infrared filter may be mounted in a hole formed at the center of the base 3800. The infrared filter may be formed of a film material or a glass material as an example. The infrared filter may be formed by coating an infrared blocking coating material on an optical filter in the shape of a plate such as a cover glass for protecting an image pickup surface or a cover glass.

The substrate may be a printed circuit board (PCB). The substrate can support the lens driving device 3000. An image sensor may be mounted on the substrate. As an example, the image sensor may be positioned inside the upper surface of the substrate, and a sensor holder (not shown) may be located outside the upper surface of the substrate. The lens driving device 3000 may be located above the sensor holder. Alternatively, the lens driving device 3000 may be positioned outside the upper surface of the substrate, and the image sensor may be positioned inside the upper surface of the substrate. With this structure, the light passing through the lens module accommodated inside the lens driving device 3000 can be irradiated to the image sensor mounted on the substrate. The substrate can supply power to the lens driving device 3000. Meanwhile, a control unit for controlling the lens driving device 3000 may be disposed on the substrate.

The image sensor may be mounted on a substrate. The image sensor may be positioned such that the optical axis and the lens module are aligned. Thereby, the image sensor can acquire light passing through the lens module. The image sensor can output the irradiated light as an image. The image output from the image sensor can be transmitted to the display unit (display panel) of the optical device through the substrate. The image sensor can be, for example, a charge coupled device (CCD), a metal oxide semiconductor (MOS), a CPD and a CID. However, the type of image sensor is not limited thereto.

The control unit can be mounted on the substrate. The control unit may be located outside the lens driving device 3000. However, the control unit may be located inside the lens driving device 3000. The control unit can control the direction, intensity, amplitude, and the like of the current supplied to each of the components constituting the lens driving device 3000. The control unit controls the lens driving device 3000 to perform the auto focus function of the camera module. That is, the control unit controls the lens driving device 3000 to move the lens module in the optical axis direction.

Figure 24:
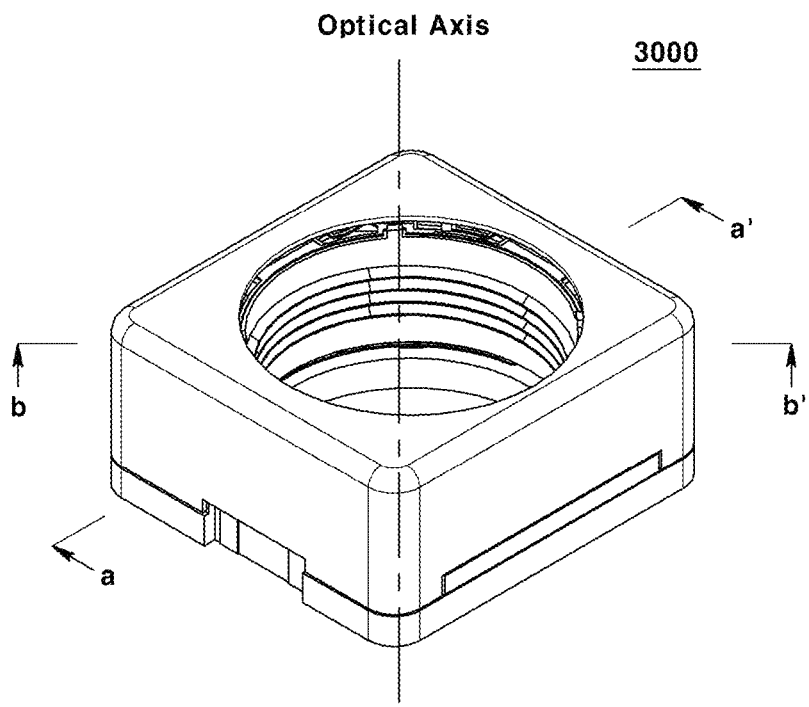
FIG. 24 is a perspective view showing the lens driving device of the third embodiment.
Figure 25:
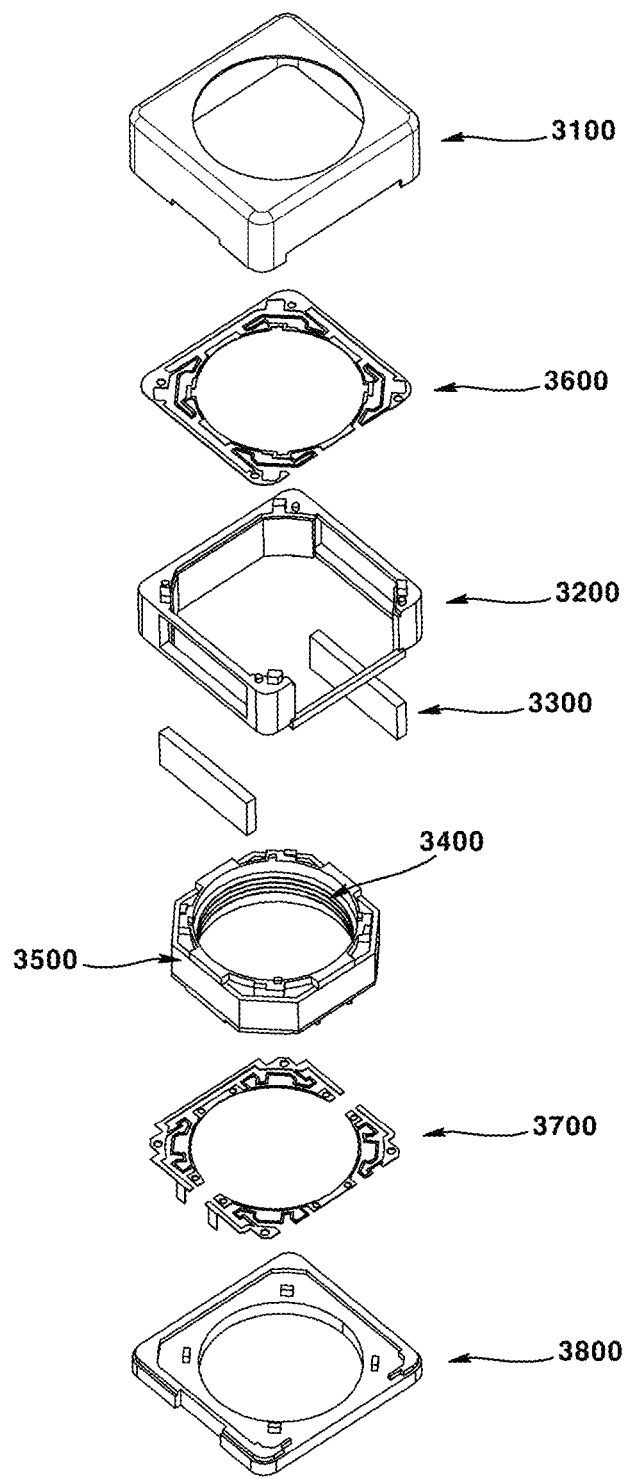
FIG. 25 is an exploded perspective view showing the lens driving device of the third embodiment.
Figure 26:
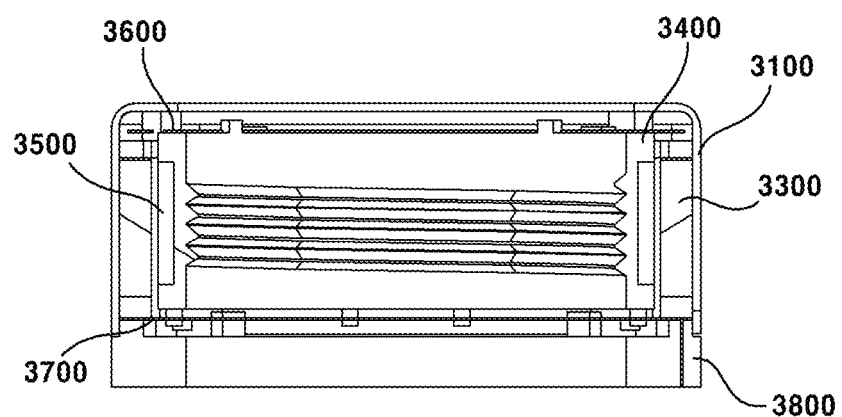
FIG. 26 is a cross-sectional view of the lens driving device of the third embodiment cut along the line a-a'.
Figure 27:
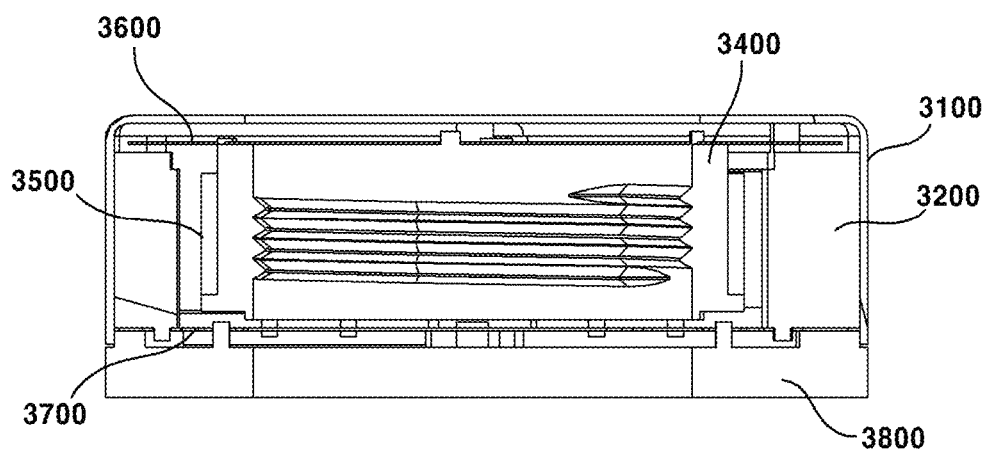
FIG. 27 is a cross-sectional view of the lens driving device of the third embodiment cut along the line b-b'.
Figure 28:
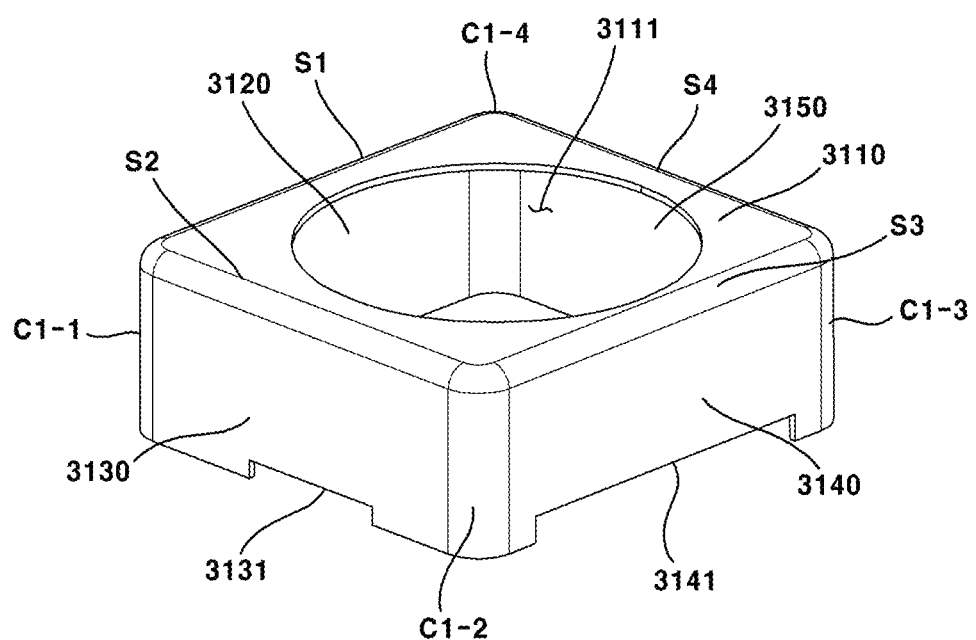
FIG. 28 is a perspective view showing the cover of the lens driving device of the third embodiment.
Figure 29:
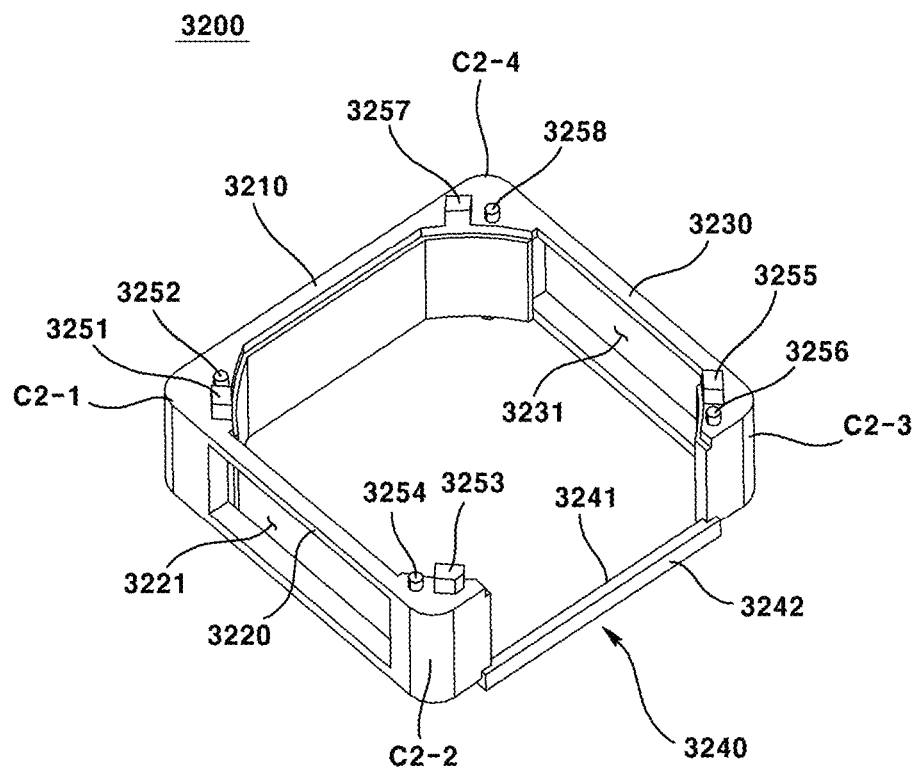
FIG. 29 is a perspective view showing the housing of the lens driving device of the third embodiment.
Figure 30:
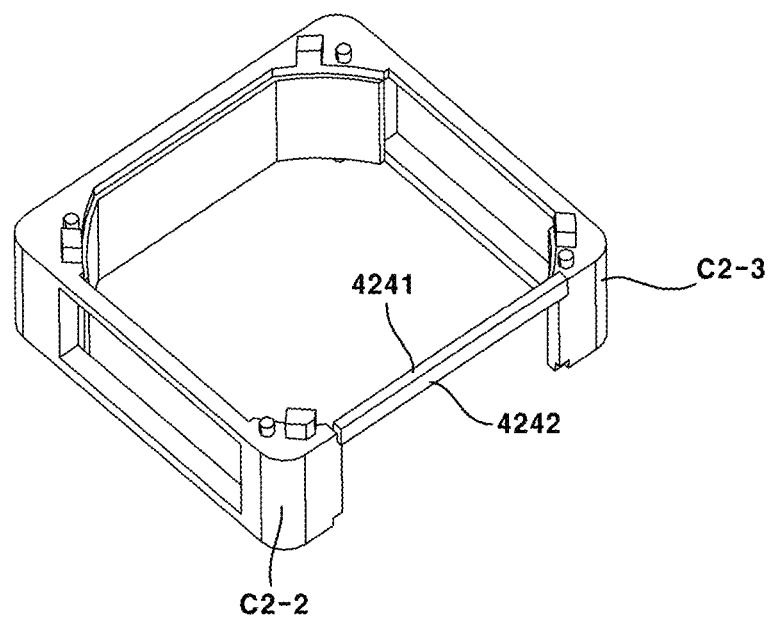
FIG. 30 is a perspective view showing the housing of the lens driving device of the modified example.
Figure 31:
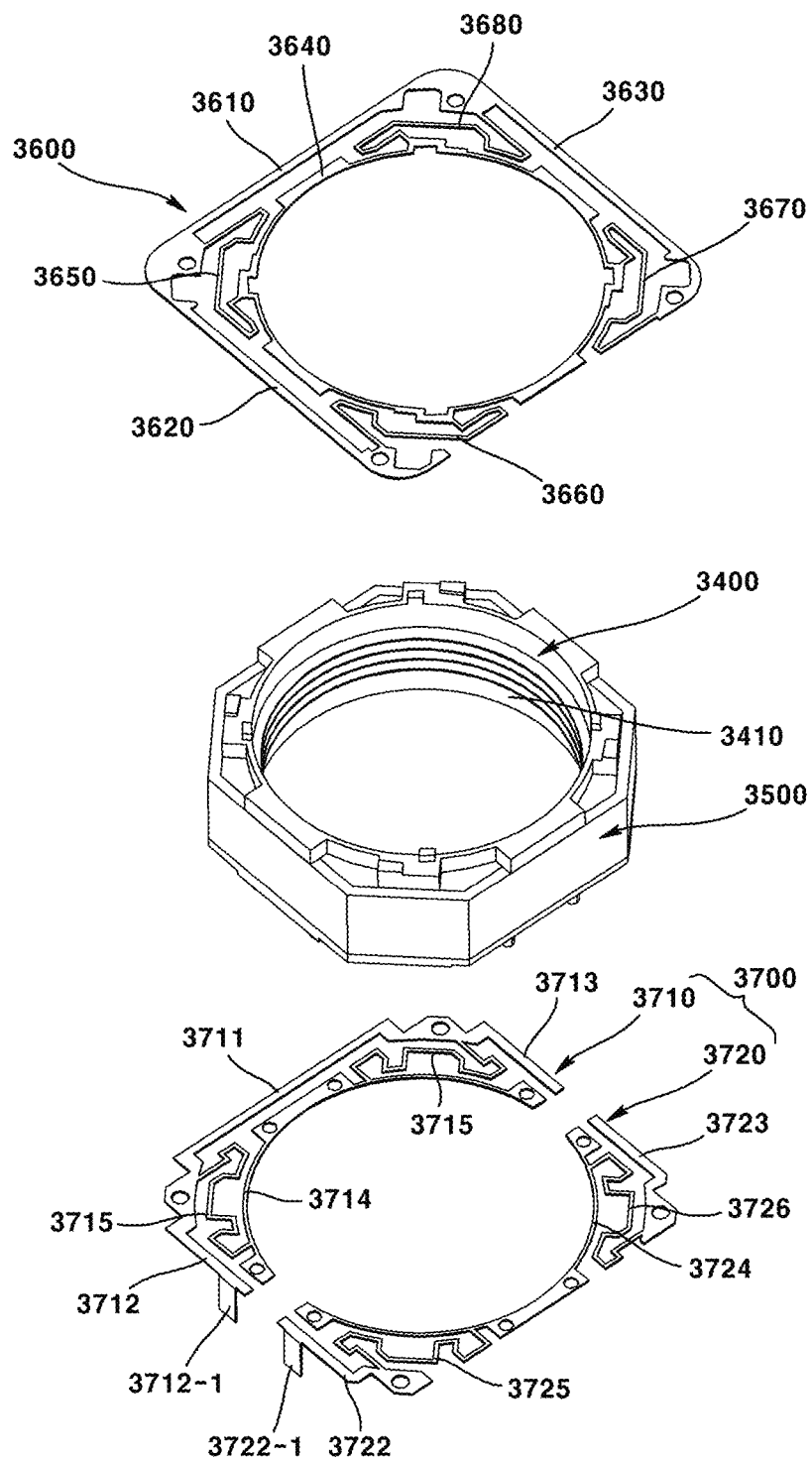
FIG. 31 is a perspective view showing the bobbin, the first elastic member, and the second elastic member of the lens driving device of the third embodiment.
Figure 32:
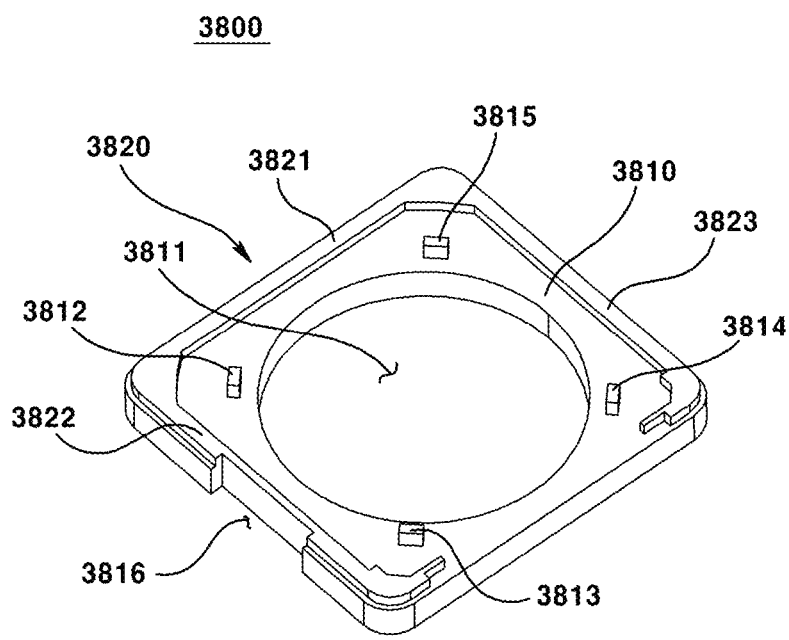
FIG. 32 is a perspective view showing the base of the lens driving device of the third embodiment.
Figure 33:
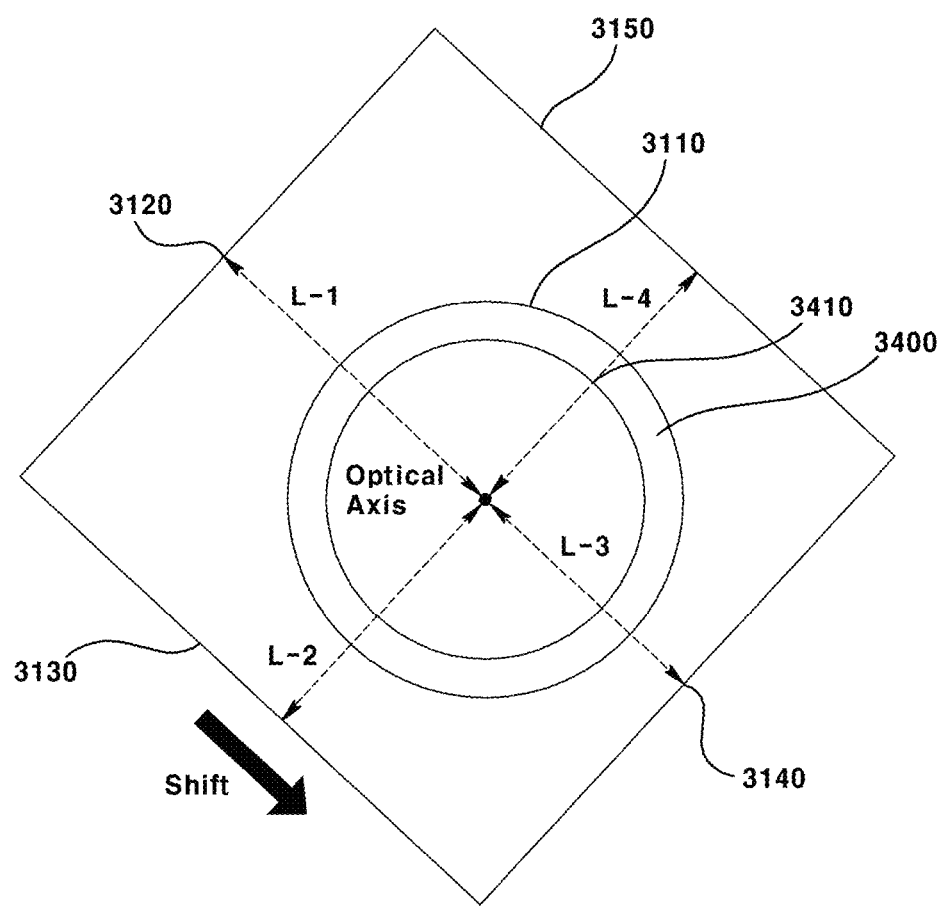
FIG. 33 is a plan view conceptually showing the distance between the "optical axis" and the first lateral plate, the distance between the "optical axis" and the second lateral plate, the distance between the "optical axis" and the third lateral plate, and the distance between the "optical axis" and the fourth lateral plate of the lens driving device of the third embodiment.

Hereinafter, the "lens driving device 3000" of the third embodiment will be described with reference to the drawings; FIG. 24 is a perspective view showing the lens driving device of the third embodiment; FIG. 25 is an exploded perspective view showing the lens driving device of the third embodiment; FIG. 26 is a cross-sectional view of the lens driving device of the third embodiment cut along the line a-a'; FIG. 27 is a cross-sectional view of the lens driving device of the third embodiment cut along the line b-b'; FIG. 28 is a perspective view showing the cover of the lens driving device of the third embodiment; FIG. 29 is a perspective view showing the housing of the lens driving device of the third embodiment; FIG. 30 is a perspective view showing the housing of the lens driving device of the modified example; FIG. 31 is a perspective view showing the bobbin, the upper elastic member, and the lower elastic member of the lens driving d of the third embodiment; FIG. 32 is a perspective view showing the base of the lens driving device of the third embodiment; and FIG. 33 is a plan view conceptually showing the distance between the "optical axis" and the first lateral plate, the distance between the "optical axis" and the second lateral plate, the distance between the "optical axis" and the third lateral plate, and the distance between the "optical axis" and the fourth lateral plate of the lens driving device of the third embodiment.

In a general lens driving device, a bobbin is disposed at the center of the cover. In contrast, in the lens driving device 3000 of the third embodiment, the bobbin 3400 is moved (shifted) to one side in the horizontal direction with respect to the cover 3100. The cover 3100 is an exterior member, whereby the sizes of the lens driving device 3000 and the camera module are determined.

In the lens driving device 3000 of the third embodiment, the size of the cover 3100 is maintained, and by moving and positioning the bobbin 3400 on which the lens module is mounted to one side in the horizontal direction, the optical axis can be arranged to be moved to one side in the horizontal direction, the bobbin 3400 on which the lens module is mounted is moved and disposed in one side in the horizontal direction so that the "optical axis".

Therefore, the lens driving device 3000 and the camera module of the third embodiment can move the cover glass to the edge of the frame of the optical device when mounted on the optical device, as compared with a general lens driving device and a camera module of the same size. As a result, the size of the bezel of the optical device can be reduced, and the display panel can be relatively widened.

The lens driving device 3000 of the third embodiment includes a cover 3100, a housing 3200, a first driving unit 3300, a bobbin 3400, a second driving unit 3500, a first elastic member 3600, a second elastic members 3700, and a base 3800. The first driving unit 3300 may be a 'magnet' or a 'coil' according to electromagnetic design conditions. The second driving unit 3500 may be a 'magnet' or a 'coil' according to electromagnetic design conditions. If the first driving unit 3300 is a 'magnet', the second driving unit 3500 may be a 'coil.' If the first driving unit 3300 is a 'coil', the second driving unit 3500 may be a 'magnet'. Therefore, although there are two cases, hereinafter, the case where the first driving unit 3300 is the 'magnet 3300' and the second driving unit 3500 is the 'coil' will be described. In other cases, it may be analogous to the case where the first driving unit is the "magnet 3300" and the second driving unit 3500 is the "coil 3500".

The cover 3100 may be an exterior member of the lens driving device 3000. The size of the lens driving device 3000 and the camera module can be determined by the cover 3100.

A housing 3200, a magnet 3300, a bobbin 3400, a coil 3500, an upper elastic member 3600, and a lower elastic member 3700 may be disposed inside the cover 3100. A base 3800 may be disposed below the cover 3100.

The cover 3100 may include a metal material. The cover 3100 can inhibit the electromagnetic wave from flowing from the outside to the inside, and inhibiting the electromagnetic wave from being emitted from the inside to the outside. Thus, the cover 3100 may be referred to as a 'shield can'. However, the material of the cover 3100 is not limited thereto. In one example, the cover 3100 may comprise a plastic material.

The cover 3100 may include an upper plate 3110, a first lateral plate 3120, a second lateral plate 3130, a third lateral plate 3140, a fourth lateral plate 3150, a first corner portion C1-1, a second corner portion C1-2, a third corner portion C1-3, and a fourth corner portion C1-4.

The upper plate 3110, the first lateral plate 3120, the second lateral plate 3130, the third lateral plate 3140, the fourth lateral plate 3150, the first corner portion C1-1, the second corner portion C1-2, the third corner portion C1-3, and the fourth corner portion C1-4 may be integrally formed.

The upper plate 3110 may be in the form of a square plate with rounded edges. A hole 3111 may be formed in the upper plate 3110 in a vertical direction. The hole 3111 of the cover 3100 may be located after the vertical center axis thereof is shifted from the center of the upper plate 3110 toward the direction in which the third lateral plate 3140 is located.

The light reflected from the subject can be irradiated to the lens module mounted on the bobbin 3400 through the hole 3111 of the cover 3100. To this end, the "vertical center axis of the hole 3111 of the cover 3100" and the "vertical center axis of the hole 3410 of the bobbin 3400" and the "optical axis of the lens module" can coincide with each other.

In the lens driving device 3000 of the third embodiment, since the bobbin 3400 is moved from the center of the upper plate 3110 toward the direction in which the third lateral plate 3140 is located to be disposed there, so does the hole 3111 of the cover 3100 is moved toward the direction in which the third lateral plate 3140 is located.

The upper plate 3110 may include a first side S1, a second side S2, a third side S3, and a fourth side S4. The first lateral plate 3120 is bent downward or curved at the first side S1 so as to be disposed, the second lateral plate 3130 is bent downward or curved at the second side S2 so as to be disposed, the third lateral plate 3140 is bent downward or curved at the third side S3 so as to be disposed, the fourth lateral plate 3150 is bent downward or curved at the fourth side S4 so as to be disposed, and the fourth lateral plate 3150 may be bent downward or curved at the fourth side S4 so as to be disposed. That is, the first lateral plate 3120, the second lateral plate 3130, the third lateral plate 3140 and the fourth lateral plate 3150 may be bent downward or curved from the edge of the upper plate 3110. The side portions of the cover 3100 can be formed by the first lateral plate 3120, the second lateral plate 3130, the third lateral plate 3140, and the fourth lateral plate 3150.

The first lateral plate 3120, the second lateral plate 3130, the third lateral plate 3140, and the fourth lateral plate 3150 may be approximately in the form of a rectangular plate. The first lateral plate 3120 and the third lateral plate 3140 may be arranged to be faced with and parallel to each other. The second lateral plate 3130 and the fourth lateral plate 3150 can be arranged to be faced with and parallel to each other. The second lateral plate 3130 and the fourth lateral plate 3150 can be disposed between the first lateral plate 3120 and the third lateral plate 3140 and vice versa. Each of the first lateral plate 3120 and the third lateral plate 3140 may be disposed vertically with respect to the second lateral plate 3130 and the fourth lateral plate 3150, respectively.

The first lateral plate 3120 and the second lateral plate 3130 may be connected. The third lateral plate 3140 may be disposed on the opposite side of the first lateral plate 3120. The third lateral plate 3140 may be connected to the second lateral plate 3130. The fourth lateral plate 3150 may be disposed on the opposite side of the second lateral plate 3130. The fourth lateral plate 3150 may be connected to the third lateral plate 3140 and may be connected to the first lateral plate 3120.

The first lateral plate 3120 and the second lateral plate 3130 can be connected by the 1-1 corner portion C1-1. The 1-1 corner portion C1-1 may be positioned between the first lateral plate 3120 and the second lateral plate 3130. The 1-1 corner portion C1-1 may be positioned at an edge formed by the first lateral plate 3120 and the second lateral plate 3130.

The second lateral plate 3130 and the third lateral plate 3140 can be connected by the 1-2 corner portion C1-2. The 1-2 corner portion C1-2 may be positioned between the second lateral plate 3130 and the third lateral plate 3140. The 1-2 corner portion C1-2 may be positioned at the edge formed by the second lateral plate 3130 and the third lateral plate 3140.

The third lateral plate 3130 and the fourth lateral plate 3140 can be connected by the 1-3 corner portion C1-3. The 1-3 corner portion C1-3 may be positioned between the third lateral plate 3140 and the fourth lateral plate 3150. The 1-3 corner portion C1-3 may be positioned at the edge formed by the third lateral plate 3140 and the fourth lateral plate 3150.

The fourth lateral plate 3150 and the first lateral plate 3120 can be connected by the 1-4 corner portion C1-4. The 1-4 corner portion C1-4 may be positioned between the fourth lateral plate 3150 and the first lateral plate 3120. The 1-4 corner portion C1-4 may be positioned at the edge formed by the fourth lateral plate 3150 and the first lateral plate 3120.

A first groove 3131 in which a first terminal 3712-1 and a second terminal 3722-2 of the lower elastic member 3700 are disposed may be formed at the lower end of the second lateral plate 3130. The first groove 3131 may be formed in a shape that is flared up from the lower surface of the second lateral plate 3130 so that the first terminal 3712-1 and the second terminal 3722-2 may be exposed to the outside.

A second groove 3141 in which a rib 3240 of the housing 3200 is disposed may be formed at the lower end of the third lateral plate 3140. The second groove 3141 may be an upwardly recessed shape on the lower surface of the third lateral plate 3140 so that the rib 3240 may be exposed to the outside.

In FIG. 6, the first corner portion C1-1, the second corner portion C1-2, the third corner portion C1-3, and the fourth corner portion C1-4 are shown in rounded form. However, the shapes of the first corner portion C1-1, the second corner portion C1-2, the third corner portion C1-3, and the fourth corner portion C1-4 are not limited thereto. The first corner portion C1-1, the second corner portion C1-2, the third corner portion C1-3, and the fourth corner portion C1-4 may be angled.

Further, in this modified example (not shown), the cover 3100 may have a cylindrical shape. In this case, the first corner portion C1-1, the second corner portion C1-2, the third corner portion C1-3, and the fourth corner C1-4 may be four specific points spaced apart circumferentially, and the first lateral plate 3120, the second lateral plate 3130, the third lateral plate 3140, and the fourth lateral plate 3150 may be four lateral plates respectively disposed between the first corner portion C1-1, the second corner portion C1-2, the third corner portion C1-3, and the fourth corner C1-4.

The housing 3200 may be disposed within the cover 3100. The housing 3200 may be disposed inside the cover 3100. A bobbin 3400 may be disposed inside the housing 3200. A base 3800 may be disposed below the housing 3200. A magnet 3300 may be disposed in the housing 3200. An upper elastic member 3600 may be disposed on the housing 3200. An upper elastic member 3600 may be disposed between the housing 3200 and the upper plate 3110 of the cover 3100. Below the housing 3200, a lower elastic member 3700 may be disposed. A lower elastic member 3700 may be disposed between the housing 3200 and the base 3800. The housing 3200 may be a plastic injection mold.

The housing 3200 includes a first side portion 3210, a second side portion 3220, a third side portion 3230, a rib 3240, a 2-1 corner portion C2-1, a 2-2 corner portion C2-2, a 2-3 corner portion C2-3, and a 2-4 corner portion C2-4, respectively.

The first side portion 3210 may be spaced apart from the first lateral plate 3120 in the direction in which "the vertical center axis of the hole 3410 of the bobbin 3400 (the optical axis of the lens module, the vertical axis of the hole of the cover)". The first side portion 3210 may be disposed facing the first lateral plate 3120.

The second side portion 3220 is spaced apart from the second lateral plate 3130 in the direction in which "the vertical center axis of the hole 3410 of the bobbin 3400 (the optical axis of the lens module and the vertical axis of the hole of the cover)". The second side portion 3220 may be disposed facing the second lateral plate 3130. A first magnet 3310 may be disposed on the second side portion 3220. The second side portion 3220 may be formed with a first magnet accommodating portion 3221 in the form of a hole. A first magnet 3310 may be accommodated in the first magnet accommodating portion 3221.

The third side portion 3230 is spaced apart from the fourth lateral plate 3140 in the direction in which "the vertical center axis of the hole 3410 of the bobbin 3400 (the optical axis of the lens module and the vertical axis of the hole of the cover)". And the third side portion 3230 may be disposed facing the fourth lateral plate 3150. The third side portion 3230 may be provided with a second magnet accommodating portion 3231 in the form of a hole. The second magnet accommodating portion 3231 may accommodate the second magnet 3320.

The second side portion 3220 and the third side portion 3230 can be disposed facing with each other and arranged in parallel. Accordingly, the first magnet 3310 and the second magnet 3320 are faced with each other and can be arranged in parallel.

The 2-1 corner portion C2-1 may be disposed closest to the 1-1 corner portion C1-1 of the four corner portions of the cover 3100. The 2-2 corner portion C2-2 may be disposed closest to the 1-2 corner portion C1-2 of the four corner portions of the cover 3100. The 2-3 corner portion C2-3 may be disposed closest to the 1-3 corner portion C1-3 of the four corner portions of the cover 3100. The 2-4 corner portion C2-4 may be disposed closest to the 1-4 corner portion C1-4 of the four corner portions of the cover 3100.

That is, the 2-1 corner portion C2-1 may be disposed at a position corresponding to (facing, opposing to) the 1-1 corner portion C1-1. The 2-2 corner portion C2-2 may be disposed at a position corresponding to (facing, opposing to) the 1-2 corner portions C1-2. The 2-3 corner portion C2-3 may be disposed at positions corresponding to (facing, opposing to) the 1-3 corner portion C1-3. And the 2-4 corner portion C2-4 may be disposed at a position corresponding to (facing, opposing to) the 1-4 corner portion C1-4.

The first side portion 3210 may connect the 2-1 corner portion C2-1 and the 2-4 corner portion C2-4. That is, the first side portion 3210 may be disposed between the 2-1 corner portion C2-1 and the 2-4 corner portion C2-4. The second side portion 3220 may connect the 2-1 corner portion C2-1 and the 2-2 corner portion C2-2. That is, the second side portion 3220 may be disposed between the 2-1 corner portion C2-1 and the 2-2 corner portion C2-2. The third side portion 3230 can connect the 2-3 corner portion C2-3 and 2-4 corner portion C2-4. That is, the third side portion 3230 may be disposed between the 2-3 corner portion C2-3 and the 2-4 corner portion C2-4.

The 2-2 corner portion C2-2 and the 2-3 corner portion C2-3 may be spaced apart from each other. A hollow space may be formed between the 2-2 corner portion C2-2 and the 2-3 corner portion C2-3.

According to the above description, in the lens driving device 3000 of the third embodiment, the housing 3200 does not have a side portion corresponding to the third lateral plate 3140 of the cover 3100. Instead, there is only a hollow space between the 2-2 corner portion C2-2 and the 2-3 corner portion C2-3. As a result, the bobbin 3200 can be moved and arranged in the direction in which the third lateral plate 3140 is disposed. That is, at least a portion of the bobbin 3400 and/or at least a portion of the coil 3500 are arranged in a hollow space between the 2-2 corner portion C2-2 and the 2-3 corner portion C2-3.

However, due to the absence of the side portion of the housing 3200, the durability is deteriorated and warping due to external force may occur. The rib 3240 is a member for reinforcing the housing 3200 and may connect the 2-2 corner portion C2-2 and the 2-3 corner portion C2-3. However, the rib 3240, in order to provide a space for accommodating the bobbin 3400 and/or the coil 3500, may connect the upper portion of the 2-2 corner portion C2-2 and the upper portion of the 2-3 corner portion C2-3, or may connect the lower portion of the 2-2 corner portion C2-2 and the lower portion of the 2-3 corner portion C2-3. In the third embodiment, a case where the rib 3240 connects the lower portion of the 2-2 corner portion C2-2 and the lower portion of the 2-3 corner portion C2-3 will be described as an example. In this case, at least a portion of the bobbin 3400 and/or at least a portion of the coil 3500 may be located above the rib 3240.

The rib 3240 may include a first rib portion 3241 and a second rib portion 3242. The first rib portion 3241 may be disposed between the 2-2 corner portion C2-2 and the 2-3 corner portion C2-3. The second rib portion 3242 can connect the outer side surface of the 2-2 corner portion C2-2 and the outer side surface of the 2-3 corner portion C2-3. That is, the first rib portion 3241 can be disposed closer to the "vertical center axis of the bobbin 3400" than the second rib portion 3242. The second rib portion 3242 may be longer than the first rib portion 3241 in a direction with respect to the 2-2 corner portion C2-2 and the 2-3 corner portion C2-3. That is, the first rib portion 3241 and the second rib portion 3242 can form a step. The first rib portion 3241 and the second rib portion 3242 may be protruded downward from the housing 3200. The thickness of the first rib portion 3241 and the second rib portion 3242 in the horizontal direction may be 0.2 mm or more.

In the modified example (see FIG. 8) of the third embodiment, the rib 3240 can connect the upper portion of the 2-2 corner portion C2-2 and the upper portion of the 2-3 corner portion C2-3. In this case, the first rib portion 4241 may be disposed between the 2-2 corner portion C2-2 and the 2-3 corner portion C2-3. The second rib portion 4242 can connect the outer side surface of the 2-2 corner portion C2-2 and the outer side surface of the 2-3 corner portion C2-3. That is, the first rib portion 4241 can be disposed closer to the "vertical center axis of the bobbin 3400" than the second rib portion 4242. The second rib portion 4242 may be longer than the first rib portion 4241 in the direction of the 2-2 corner portion C2-2 and the 2-3 corner portion C2-3. That is, the first rib portion 4241 and the second rib 4242 can form a step. In addition, the first rib portion 4241 and the second rib portion 4242 may be protruded upward from the housing 3200. The thickness of the first rib portion 4241 and the second rib portion 4242 in the horizontal direction may be 0.2 mm or more.

The magnet 3300 may be disposed in the housing 3200. The magnet 3300 can face the coil 3500. Magnet 3300 may electromagnetically interact with the coil 3500 to provide a driving force to bobbin 3400. The magnet 3300 may include a first magnet 3310 and a second magnet 3320. The first magnet 3310 and the second magnet 3320 may be 'permanent magnets'. The first magnet 3310 may be disposed in the first magnet accommodating portion 3221 formed in the shape of a hole in the second side portion 3220. The second magnet 3320 may be disposed in the second magnet accommodating portion 3231 formed in the shape of a hole in the third side portion 3230.

The bobbin 3400 may be disposed within the housing 3200. The bobbin 3400 may be disposed inner side the housing 3200. A lens module of the camera module may be disposed in the bobbin 3400. A hole 3410 may be formed in the bobbin 3400 in the vertical direction. The lens module may be disposed and accommodated in the hole 3410 of the bobbin 3400. The "vertical center axis of the hole 3410 of the bobbin 3400" may be coincided with the optical axis of the lens module. The "vertical center axis of the hole 3410 of the bobbin 3400" may be coincided with the "vertical center axis of the hole 3111 of the cover 3100". The diameter of the hole 3410 of the bobbin 3400 may be smaller than the diameter of the hole 3111 of the cover 3100. Therefore, the lens module can be completely exposed through the hole 3111 of the cover 3100.

The bobbin 3400 is horizontally moved (shifted) in a direction in which the third lateral plate 3140 of the cover 3100 is positioned. Accordingly, difference occurs in the shortest distance between the "vertical central axis of the hole 3410 of the bobbin 3400" and the first lateral plate 3120, the second lateral plate 3130, the third lateral plate 3140, and the fourth lateral plate 3150 of the cover 3100. Hereinafter, this will be described with reference to FIG. 32.

The shortest distance L1 between "the vertical center axis of the hole 3410 of the bobbin 3400" and the first lateral plate 3120 may be longer than the shortest distance L3 between "the vertical axis of the hole 3410 of the bobbin 3400" and the lateral plates 3140 may be longer than the shortest distance L3.

The shortest distance L2 between "the vertical center axis of the hole 3410 of the bobbin 3400" and the second lateral plate 3130 may be the same as the shortest distance L4 between "the vertical center axis of the hole 3410 of the bobbin 3400" and the fourth lateral plates 3150. The shortest distance L2 between "the vertical center axis of the hole 3410 of the bobbin 3400" and the second lateral plate 3130 may be shorter than the shortest distance L1 between "the vertical center axis of the hole 3410 of the bobbin 3400" and the first lateral plates 3120.

The shortest distance L2 between "the vertical center axis of the hole 3410 of the bobbin 3400" and the second lateral plate 3130 may be shorter than the shortest distance L3 between "the vertical center axis of the hole 3410 of the bobbin 3400" and the third lateral plates 3140.

Since "the vertical center axis of the hole 3410 of the bobbin 3400" coincides with the optical axis of the lens module, the above described distance relationship between "the vertical center axis of the hole 3410 of the bobbin 3400" and the first lateral plate 3120, the second lateral plate 3130, the third lateral plate 3140, and the fourth lateral plate 3150 can be applied to the distance between "the optical axis of the lens module" and the first lateral plate 3120, the second lateral plate 3130, The third lateral plate 3140, and the fourth lateral plate 3150.

The difference between the shortest distance between "the vertical center axis of the hole 3410 of the bobbin 3400" and the first lateral plate 3120 and the shortest distance between "the vertical center axis of the hole 3410 of the bobbin 3400" and the third lateral plate 3140, may be 0.5 mm or more and 1.0 mm or less. The difference between the shortest distance between "the vertical center axis of the hole 3410 of the bobbin 3400" and the first lateral plate 3120 and the shortest distance between "the center axis of the hole 3410 of the bobbin 3400" and the third lateral plate 3140, may be 0.15 mm or more and 0.8 mm or less.

If the value is less than the minimum value of the above described numerical value range, the effect of reducing the bezel size in the optical device (smart phone) is insignificant, and if the maximum value is exceeded, due to the unbalanced arrangement, the bobbin 3400 is tilted, which is undesirable in terms of optical and structural design.

The bobbin 3400 and the lens module are combined so that the lens module can move integrally with the bobbin 3400 when the bobbin 3400 is moved. The bobbin 3400 can move in the optical axis direction (vertical direction) by electromagnetic interaction between the magnet 3300 and the coil 3500. The lens module moves integrally with the bobbin 3400 in the optical axis direction (vertical direction) to perform the autofocus function.

An upper elastic member 3600 may be disposed on the bobbin 3400. Below the bobbin 3400, a lower elastic member 3700 may be disposed. The bobbin 3400 can be elastically supported to the housing 3200 in the vertical direction (optical axis direction) by the upper elastic member 3600 and the lower elastic member 3700. A coil 3500 may be disposed on the outer circumferential surface of the bobbin 3400.

The coil 3500 may be disposed on the outer circumferential surface of the bobbin 3400. The coil 3500 can be wound on the outer circumferential surface of the bobbin 3400. The coil 3500 may be in the form of a 'coil block'. The coil 3500 may be an 'electromagnet'. The coil 3500 may electromagnetically interact with the magnet 3300 to provide a driving force to the bobbin 3400. Both ends of the coil 3500 may be respectively drawn out and connected to the lower elastic member 3700. The coil 3500 may be electrically connected to the lower elastic member 3700. The lower elastic member 3700 can receive power from the substrate by a first terminal 3712-1 and a second terminal 3722-2. The coil 3500 is supplied with power from the lower elastic member 3700 and can generate an electromagnetic force.

The bobbin 3400 is horizontally moved in the direction in which the third lateral plate 3140 is located, as the lateral plate corresponding to the third lateral plate 3140 is not provided in the housing 3200, the coil 3500 may have a surface directly facing the third lateral plate 3140. That is, the outer side surface (outer side portion) of the coil 3500 disposed at the position corresponding to the third lateral plate 3140 can be directly faced with the inner side surface (inner side portion) of the third lateral plate 3140. The upper elastic member 3600 may be a plate spring. The upper elastic member 3600 may be a metal. The upper elastic member 3600 may be non-magnetic. Therefore, the upper elastic member 3600 may not be affected by the magnetic force of the magnet 3300 and the electromagnetic force of the coil 3500.

The upper elastic member 3600 may be disposed on the housing 3200. The upper elastic member 3600 may be disposed on the bobbin 3400. The upper elastic member 3600 may be disposed between the housing 3200 and the upper plate 3110 of the cover 3100. The upper elastic member 3600 may be disposed between the bobbin 3400 and the upper plate 3110 of the cover 3100. The upper elastic member 3600 can be coupled with the housing 3200 and the bobbin 3400. The upper elastic member 3600 can elastically connect the housing 3200 and the bobbin 3400.

The upper elastic member 3600 includes a first upper elastic member 3610, a second upper elastic member 3620, a third upper elastic member 3630, a fourth upper elastic member 3640, a fifth upper elastic member 3650, a sixth upper elastic member 3660, a seventh upper elastic member 3670, and an eighth upper elastic member 3680.

The first upper elastic member 3610, the second upper elastic member 3620, and the third upper elastic member 3630 are disposed on the housing 3200 and can be coupled with the housing 3200. The fourth upper elastic member 3640 is disposed on the bobbin 3400 and can be coupled with the bobbin 3400. The fifth upper elastic member 3650, the sixth upper elastic member 3660, the seventh upper elastic member 3670, and the eighth upper elastic member 3680 may electrically connect the first upper elastic member 3610, the second upper elastic member 3620, the third upper elastic member 3630, and the fourth upper elastic member 3640 to one another. Therefore, the bobbin 3400 can be elastically supported in the housing 3200 in the vertical direction.

The first upper elastic member 3610 may be located corresponding to the first side portion 3210 of the housing 3200 along the vertical direction. The second upper elastic member 3620 may be located corresponding to the second side portion 3220 of the housing 3200 along the vertical direction. The third upper elastic member 3630 may be located corresponding to the third side portion 3230 of the housing 3200 along the vertical direction. Just as the housing 3100 lacks a portion corresponding to the third lateral plate 3140 of the cover 3100, also in the upper elastic member 3600, the portion which is disposed in the direction located in the third lateral plate 3140 and for connecting the second upper side elastic member 3620 and the third upper side elastic member is lacking. This is to secure a moving space of the bobbin 3200.

The lower elastic member 3700 may be a plate spring. The lower elastic member 3700 may be a metal. The lower elastic member 3700 may be non-magnetic. Therefore, the lower elastic member 3700 may not be affected by the magnetic force of the magnet 3300 and the electromagnetic force of the coil 3500. The lower elastic member 3700 may be electrically connected to the coil 3500. The lower elastic member 3700 may be electrically connected to the substrate. The lower elastic member 3700 can electrically connect the coil 3500 and the substrate.

The lower elastic member 3700 may be disposed under the housing 3200. The lower elastic member 3700 may be disposed under the bobbin 3400. The lower elastic member 3700 may be disposed between the housing 3200 and the base 3800. The lower elastic member 3700 may be disposed between the bobbin 3400 and the base 3800. The lower elastic member 3700 can be coupled with the housing 3200 and the bobbin 3400. The lower elastic member 3700 can elastically connect the housing 3200 and the bobbin 3400.

The lower elastic member 3700 may include a first lower elastic member 3710 and a second lower elastic member 3720 that are spaced apart from each other. A first terminal 3712-1 may be disposed on the first lower elastic member 3710 and a second terminal 3722-1 may be disposed on the second lower elastic member 3720. In addition, the first terminal 3712-1 and the second terminal 3722-1 may be electrically connected to the main substrate of the camera module. The first lower elastic member 3710 may be electrically connected to the lead wire at one side of the coil 3500 and the second lower elastic member 3710 may be electrically connected to the lead wire at the other side of the coil 3500. Therefore, power can be applied to the coil 3500 through the lower elastic member 3700 from the main substrate.

The base 3800 may be disposed under the cover 3100. The base 3800 may be disposed under the housing 3200. The base 3800 may be disposed under the bobbin 3400. An adhesive may be applied between the base 3800 and the cover 3100. An adhesive may be applied between the base 3800 and the housing 3200. The base 3800 may be approximately in the form of a square plate having a thickness.

A hole 3811 may be formed at the center of the base 3800. External light may be irradiated through the hole in the base 3800 to the image sensor.

In the base 3800, a first stopper 3812, a second stopper 3813, a third stopper 3814, and a fourth stopper 3815 which are located outside the hole 3811 and circumferentially spaced apart along the hole 3811 may be located. The first stopper 3812, the second stopper 3813, the third stopper 3814 and the fourth stopper 3815 may be protruded upward from the upper surface of the base 3800.

A terminal accommodating groove 3816 inwardly recessed may be located on the side portion of the base 3800. The first terminal 3712-1 and the second terminal 3722-1 may be disposed in the terminal accommodating groove 3816.

Upwardly raised ridge portion 3821 can be located at the edges of the base 3800. The ridge portion 3821 may include a first ridge portion 3821, a second ridge portion 3822, and a third ridge portion 3833. The first ridge portion 3821 may be positioned corresponding to the first lateral plate 3120 along the vertical direction. The second raised portions 3822 may be positioned corresponding to the second lateral plate 3130 along the vertical direction. The third ridge portion 3822 may be positioned corresponding to the fourth lateral plate 3150 along the vertical direction. As a result, the lower edge of the base 3800 corresponding to the third lateral plate 3140 may be formed with a no ridge portion having a relatively low height. A rib 3240 may be disposed on the no ridge portion of the base 3800.

At least some of the configurations in the third embodiment may be replaced with the configurations of the first and second embodiments described above or the fourth embodiment which will be described later. In addition, the detailed configurations of the cover 3100, the housing 3200, and the bobbin 3400 that can reduce the bezel size of the optical device by moving (shifting) the optical axis of the lens module from the center while performing autofocus function, and the remaining configurations except for the combined with or corresponding to the detailed configurations can be replaced with the respective configurations of the first and second embodiments or the fourth embodiment which will be described later.

Hereinafter, a camera module according to the fourth embodiment will be described. The camera module of the fourth embodiment may include a lens module (not shown), an infrared cutoff filter (not shown), a main substrate (not shown), an image sensor (not shown), control unit (not shown), and a lens driving device 6000.

The lens module may include a lens and a lens barrel. The lens module may include one or more lenses and a lens barrel for accommodating one or more lenses. However, one configuration of the lens module is not limited to the lens barrel, and any structure can be used as long as it can support one or more lenses. The lens module can be coupled to the lens driving device 5010 and moved. The lens module may be disposed, for example, in the bobbin 5500 of the lens driving device 5010. In this case, the inner circumferential surface of the lens module and the bobbin 5500 can contact each other. The lens module can be screw-coupled with the bobbin 5500 as an example. The lens module may be coupled to the bobbin 5500 by an adhesive as an example. Meanwhile, the light having passed through the lens module can be irradiated to the image sensor.

The infrared cutoff filter can block the light of the infrared region from incidenting on the image sensor. The infrared cutoff filter may be located, for example, between the lens module and the image sensor. The infrared cutoff filter may be located in a holder member (not shown) provided separately from a base 5900. However, the infrared cutoff filter may be mounted in a hole formed at the center of the base 5900. The infrared cutoff filter may be formed of a film material or a glass material as an example. The infrared cut filter may be formed by coating an infrared cutoff coating material on a plate-shaped optical filter such as a cover glass for protecting an image pickup surface and a cover glass.

The main substrate may be a printed circuit board (PCB). The main substrate can support the lens driving device 5010. An image sensor can be mounted on the main board. As an example, an image sensor may be positioned inner side the upper surface of the main substrate, and a sensor holder (not shown) may be located outside the upper surface of the main substrate. A lens driving device 5010 may be positioned above the sensor holder. Alternatively, the lens driving device 5010 may be located outside the upper surface of the main substrate, and the image sensor may be positioned inside the upper surface of the main substrate. With this structure, the light passing through the lens module accommodated inside the lens driving device 5010 can be irradiated to the image sensor mounted on the main substrate. The main substrate can supply power to the lens driving device 5010. Meanwhile, a control unit for controlling the lens driving device 5010 may be disposed on the main substrate.

The image sensor can be mounted on the main substrate. The image sensor may be positioned such that the optical axis and the lens module are aligned. Thereby, the image sensor can acquire light passing through the lens module. The image sensor can output the irradiated light as an image. The image sensor may be, for example, a charge coupled device (CCD), a metal oxide semiconductor (MOS), a CPD and a CID. However, the type of image sensor is not limited thereto.

The control unit may be mounted on the main board. The control unit may be located outside the lens driving device 5010. However, the control unit may be located inside the lens driving device 5010. The control unit can control the direction, intensity, amplitude, and the like of the current supplied to each of the components constituting the lens driving device 5010. The control unit can perform at least one of the autofocus function and the optical image stabilization function of the camera module by controlling the lens driving device 5010. That is, the control unit can control the lens driving device 5010 to move the lens module in the optical axis direction or tilt it in the direction perpendicular to the optical axis direction.

Furthermore, the control unit can perform feedback control of the optical image stabilization function. More specifically, the control unit can receive the position of a housing 5200 sensed by a sensor 6400 and control the power or current applied to a second coil 6300, thereby providing a precise optical image stabilization function.

Figure 34:
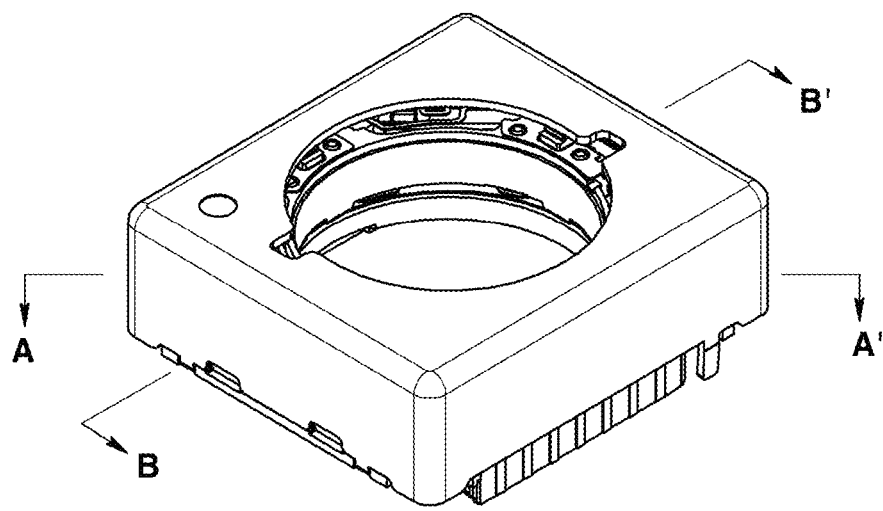
FIG. 34 is a perspective view showing the lens driving device of the fourth embodiment.
Figure 35:
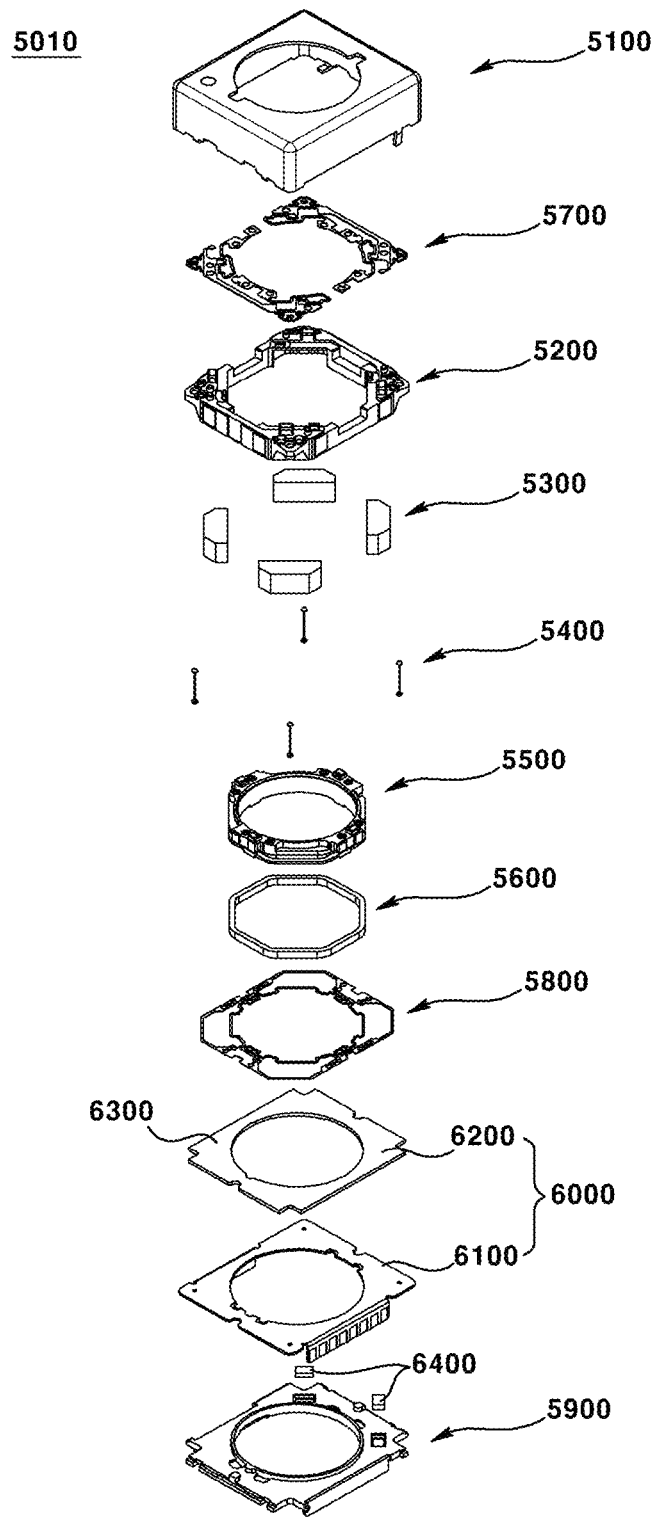
FIG. 35 is an exploded perspective view showing the lens driving device of the fourth embodiment.
Figure 36:
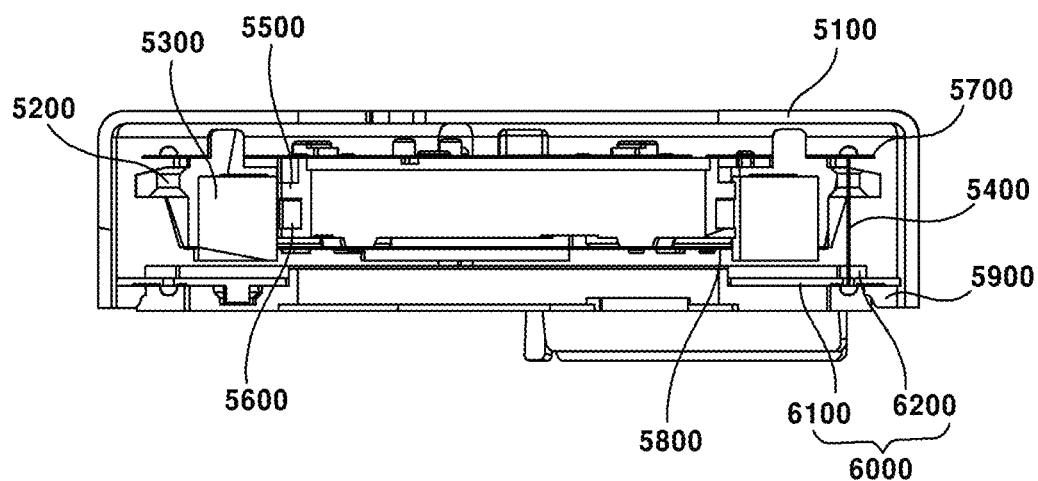
FIG. 36 is a cross-sectional view of the lens driving device of the fourth embodiment with reference to line A-A'.
Figure 37:
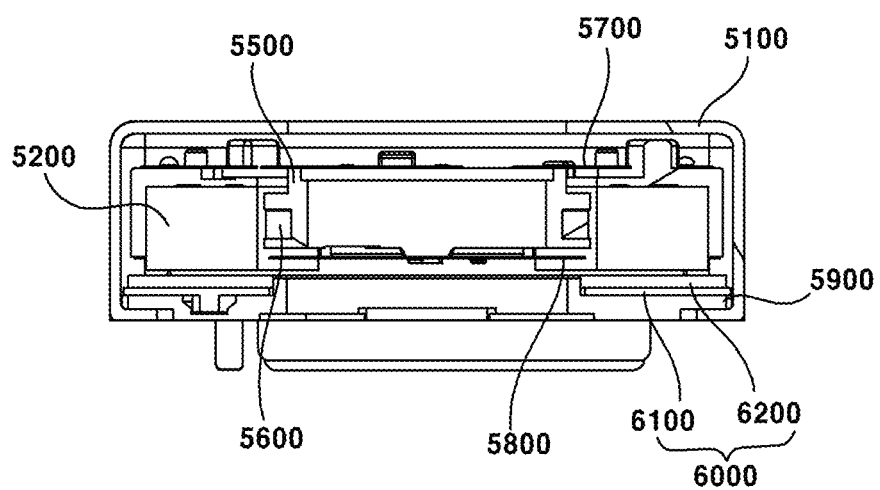
FIG. 37 is a cross-sectional view of the lens driving device of the fourth embodiment with reference to line B-B'.
Figure 38:
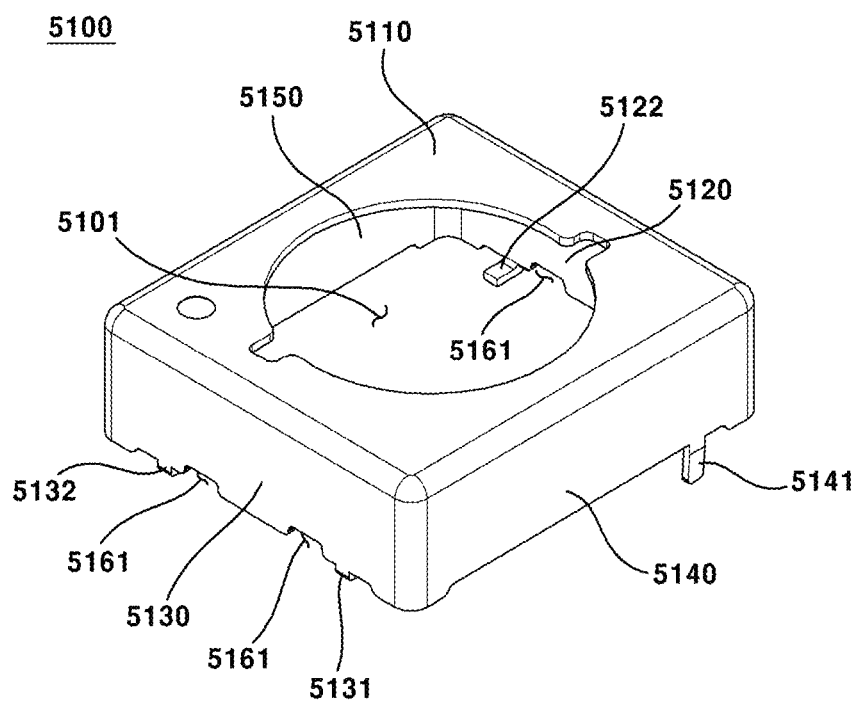
FIG. 38 is a perspective view showing the cover of the lens driving device of the fourth embodiment.
Figure 39:
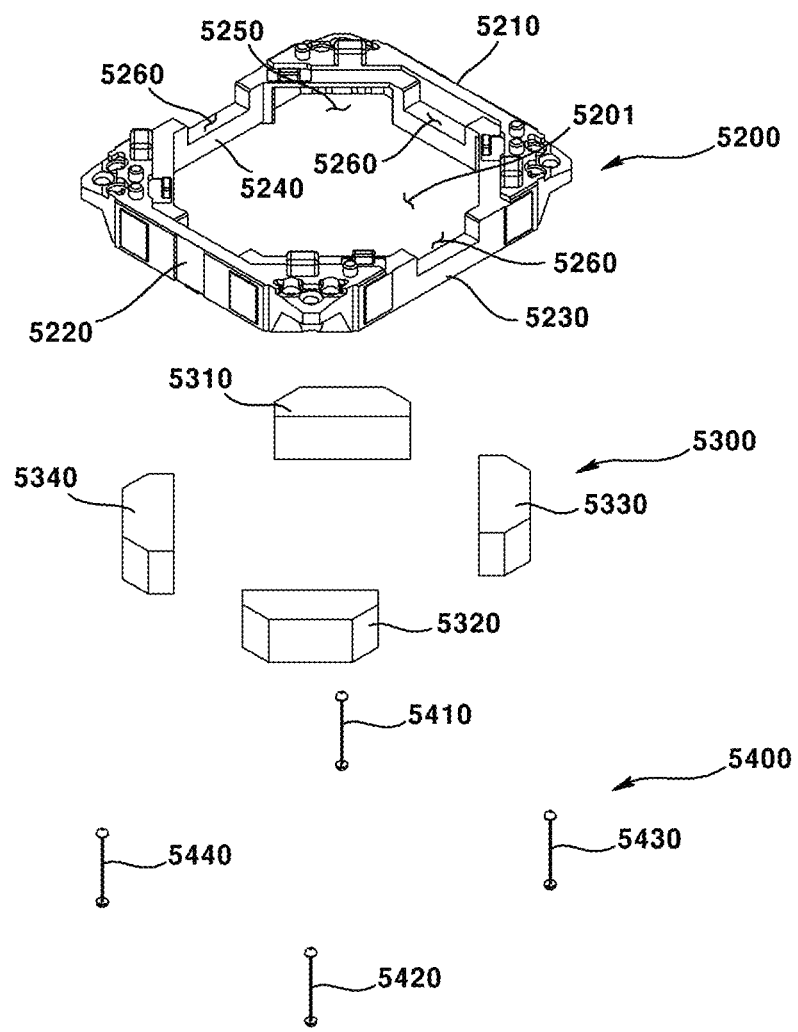
FIG. 39 is a perspective view showing a housing, a magnet, and wires of the lens driving device of the fourth embodiment.
Figure 40:
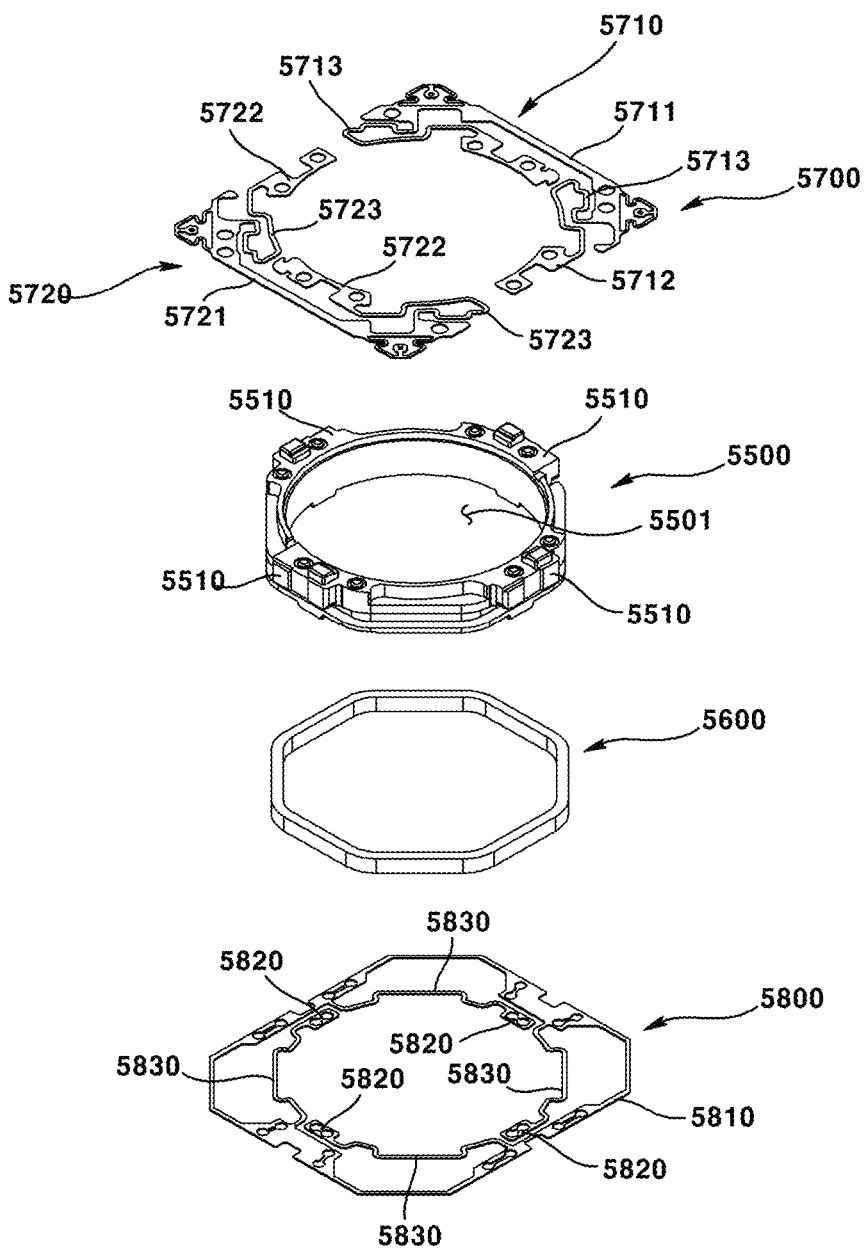
FIG. 40 is a perspective view showing the bobbin, the first coil, the upper elastic member, and the lower elastic member of the lens driving device of the fourth embodiment.
Figure 41:
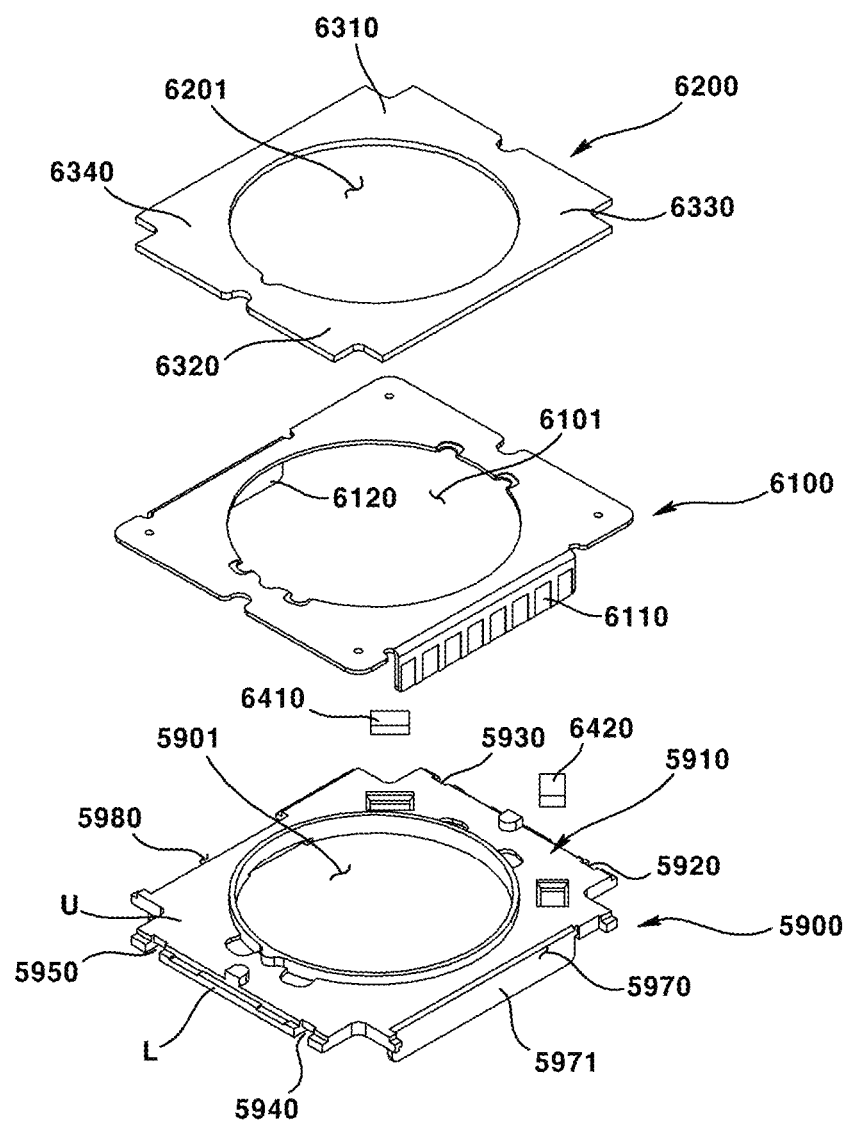
FIG. 41 is a perspective view showing a base, a substrate, and a second coil of the lens driving device of the fourth embodiment.
Figure 42:
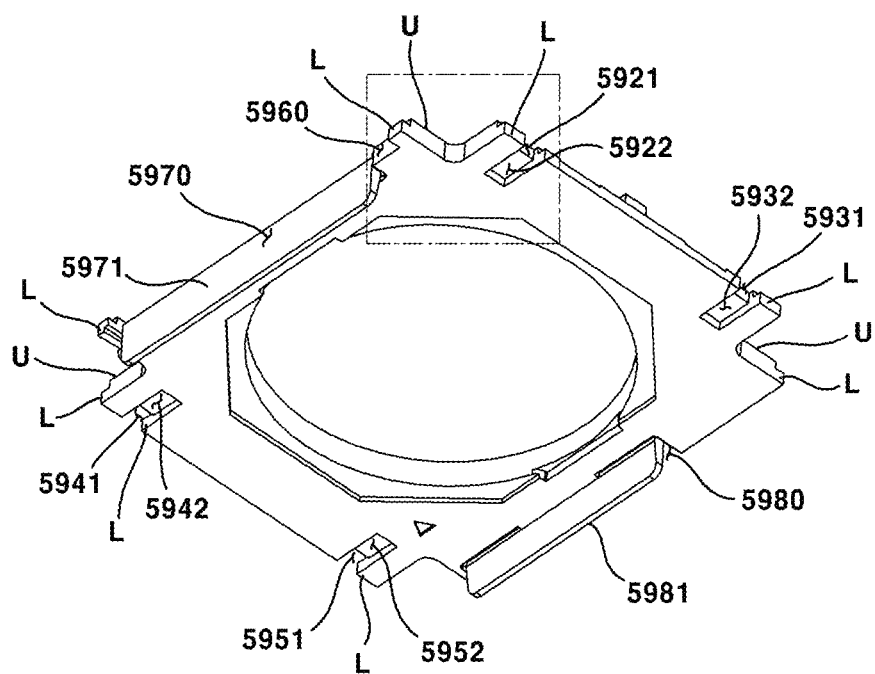
FIG. 42 is a perspective view of the base of the lens driving device of the fourth embodiment as viewed from below.
Figure 43:
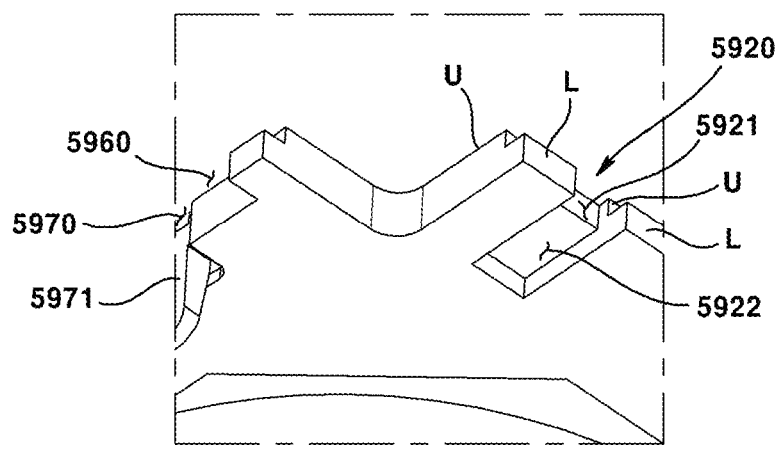
FIG. 43 is an enlarged perspective view of a part of FIG. 42.
Figure 44:
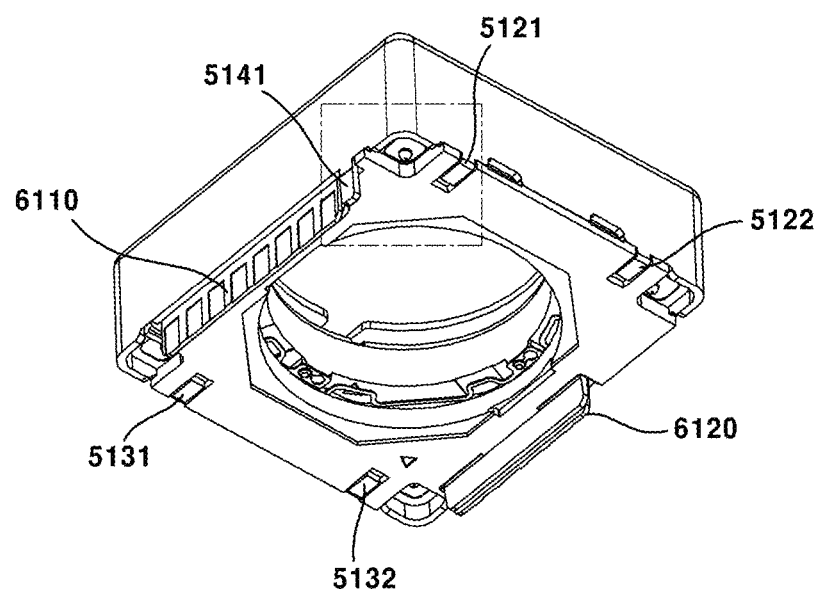
FIG. 44 is a perspective view of the lens driving device of the fourth embodiment as viewed from below.
Figure 45:
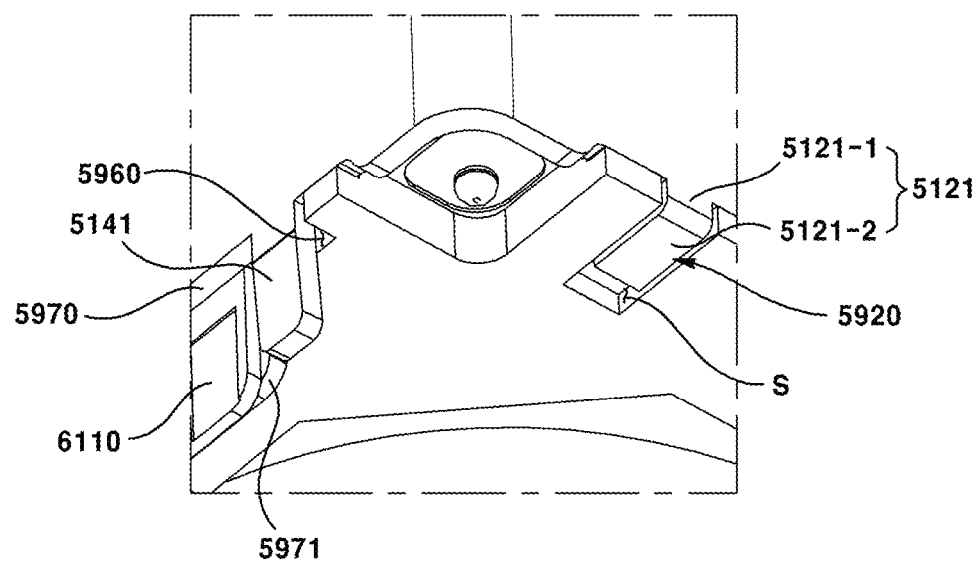
FIG. 45 is an enlarged perspective view of a part of FIG. 44.

Hereinafter, the lens driving device 5010 of the fourth embodiment will be described with reference to the drawings. FIG. 34 is a perspective view showing the lens driving device of the fourth embodiment; FIG. 35 is an exploded perspective view showing the lens driving device of the fourth embodiment; FIG. 36 is a cross-sectional view of the lens driving device of the fourth embodiment with reference to line A-A'; FIG. 37 is a cross-sectional view of the lens driving device of the fourth embodiment with reference to line B-B'; FIG. 38 is a perspective view showing the cover of the lens driving device of the fourth embodiment; FIG. 39 is a perspective view showing a housing, a magnet, and wires of the lens driving device of the fourth embodiment; FIG. 40 is a perspective view showing the bobbin, the first coil, the upper elastic member, and the lower elastic member of the lens driving device of the fourth embodiment; FIG. 41 is a perspective view showing a base, a substrate, and a second coil of the lens driving device of the fourth embodiment; FIG. 42 is a perspective view of the base of the lens driving device of the fourth embodiment as viewed from below; FIG. 43 is an enlarged perspective view of a part of FIG. 42; FIG. 44 is a perspective view of the lens driving device of the fourth embodiment as viewed from below; and FIG. 45 is an enlarged perspective view of a part of FIG. 44.

A lens driving device 5010 of the fourth embodiment moves a bobbin 5400 in an optical axis direction (up and down, vertical direction) by electromagnetic interaction between a magnet 5300 and a first coil 5600 so that autofocus function can be accomplished. For this purpose, the bobbin 5400 can be elastically supported by an upper elastic member 5700 and a lower elastic member 5800 so as to be movable in the optical axis direction. The bobbin 5400 may perform a bi-directional movement that moves both upward and downward, or may perform a uni-directional movement that moves to one side of the upper side or the lower side.

The lens driving device 5010 of the fourth embodiment moves or tilts the housing 5200 in a direction perpendicular to the optical axis by electromagnetic interaction between the magnet 5300 and the second coil 6300, so that the optical image stabilization function can be performed. To this end, the housing 5200 may be elastically supported by a wire 5400 so as to be movable or tiltable in a direction perpendicular to the optical axis.

The lens driving device 5010 of the fourth embodiment may include a cover 5100, a housing 5200, a magnet 5300, a wire 5400, a bobbin 5500, a first coil 5600, an upper elastic member 5700, a lower elastic member 5800, a base 5900, a substrate 6000, a second coil 6300, and a sensor 6400. In this case, one or more members among the cover 5100, the housing 5200, the magnet 5300, the wire 5400, the bobbin 5500, the first coil 5600, the upper elastic member 5700, the lower elastic member 5800, the base 5900, the substrate 6000, the second coil 6300, and the sensor 6400 may be omitted and modified into various structures. As an example, when the housing 5200 is omitted, the magnet 5300 is disposed inside a first lateral plate 5120, a second lateral plate 5130, a third lateral plate 5140, and a fourth lateral plate 5150 of the cover 5100 so that it can be coupled to the inner side surfaces of the first lateral plate 5120, the second lateral plate 5130, the third lateral plate 5140, and the fourth lateral plate 5150 of the cover 5100. The cover 5100 may be an exterior member of the lens driving device 5010. The cover 5110 may be in the form of a rectangular parallelepiped having a bottom open. The housing 5500, the first coil 5600, the upper elastic member 5700, the bottom elastic member 5800, the substrate 6000, and the second coil 6300 can be accommodated in the cover 5100. The base 5900 may be disposed below the cover 5100. The cover 5100 may be supported by the base 5900. The cover 5100 can be coupled to the base 5900 by an adhesive.

The material of the cover 5100 may include a metal. In this case, the cover 5100 can block the infiltration of the external electromagnetic waves or the radiation of the internal electromagnetic waves toward outside. That is, the cover 5100 can shield electromagnetic waves. Thus, the cover 5100 may be referred to as a 'shield can'. However, the material of the cover 5100 is not limited thereto. In one example, the material of the cover 5100 may include plastic.

In this case, the cover 5100 can be made by plastic injection.

The cover 5100 may include an upper plate 5110, a first lateral plate 5120, a second lateral plate 5130, a third lateral plate 5140, a fourth lateral plate 5150, a first protruded portion 5121, a second protruded portion 5122, a third protruded portion 5131, a fourth protruded portion 5132, a ground terminal 5141, and an adhesive applying portion 5161.

The upper plate 5110 may be in the form of a square plate. The upper plate 5110 may form the upper surface of the cover 5100. A hole 5101 may be formed in the center of the upper plate 5110. The hole 5101 of the upper plate 5110 may be positioned in alignment with the optical axis. External light can be introduced into the interior of the lens driving device 5010 through the hole 5101 of the upper plate 5110. The first lateral plate 5120, the second lateral plate 5130, the third lateral plate 5140, and the fourth lateral plate 5150 may be positioned on each of the four sides of the upper plate 5110.

The first lateral plate 5120 may be extended downward from the first side of the upper plate 5110. The second lateral plate 5130 may be extended downward from the second side of the upper plate 5110. The third lateral plate 5140 may be extended downward from the third side of the upper plate 5110. The fourth lateral plate 5150 may be extended downward from the fourth side of the upper plate 5110.

The first lateral plate 5120 and the second lateral plate 5130 may be disposed facing each other (the second lateral plate is disposed on the opposite side of the first lateral plate and vice versa). The third lateral plate 5140 and the fourth lateral plate 5150 may be disposed facing each other (the fourth lateral plate is disposed on the opposite side of the third lateral plate and vice versa). The first lateral plate 5120 and the second lateral plate 5130 can be connected by the third lateral plate 5140 and the fourth lateral plate 5150 and vice versa. The first lateral plate 5120 and the second lateral plate 5130 may be disposed parallel to each other. The third lateral plate 5140 and the fourth lateral plate 5150 may be disposed parallel to each other.

The first lateral plate 5120 and the third lateral plate 5140 may be disposed with a corner therebetween. The first lateral plate 5120 and the third lateral plate 5140 may be disposed adjacent to each other. The first lateral plate 5120 and the fourth lateral plate 5150 may be disposed with a corner therebetween. The first lateral plate 5120 and the fourth lateral plate 5150 may be disposed adjacent to each other. The second lateral plate 5130 and the third lateral plate 5140 may be disposed with a corner therebetween. The second lateral plate 5130 and the third lateral plate 5140 may be disposed adjacent to each other. The second lateral plate 5130 and the fourth lateral plate 5150 may be disposed with a corner therebetween. The second lateral plate 5130 and the fourth lateral plate 5150 may be disposed adjacent to each other.

The first lateral plate 5120, the second lateral plate 5130, the third lateral plate 5140 and the fourth lateral plate 5150 may be disposed at a lower end portion U of a body 5910 of the base 5900. The first lateral plate 5120, the second lateral plate 5130, the third lateral plate 5140, and the fourth lateral plate 5150 can be coupled with the lower end portion U of the body 5910 of the base 5900. The lower surfaces of the first lateral plate 5120, the second lateral plate 5130, the third lateral plate 5140, and the fourth lateral plate 5150, and the upper surface of the lower end portion U of the body 5910 of the base 5900 may face each other. The lower surfaces of the first lateral plate 5120, the second lateral plate 5130, the third lateral plate 5140, and the fourth lateral plate 5150 can be in contact with the upper surface of the lower end portion U of the body 5910 of the base 5900. An adhesive may be applied between: the lower surfaces of the first lateral plate 5120, the second lateral plate 5130, the third lateral plate 5140, and the fourth lateral plate 5150; and the upper surface of the lower end portion U of the body 5910 of the base 5900.

The first protruded portion 5121 and the second protruded portion 5122 may be located on the first lateral plate 5120. The first protruded portion 5121 and the second protruded portion 5122 may be spaced from each other in the width direction of the first lateral plate 5120. The third protruded portion 5131 and the fourth protruded portion 5132 may be located on the second lateral plate 5130. The third protruded portion 5131 and the fourth protruded portion 5132 may be spaced from each other in the width direction of the second lateral plate 5130. The first protruded portion 5121 and the third protruded portion 5131 may face each other (a third protruded portion is disposed on the opposite side of the first protruded portion, and vice versa). The first protruded portion 5121 and the third protruded portion 5131 may at least partially overlap in the horizontal direction. The second protruded portion 5122 and the fourth protruded portion 5132 may face each other (a fourth protruded portion is disposed on the opposite side of the second protruded portion, and vice versa). The second protruded portion 5122 and the fourth protruded portion 5132 may at least partially overlap in the horizontal direction.

The first protruded portion 5121 may be located on the lower surface of the first lateral plate 5120. The first protruded portion 5121 may be protruded downward from the lower surface of the first lateral plate 5120. The first protruded portion 5121 may be disposed in a first groove 5920 of the base 5900. The first protruded portion 5121 may be curved or bent (bending). The first protruded portion 5121 may be curved or bent along the direction in which the 1-2 groove 5922 of the first groove 5920 of the base 5900 extends. The first protruded portion 5121 may be curved or bent toward the third protruded portion 5131. The first protruded portion 5121 may be curved or bent 90 degrees. The first protruded portion 5121 may be curved or bent perpendicular to the outer surface of the body 5910 of the base 5900. The first protruded portion 5121 may be curved or bent perpendicularly to the outer surface of the lower end portion U of the body 5910 of the base 5900. The first protruded portion 5121 can be hooked by the base 5900 and the cover 5100 can be stably fixed thereby.

The first protruded portion 5121 may include a 1-1 portion 5121-1 protruding downward from a lower surface of the first lateral plate 5120 and a 1-2 portion 5121-2 that is curved or bent at the 1-1 portion 5121-1 of the first protruded portion 5121 (see FIG. 45). In this case, the 1-2 portion 5121-2 of the first protruded portion 5121 may be curved or bent at the lower end of the 1-1 portion 5121-1 of the first protruded portion 5121 and may be extended. The 1-1 portion 5121-1 of the first protruded portion 5121 may be disposed in the 1-1 groove 5921, and the 1-2 portion 5121-2 of the first protruded portion 5121 may be disposed in the 1-2 groove 5922.

The second protruded portion 5122 may be located on the lower surface of the first lateral plate 5120. The second protruded portion 5122 may protrude downward from the lower surface of the first lateral plate 5120. The second protruded portion 5122 may be disposed in a second groove 5930 of the base 5900. The second protruded portion 5122 may be curved or bent (bending). The second protruded portion 5122 may be curved or bent along the direction in which the 2-2 groove 5932 of the second groove 5930 of the base 5900 extends. The second protruded portion 5122 may be curved or bent toward the fourth protruded portion 5132. The second protruded portion 5122 may be curved or bent at 90 degrees. The second protruded portion 5122 may be curved or bent perpendicularly to the outer surface of the body 5910 of the base 5900. The second protruded portion 5122 may be curved or bent perpendicular to the outer surface of the lower end portion U of the body 5910 of the base 5900. The second protruded portion 5122 can be hooked by the base 5900 and the cover 5100 may be stably fixed thereby.

The second protruded portion 5122 includes a 2-1 portion protruding downward from the lower surface of the first lateral plate 5120 and a 2-1 portion protruding downwardly from the second protruded portion 5122, (see FIG. 12, substantially the same as the 1-1 and 1-2 portions of the first protruded portion). In this case, the 2-2 portion of the second protruded portion 5122 may be curved or bent at the lower end of the 2-1 portion of the second protruded portion 5122 and may be extended. The 2-1 portion of the second protruded portion 5122 may be disposed in the 2-1 groove 5931 and the 2-2 portion of the second protruded portion 5122 may be disposed in the 2-2 groove 5932.

The third protruded portion 5131 may be located on the lower surface of the second lateral plate 5130. The third protruded portion 5131 may protrude downward from the lower surface of the second lateral plate 5130. The third protruded portion 5131 may be disposed in the third groove 5940 of the base 5900. The third protruded portion 5131 can be curved or bent (bending). The third protruded portion 5131 may be curved or bent along the direction in which a 3-2 groove 5942 of the third groove 5940 of the base 5900 extends. The third protruded portion 5131 may be curved or bent toward the first protruded portion 5121. The third protruded portion 5131 may be curved or bent at 90 degrees. The third protruded portion 5131 may be curved or bent perpendicularly to the outer surface of the body 5910 of the base 5900. The third protruded portion 5131 may be curved or bent perpendicularly to the outer surface of the lower end portion U of the body 5910 of the base 5900. The third protruded portion 5131 can be hooked by the base 5900 and the cover 5100 may be stably fixed thereby.

The third protruded portion 5131 includes a 3-1 portion protruding downward from the lower surface of the second lateral plate 5130 and a 3-1 portion protruding downward from the third protruded portion 5131, (see FIG. 12, substantially the same as the 1-1 and 1-2 portions of the first protruded portion). In this case, the 3-2 portion of the third protruded portion 5131 may be curved or bent at the lower end of the 3-1 portion of the third protruded portion 5131 and may be extended. The 3-1 portion of the third protruded portion 5131 may be disposed in the 3-1 groove 5941 and the 3-2 portion of the third protruded portion 5131 may be disposed in the 3-2 groove 5942.

The fourth protruded portion 5132 may be positioned on the lower surface of the second lateral plate 5130. The fourth protruded portion 5132 may protrude downward from the lower surface of the second lateral plate 5130. The fourth protruded portion 5132 may be disposed in the fourth groove 5950 of the base 5900. The fourth protruded portion 5132 may be curved or bent (bending). The fourth protruded portion 5132 may be curved or bent along the direction in which the 4-2 groove 5952 of the fourth groove 5950 of the base 5900 extends. The fourth protruded portion 5132 may be curved or bent toward the second protruded portion 5122. The fourth protruded portion 5132 may be curved or bent 90 degrees. The fourth protruded portion 5132 may be curved or bent perpendicularly to the outer surface of the body 5910 of the base 5900. The fourth protruded portion 5132 may be curved or bent perpendicularly to the outer surface of the lower end portion U of the body 5910 of the base 5900. The fourth protruded portion 5132 can be hooked by the base 5900 and the cover 5100 may be stably fixed thereby.

The fourth protruded portion 5132 includes a 4-1 portion protruding downward from the lower surface of the second lateral plate 5130 and a 4-2 portion protruding downward from the 4-1 portion of the fourth protruded portion 5132, (see FIG. 12, substantially the same as the 1-1 and 1-2 portions of the first protruded portion). In this case, the 4-2 portion of the fourth protruded portion 5132 may be curved or bent at the lower end of the 4-4 portion of the fourth protruded portion 5132 and may be extended. The 4-1 portion of the fourth protruded portion 5132 may be disposed in the 4-1 groove 5951 and the 4-2 portion of the fourth protruded portion 5132 may be disposed in the 4-2 groove 5952.

The ground terminal 5141 may be located on the lower surface of the fourth lateral plate 5150. The ground terminal 5141 may protrude downward from the lower surface of the fourth lateral plate 5150. The ground terminal 5141 may be disposed in the fifth groove 5960 of the base 5900. The ground terminal 5141 may be electrically connected to the main substrate of the camera module. As a result, the residual electromagnetic force accumulated in the cover 5100 can be discharged to the outside through the ground terminal 5141.

The adhesive applying portion 5161 may be a groove for applying an adhesive. The number of the adhesive applying portion 5161 may be plural. A plurality of adhesive applying portions 5161 may be located on the lower surface of the first lateral plate 5120 and the lower surface of the second lateral plate 5130.

The adhesive applying portion 5161 located on the first lateral plate 5120 can be positioned between the first protruded portion 5121 and the second protruded portion 5122. The adhesive applying portion 5161 located on the first lateral plate 5120 may be formed so as to be recessed upward from the lower surface of the first lateral plate 5120 (so that the lower surface of the first lateral plate may enter upward). Accordingly, a space may be formed between the upper surface of the lower end portion U of the body 5910 of the base 5900 and the lower surface of the first lateral plate 5120 by the adhesive applying portion 5161 located on the first lateral plate 5120. An adhesive is applied to such a space and the cover 5100 can be stably fixed.

The adhesive applying portion 5161 located on the second lateral plate 5130 may be positioned between the third protruded portion 5131 and the fourth protruded portion 5132. The adhesive applying portion 5161 located on the second lateral plate 5130 may be formed so as to be recessed upward from the lower surface of the second lateral plate 5130 (so that the lower surface of the first lateral plate may enter upward). A space can be formed between the upper surface of the lower end portion U of the body 5910 of the base 5900 and the lower surface of the second lateral plate 5130 by the adhesive applying portion 5161 located on the second lateral plate 5130. An adhesive is applied to such a space and the cover 5100 can be stably fixed thereby.

The housing 5200 may comprise a plastic material. Housing 5200 can be made by plastic insert injection. That is, the housing 5200 may be a plastic injection mold.

A driving force may be applied to the housing 5200 by an electromagnetic interaction between the magnet 5300 and the second coil 6300. The housing 5200 can be moved or tilted in the direction perpendicular to the optical axis by the driving force. In this case, the lens module of the camera module moves integrally with the housing 5200 so that the optical image stabilization function can be performed.

The housing 5200 may have a hollow shape in which a hole 5201 is formed at the center thereof. A bobbin 5500 may be disposed in the hole 5201 of the housing 5200. That is, the bobbin 5500 may be disposed in the housing 5200. A magnet 5300 may be disposed in the housing 5200. An upper elastic member 5700 may be disposed on the housing 5200. Below the housing 5200, a lower elastic member 5800 may be disposed. A substrate 6000 may be disposed below the housing 5200. A lower elastic member 5800 may be disposed between the housing 5200 and the substrate 6000. A base 5900 may be disposed below the housing 5200.

Between the housing 5200 and the base 5900, the lower elastic member 5800 and the substrate 6000 can be disposed. The housing 5200 and the substrate 6000 can be connected by wires 5400. The housing 5200 and the base 5900 may be connected by the wires 5400. The housing 5200 can be elastically supported by the wires 5400. The housing 5200 may be spaced upwardly from the substrate 6000 and the base 5900 by the wires 5400. That is, the housing 5200 may be lifted by the wires 5400 and moved or tilted in a direction perpendicular to the optical axis.

The housing 5200 may include a first side portion 5210, a second side portion 5220, a third side portion 5230, a fourth side portion 5240, a magnet accommodating portion 5250 and a stopper accommodating portion 5260.

The first side portion 5210 and the second side portion 5220 may face each other with the magnet 5300, the bobbin 5500 and the first coil 5600 therebetween (the second side portion is disposed on the opposite side of the first side portion, and vice versa). The third side portion 5230 and the fourth side portion 5240 may face each other with the magnet 5300, the bobbin 5500 and the first coil 5600 therebetween (the fourth side portion is disposed on the opposite side of the third side portion, and vice versa). The first side portion 5210 and the second side portion 5220 can be connected by the third lateral plate 5230 and the fourth side portion 5240 and vice versa. The first side portion 5210 and the second side portion 5220 may be disposed parallel to each other. The third side portion 5230 and the fourth side portion 5240 may be disposed parallel to each other.

A magnet 5300 may be disposed in the magnet accommodating portion 5250. Four magnet accommodating portions 5250 may exist. The four magnet accommodating portions 5250 may be located at the corners between the first side portion 5210 and the third side portion 5230, between the third side portion 5230 and the second side portion 5220, between the second side portion 5220 and the fourth side portion 5240, and between the fourth side portion 5240 and the first side portion 5210, respectively. A first magnet 5310, a second magnet 5320, a third magnet 5330 and a fourth magnet 5340 may be disposed in the four magnet accommodating portions 5250, respectively.

A stopper 5510 of the bobbin 5500 may be disposed in the stopper accommodating portion 5260. There may be four stopper accommodating portions 5260. The four stopper accommodating portions 5260 may be located on the first side portion 5210, the second side portion 5220, the third side portion 5230 and the fourth side portion 5240, respectively. The four stopper accommodating portions 5260 are recessed downward from the upper surfaces of the first side portion 5210, the second side portion 5220, the third side portion 5230, and the fourth side portion 5240 (so that the upper surfaces of the first side portion, the second side portion, the third side portion, and the fourth side portion may enter downward). Four stoppers 5510 of the bobbin 5500 may be disposed in the four stopper accommodating portions 5260, respectively. The rotation or the downward movement of the bobbin 5500 can be blocked by the four stoppers 5510 of the bobbin 5500.

The magnet 5300 may be disposed in the housing 5200. The magnet 5300 may be disposed in the magnet accommodating portion 5250 of the housing 5200. The magnet 5300 may be disposed facing the first coil 5600. The magnet 5300 may be disposed facing the second coil 6300. When a current is applied to the first coil 5600, the magnet 5300 and the first coil 5600 may be electromagnetically interacted. In this case, the bobbin 5500 moves in the direction of the optical axis to perform the autofocus function. When a current is applied to the second coil 6300, the magnet 5300 and the second coil 6300 can perform electromagnetic interaction. In this case, the housing 5200 may be moved or tilted in the direction perpendicular to the optical axis to perform the optical image stabilization function. The magnet 5300 may include a first magnet 5310, a second magnet 5320, a third magnet 5330, and a fourth magnet 5340. The first magnet 5310, the second magnet 5320, the third magnet 5330 and the fourth magnet 5340 may be disposed in the four magnet accommodating portions 5250 of the housing 5200.

The wire 5400 may be extended in the optical axis direction and have a length. The upper end of the wire 5400 may be disposed in the housing 5200. The upper end of the wire 5400 may be disposed at the corner of the housing 5200. The upper end of the wire 5400 may be disposed in the upper elastic member 5700 through the housing 5200. In this case, the wire 5400 can be electrically connected to the upper elastic member 5700. The lower end of the wire 5400 may be disposed on the substrate 6000. In this case, the wire 5400 may be electrically connected to the substrate 6000. The lower end of the wire 5400 may be disposed on the base 5900 through the substrate 6000. The wire 5400 can elastically support the housing 5200.

The wire 5400 may also function as a conductive member that receives current from the substrate 6000 and delivers the current to the upper elastic member 5700. The current supplied to the upper elastic member 5700 may be applied to the first coil 5600.

The wire 5400 may include a first wire 5410, a second wire 5420, a third wire 5430, and a fourth wire 5440.

The first wire 5410 may be located at the outer side of the first magnet 5310. A first wire 5410 may be extended downward at the corner between the first side portion 5210 and the fourth side portion 5240 and be secured to the substrate 6000. The first wire 5410 may be fixed to the first upper elastic member 5710 through a corner between the first side portion 5210 and the fourth side portion 5240. The first wire 5410 may be fixed to the base 5900 through the substrate 6000.

The second wire 5420 may be located at the outer side of the second magnet 5320. The second wire 5420 may be extended downward at the corner between the second side portion 5220 and the third side portion 5230 and be secured to the substrate 6000. The second wire 5420 may be fixed to the second upper elastic member 5720 through a corner between the second side portion 5220 and the third side portion 5230. The second wire 5420 may be fixed to the base 5900 through the substrate 6000.

The third wire 5430 may be located at the outer side of the third magnet 5330. A third wire 5430 may be extended downward at the corner between the first side portion 5210 and the third side portion 5230 and be secured to the substrate 6000. The third wire 5430 may be fixed to the first upper elastic member 5710 through a corner between the first side portion 5210 and the third side portion 5230. The third wire 5430 may be fixed to the base 5900 through the substrate 6000.

The fourth wire 5440 may be located at the outer side of the fourth magnet 5340. A fourth wire 5440 may be extended downward at the corner between the second side portion 5220 and the fourth side portion 5240 and be secured to the substrate 6000. The fourth wire 5440 may be fixed to the second upper elastic member 5720 through a corner between the second side portion 5220 and the fourth side portion 5240. The fourth wire 5440 may be fixed to the base 5900 through the substrate 6000.

One of the first wire 5410 and the third wire 5430 may be electrically connected to the first upper elastic member 5710. One of the second wire 5420 and the fourth wire 5440 may be electrically connected to the second upper elastic member 5720.

The bobbin 5500 may include a plastic material. The bobbin 5500 may be manufactured by plastic insert injection. That is, the bobbin 5500 may be a plastic injection mold.

A driving force may be applied to the bobbin 5500 by an electromagnetic interaction between the magnet 5300 and the first coil 5600. The bobbin 5500 can move in the optical axis direction. In this case, the lens module of the camera module may move integrally with the bobbin 5500 to perform an autofocus function.

The bobbin 5500 may have a hollow shape with a hole 5501 formed at its center. The lens module of the camera module may be disposed in the hole 5501 of the bobbin 5500. That is, the lens module may be disposed in the bobbin 5500. A first coil 5600 may be disposed on the bobbin 5500. The first coil 5600 may be disposed on the outer circumferential surface of the bobbin 5500. An upper elastic member 5700 may be disposed on the bobbin 5500. Below the bobbin 5500, a lower elastic member 5800 may be disposed. The bobbin 5500 and the housing 5200 may be connected by the upper elastic member 5700 and the lower elastic member 5800.

The bobbin 5500 can be elastically supported by the upper elastic member 5700 and the lower elastic member 5800. As a result, the bobbin 5500 can be spaced apart from the housing 5200. Further, the bobbin 5500 can move in the direction of the optical axis by the upper elastic member 5700 and the lower elastic member 5800.

The bobbin 5500 may include a stopper 5510. The stopper 5510 may be protruded outward from the outer circumferential surface of the bobbin 5500. The stopper 5510 may be positioned above the first coil 5600. The stopper 5510 can be accommodated in the stopper accommodating portion 5260 of the housing 5200. The number of stoppers 5510 may be four. Four stoppers 5510 can be accommodated in the four stopper accommodating portions 5260, respectively. The rotational movement or the downward movement of the bobbin 5500 can be blocked by contacting the four stoppers 5510 with the housing 5200.

The first coil 5600 may be a (wound) coil block wound on the outer circumferential surface of the bobbin 5500. The first coil 5600 may face the magnet 5300. The first coil 5600 may electromagnetically interact with the magnet 5300 when a current is applied to provide a driving force to the bobbin 5500. The first coil 5600 may be electrically connected to the upper elastic member 5700. One end and the other end of the first coil 5500 can be drawn out from the coil block. One end of the first coil 5500 may be electrically connected to a first upper elastic member 5710. The other end of the first coil 5500 may be electrically connected to a second upper elastic member 5720. A current circuit can be formed by the first coil 5500, the upper elastic member 5700, the wire 5400, and the substrate 6000. The current can be supplied to the first coil 5500 through the wire 5400 and the upper elastic member 5700 on the substrate 6000. In this case, the direction, intensity, and wavelength of the current supplied from the substrate 6000 can be controlled by the control unit of the camera module.

The upper elastic member 5700 may be a plate spring. The upper elastic member 5700 may be disposed on the housing 5200 and the bobbin 5500. The upper elastic member 5700 may be disposed on the upper surface of the housing 5200 and the upper surface of the bobbin 5500.

The upper elastic member 5700 can be coupled with the upper surface of the housing 5200 and the upper surface of the bobbin 5500. The upper elastic member 5700 can connect the housing 5200 and the bobbin 5500. The upper elastic member 5700 can elastically support the bobbin 5500. The upper elastic member 5700 may be electrically connected to the first coil 5600. The upper elastic member 5700 may be electrically connected to the wire 5400.

The upper elastic member 5700 may include a first upper elastic member 5710 and a second upper elastic member 5720. The first upper elastic member 5710 and the second upper elastic member 5720 may be spaced apart from each other. The first upper elastic member 5710 and the second upper elastic member 5720 may be electrically connected to the first coil 5600, respectively. The first upper elastic member 5710 may be electrically connected to one of the first wire 5410 and the third wire 5430. The second upper elastic member 5710 may be electrically connected to the second wire 5420 and the fourth wire 5440. One of the first upper elastic member 5710, the first wire 5410, and the third wire 5430 may be a positive (+) conductive line. One of the second upper elastic member 5720, the second wire 5420, and the fourth wire 5440 may be a negative (−) conductive line.

The first upper elastic member 5710 may include a 1-1 coupling portion 5711, a 1-2 coupling portion 5712, and a first connecting portion 5713. The 1-1 coupler 5711 may be disposed on the upper surface of the housing 5200 and may be coupled with the upper surface of the housing 5200. The 1-2 coupling portion 5712 may be disposed on the upper surface of the bobbin 5500 and may be coupled with the upper surface of the bobbin 5500. The 1-2 coupling portion 5712 may be located at the inner side of the 1-1 coupling portion 5711. One end of the first coil 5600 may be soldered to the 1-2 coupling portion 5712. The 1-2 coupling portion 5712 may be electrically connected to one end of the first coil 5600. The first connecting portion 5713 can elastically connect the 1-1 coupling portion 5711 and the 1-2 coupling portion 5712. The first 1-2 connecting portion 5712 and the first connecting portion 5713 may be separated into two or more members that are spaced apart from each other.

The second upper elastic member 5720 may include a 2-1 coupling portion 5721, a 2-2 coupling portion 5722, and a second connecting portion 5723. The 2-1 coupling portion 5721 may be disposed on the upper surface of the housing 5200 and may be coupled with the upper surface of the housing 5200. The 2-2 coupling portion 5722 may be disposed on the upper surface of the bobbin 5500 and may be coupled with the upper surface of the bobbin 5500. The 2-2 coupling portion 5722 may be located at the inner side of the 2-1 coupling portion 5721. The other end of the first coil 5600 may be soldered to the 2-2 coupling portion 5722. The 2-2 coupling portion 5722 may be electrically connected to the other end of the first coil 5600. The second connecting portion 5723 can elastically connect the 2-1 coupling portion 5721 and the 2-2 coupling portion 5722. The 2-2 coupling portion 5722 and the second coupling portion 5723 may be separated into two or more members that are spaced apart from each other.

The lower elastic member 5800 may be a plate spring. The lower elastic member 5800 may be disposed under the housing 5200 and the bobbin 5500. The lower elastic member 5800 may be disposed on the lower surface of the housing 5200 and the lower surface of the bobbin 5500. The lower elastic member 5800 can be coupled with the lower surface of the housing 5200 and the lower surface of the bobbin 5500. The lower elastic member 5800 can connect the housing 5200 and the bobbin 5500. The lower elastic member 5800 can elastically support the bobbin 5500.

The lower elastic member 5800 may include a first coupling portion 5810, a second coupling portion 5820, and a connecting portion 5830. The first coupling portion 5810 may be disposed on the lower surface of the housing 5200 and may be coupled with the lower surface of the housing 5200. The second coupling portion 5820 may be disposed on the lower surface of the bobbin 5500 and may be coupled with the lower surface of the bobbin 5500. The second coupling portion 5820 may be located at the inner side of the first coupling portion 5810. The connecting portion 5830 may elastically connect the first coupling portion 5810 and the second coupling portion 5820. The second coupling portion 5820 and the coupling portion 5830 may be separated into two or more members that are spaced apart from each other.

The base 5900 may be disposed under the cover 5100. The base 5900 can support the cover 5100. A cover 5100 may be disposed on the base 5900. The base 5900 may be disposed under the housing 5200 and the bobbin 5500. The base 5900 may be spaced downwardly from the housing 5200 and the bobbin 5500. The substrate 6000 may be disposed on the upper surface of the base 5900.

The base 5900 may include a body 5910, a first groove 5920, a second groove 5930, a third groove 5940, a fourth groove 5950, a fifth groove 5960, a sixth groove 5970, a first terminal support 5971, a seventh groove 5980, and a second terminal support 5981.

The body 5910 may be roughly in the form of a square plate. A hole 5901 may be formed at the center of the body 5910. The light transmitted through the lens module through the hole 5901 of the body 5910 can be irradiated to the image sensor. The first lateral plate 5120, the second lateral plate 5130, the third lateral plate 5140, and the fourth lateral plate 5150 of the cover 5100 may be disposed on the body 5910. The upper surface of the body 5910 and the lower surfaces of the first lateral plate 5120, the second lateral plate 5130, the third lateral plate 5140, and the fourth lateral plate 5150 can face each other. An adhesive may be applied between the upper surface of the body 5910 and the lower surfaces of the first lateral plate 5120, the second lateral plate 5130, the third lateral plate 5140, and the fourth lateral plate 5150. The upper surface of the body 5910 and the lower surfaces of the first lateral plate 5120, the second lateral plate 5130, the third lateral plate 5140, and the fourth lateral plate 5150 can be in contact with one another. The substrate 6000 may be disposed on the upper surface of the body 5910. In this case, the substrate 6000 may be disposed in the cover 5100 and positioned inside the first lateral plate 5120, the second lateral plate 5130, the third lateral plate 5140, and the fourth lateral plate 5150.

The body 5910 can be divided into an upper end portion U and a lower end portion L by a height difference of an upper surface. The lower end portion L of the body 5910 may be located at the edge of the upper end portion U of the body 5910. The lower end portion L of the body 5910 may be protruded outward from the outer side surface of the upper end portion U of the body 5910. The upper surface of the lower end portion L of the body 5910 may be positioned lower than the upper surface of the upper end portion U of the body 5910.

The substrate 6000 may be disposed on the upper surface of the upper portion H of the body 5910. The first lateral plate 5120, the second lateral plate 5130, the third lateral plate 5140 and the fourth lateral plate 5150 of the cover 5100 may be disposed on the lower end portion L of the body 5910. The upper surface of the lower end portion L of the body 5910 and the lower surfaces of the first lateral plate 5120, the second lateral plate 5130, the third lateral plate 5140 and the fourth lateral plate 5150 can face each other. The adhesive may be applied between the upper surface of the lower end portion L of the body 5910 and the lower surfaces of the first lateral plate 5120, the second lateral plate 5130, the third lateral plate 5140 and the fourth lateral plate 5150. The upper surface of the lower end portion L of the body 5910 and the lower surfaces of the first lateral plate 5120, the second lateral plate 5130, the third lateral plate 5140 and the fourth lateral plate 5150 can be in contact with one another.

A first protruded portion 5121 of the cover 5100 may be disposed in the first groove 5920. An adhesive may be applied to the first groove 5920. The first groove 5920 may include a 1-1 groove 5921 and a 1-2 groove 5922.

The 1-1 groove 5921 may be extended in the vertical direction. The 1-1 groove 5921 may be extended from the upper surface of the body 5910 to the lower surface of the body 5910. The 1-1 groove 5921 may be formed by recessing the outer surface of the body 5910 (the outer side surface of the body is formed so as to enter inward). The first groove 5921 may be extended from the upper surface of the upper end portion U of the body 5910 to the lower surface of the lower end portion L of the body 5910. The 1-1 groove 5921 may be formed by recessing the outer side surface of the upper end portion U of the body 5910 and the outer side surface of the lower end L of the body 5910 (the outer side surface of the upper end portion of the body and the outer side surface of the lower end portion of the body are formed so as to enter inward). The 1-1 groove 5921 may be disposed with a portion protruding downward from the lower surface of the first lateral plate 5120 at the first protruded portion 5121.

The 1-2 groove 5922 may be extended in the horizontal direction. The 1-2 groove 5922 may be extended to one side from the bottom of the 1-1 groove 5921. The 1-2 groove 5922 may be extended perpendicularly to the direction in which the 1-1 groove 5921 extends. The 1-2 groove 5922 may be extended perpendicularly to the outer side surface of the body 5910. The 1-2 groove 5922 may be extended in the direction in which the 3-2 groove 5942 is located in the lower portion of the 1-1 groove 5921. The 1-2 groove 5922 may be formed by recessing the lower surface of the body 5910 (the lower surface of the body is formed so as to enter upward). The 1-2 groove 5922 may be located at the lower end portion L of the body 5910. The 1-2 groove 5922 may be formed by recessing the lower surface of the lower end portion L of the body 5910 (the lower surface of the lower end portion of the body is formed to enter upward). The first protruded portion 5121 may be curved or bent along the 1-2 groove 5922. The 1-2 groove 5922 may be extended beyond the end portion of the first protruded portion 5121. As a result, an extra space S (see FIG. 12) extending beyond the first protruded portion 5121 may exist in the 1-2 groove 5922. The adhesive is applied to the extra space S thus formed, so that the first protruded portion 5121 can be stably fixed to the base 5900.

In the modified example (not shown) of the fourth embodiment, the 1-2 groove 5922 may include a first accommodating portion in which the first modified example 5121 is disposed and a second accommodating portion located under the first accommodating portion and to which the adhesive is applied. The second accommodating portion can be further extended in the first groove 5921 than the first accommodating portion to secure a sufficient adhesive application space.

The second groove 5930 may be disposed with the second protruded portion 5122 of the cover 5100. The second groove 5930 may be coated with an adhesive. The second groove 5930 may include the 2-1 groove 5931 and the 2-2 groove 5932.

The 2-1 groove 5931 may be extended in the vertical direction. The 2-1 groove 5931 may be extended from the upper surface of the body 5910 to the lower surface of the body 5910. The 2-1 groove 5921 may be formed by recessing the outer surface of the body 5930 (the outer surface of the body is formed so as to enter inward). The 2-1 groove 5931 may be extended from the upper surface of the upper end portion U of the body 5910 to the lower surface of the lower end portion L of the body 5910. The 2-1 groove 5931 may be formed by recessing the outer side surface of the upper end portion U of the body 5910 and the outer side surface of the lower end L of the body 5910 (the outer side surface of the upper end of the body and the outer side surface of the lower end portion of the body are formed so as to enter inward). In the 2-1 groove 5931, a portion protruding downward from the lower surface of the first lateral plate 5120 at the second protruded portion 5122 may be disposed.

The 2-2 groove 5932 may be extended in the horizontal direction. The 2-2 groove 5932 may be extended to one side from the lower portion of the 2-1 groove 5931. The 2-2 groove 5932 may be extended perpendicularly to the direction in which the 2-1 groove 5931 is extended. The 2-2 groove 5932 may be extended perpendicularly to the outer side surface of the body 5910. The 2-2 groove 5932 may be extended in the direction in which the 4-2 groove 5952 are located in the lower portion of the 2-1 groove 5931. The 2-2 groove 5932 may be formed by recessing the lower surface of the body 5910 (the lower surface of the body is formed so as to enter upward). The 2-2 groove 5932 may be located at the lower end portion L of the body 5910. The 2-2 groove 5932 can be formed by recessing the lower surface of the lower end portion L of the body 5910 (the lower surface of the lower end portion of the body is formed so as to enter upward). The second protruded portion 5122 along the 2-2 groove 5932 may be curved or bent. The 2-2 groove 5932 may be extended beyond the end of the second protruded portion 5122. As a result, there may be an extra space extending beyond the second protruded portion 5122 in the 2-2 groove 5932. An adhesive is applied to the extra space thus formed, so that the second protruded portion 5122 can be stably fixed to the base 5900.

In the modified example (not shown) of the fourth embodiment, the 2-2 groove 5932 may include a first accommodating portion in which the second protruded portion 5122 is disposed and a second accommodating portion located under the first accommodating portion and to which the adhesive is applied. The second accommodating portion can be extended further in the 2-1 groove 5931 than the first accommodating portion to secure a sufficient space for applying the adhesive.

The fourth protruded portion 5131 of the cover 5100 may be disposed in the third groove 5940. An adhesive may be applied to the third groove 5940. The third groove 5940 may include a 3-1 groove 5941 and a 3-2 groove 5942.

The 3-1 groove 5941 may be extended in the vertical direction. The 3-1 groove 5941 may be extended from the upper surface of the body 5910 to the lower surface of the body 5910. The 3-1 groove 5941 may be formed by recessing the outer side surface of the body 5910 (the outer side surface of the body is formed so as to enter inward). The 3-1 groove 5941 may be extended from the upper surface of the upper end portion U of the body 5910 to the lower surface of the lower end portion L of the body 5910. The 3-1 groove 5941 may be formed by recessing the outer side surface of the upper end portion U of the body 5910 and the outer side surface of the lower end portion L of the body 5910 (the outer side surface of the upper end portion of the body and the outer side surface of the lower end portion of the body are formed so as to enter inward). A portion of the third protruded portion 5131 protruding downward from the lower surface of the second lateral plate 5130 may be disposed in the 3-1 groove 5941.

The 3-2 groove 5942 may be extended in the horizontal direction. The 3-2 groove 5942 may be extended to one side from the lower portion of the 3-1 grooves 5941. The 3-2 groove 5942 may be extended perpendicularly to the direction in which the 3-1 groove 5941 is extended. The 3-2 groove 5942 may be extended perpendicularly to the outer side surface of the body 5910. The 3-2 groove 5942 may be extended in the direction in which the 1-2 groove 5922 are located in the lower portion of the 3-1 groove 5941. The 3-2 groove 5942 may be formed by recessing the lower surface of the body 5910 (the lower surface of the body is formed so as to enter upward). The 3-2 groove 5942 may be located at the lower end portion L of the body 5910. The 3-2 groove 5942 can be formed by recessing the lower surface of the lower end portion L of the body 5910 (the lower surface of the lower end portion of the body is formed so as to enter upward). The third protruded portion 5131 along the 3-2 groove 5942 can be curved or bent. The 3-2 groove 5942 may be extended beyond the end of the third protruded portion 5131. As a result, an extra space extending beyond the third protruded portion 5131 may exist in the 3-2 groove 5942. The adhesive is applied to the extra space thus formed, so that the third protruded portion 5131 can be stably fixed to the base 5900.

In the modified example (not shown) of the fourth embodiment, the 3-2 groove 5942 has a first accommodating portion in which the third protruded portion 5131 is disposed and a second accommodating portion located under the first accommodating portion and to which the adhesive is applied. The second accommodating portion can be extended further in the 3-1 groove 5941 than the first accommodating portion to secure a sufficient adhesive application space.

The fourth protruded portion 5132 of the cover 5100 may be disposed in the fourth groove 5950. An adhesive may be applied to the fourth groove 5950. The fourth groove 5950 may include a 4-1 groove 5951 and a 4-2 groove 5952.

The 4-1 groove 5951 may be extended in the vertical direction. The 4-1 groove 5951 may be extended from the upper surface of the body 5910 to the lower surface of the body 5910. The 4-1 groove 5951 may be formed by recessing the outer side surface of the body 5910 (the outer surface of the body is formed so as to enter inward). The 4-1 groove 5951 may be extended from the upper surface of the upper end portion U of the body 5910 to the lower surface of the lower end portion L of the body 5910. The 4-1 groove 5951 may be formed by recessing the outer side surface of the upper end portion U of the body 5910 and the outer side surface of the lower end portion L of the body 5910 (the outer side surface of the upper end portion of the body and the outer side surface of the lower end portion of the body are formed so as to enter inward). A portion of the fourth protruded portion 5132 protruding downward from the lower surface of the second lateral plate 5130 may be disposed in the 4-1 groove 5951.

The 4-2 groove 5952 may be extended in the horizontal direction. The 4-2 groove 5952 may be extended to one side from the lower portion of the 4-1 groove 5951. The 4-2 groove 5952 may be extended perpendicularly to the direction in which the 4-1 groove 5951 extends. The 4-2 groove 5952 may be extended perpendicularly to the outer side surface of the body 5910. The 4-2 groove 5952 may be extended in the direction in which the 2-2 groove 5932 is located in the lower portion of the 4-1 groove 5951. The 4-2 groove 5952 can be formed by recessing the lower side surface of the body 5910 (the lower side surface of the body is formed so as to enter upward). The 4-2 groove 5952 may be located at the lower end portion L of the body 5910. The 4-2 groove 5952 can be formed by recessing the lower surface of the lower end portion L of the body 5910 (the lower surface of the lower end portion of the body is formed so as to enter upward). The fourth protruded portion 5132 may be curved or bent along the 4-2 groove 5952. The 4-2 groove 5952 may be extended beyond the end of the fourth protruded portion 5132. As a result, an extra space extending beyond the fourth protruded portion 5132 may exist in the 4-2 groove 5952. The adhesive is applied to the extra space S thus formed, so that the fourth protruded portion 5132 can be stably fixed to the base 5900.

In the modified example (not shown) of the fourth embodiment, the 4-2 groove 5952 has a first accommodating portion in which the fourth protruded portion 5132 is disposed and a second accommodating portion located under the first accommodating portion and to which the adhesive is applied. The second accommodating portion can be extended further in the 4-1 groove 5951 than the first accommodating portion to secure a sufficient adhesive applying space.

A ground terminal 5141 of the cover 5100 may be disposed in the fifth groove 5960. The fifth groove 5960 may be coated with an adhesive. The fifth groove 5960 may be located adjacent to the sixth groove 5970. The fifth groove 5960 may be connected to the sixth groove 5970.

The fifth groove 5960 may be formed by recessing the outer side surface of the body 5910 (the outer side surface of the body is formed so as to enter inward). The fifth groove 5960 may be formed by recessing the outer side surface of the upper end portion U of the body 5910 and the outer side surface of the lower end portion L of the body 5910 (the outer side surface of the upper end of the body and the outer side surface of the lower end of the body are formed so as to enter inward). The fifth groove 5960 may be provided with a portion protruding downward from the lower surface of the third lateral plate 5140 at the ground terminal 5141. The outer side surface of the body 5910 located in the fifth groove 5960 and the inner side surface of the ground terminal 5141 can face to each other. An adhesive may be applied between the outer side surface of the body 5910 located in the fifth groove 5960 and the inner side surface of the ground terminal 5141. The outer side surface of the body 5910 located in the fifth groove 5960 and the inner side surface of the ground terminal 5141 can be in contact with each other.

A first terminal 6110 of the first substrate 6100 of the substrate 6000 may be disposed in the sixth groove 5970. The sixth groove 5970 may be located adjacent to the fifth groove 5960. The sixth groove 5970 may be connected to the fifth groove 5960.

The sixth groove 5970 may be formed by recessing the outer side surface of the body 5910 (the outer side surface of the body is formed so as to enter inward). The sixth groove 5970 may be formed by recessing the outer side surface of the upper end portion U of the body 5910 and the outer side surface of the lower end portion L of the body 5910 (the outer side surface of the upper end of the body and the outer side surface of the lower end portion are formed so as to enter inward). A first terminal support 5971 may be positioned in the sixth groove 5970.

The first terminal support 5971 may be located in the sixth groove 5970. The first terminal support 5971 may be in the form of a flat plate extending downward in the sixth groove 5970. The first terminal support 5971 can support the first terminal 6110. The upper portion (at least a portion) of the outer side surface of the first terminal supporting portion 5971 can face the inner side surface of the third lateral plate 5140 of the cover 5100. An adhesive may be applied between the outer side surface of the first terminal support 5971 and the inner side surface of the first terminal 6110. The outer side surface of the first terminal support 5971 and the inner side surface of the first terminal 6110 can be in contact with each other.

A second terminal 6120 of the first substrate 6100 of the substrate 6000 may be disposed in the seventh groove 5980.

The seventh groove 5980 may be formed by recessing the outer side surface of the body 5910 (the outer side surface of the body is formed so as to enter inward). The seventh groove 5960 may be formed by recessing the outer side surface of the upper end portion U of the body 5910 and the outer side surface of the lower end portion L of the body 5910 (the outer side surface of the upper end portion of the body and the outer side surface of the lower end portion of the body are formed so as to enter inward).

The second terminal support 5981 may be located in the seventh groove 5980. The second terminal support 5981 may be in the form of a flat plate extending downward in the seventh groove 5980. And the second terminal supporting portion 5981 can support the second terminal 6120. The upper portion (at least a portion) of the outer side surface of the second terminal supporting portion 5981 can face the inner side surface of the fourth lateral plate 5150 of the cover 5100. An adhesive may be applied between the outer side surface of the second terminal support 5981 and the inner side surface of the second terminal 6120. The outer side surface of the second terminal supporting portion 5981 and the inner side surface of the second terminal 6120 can be in contact with each other.

Substrate 6000 can be placed on upper of base 5900. The substrate 6000 may be disposed under the housing 5200 and the bobbin 5500. Between the substrate 6000 and the housing 5200, a lower elastic member 5800 may be positioned. The lower end of the wire 5400 may be fixed to the substrate 6000. In this case, the lower end of the wire 5400 may be extended through the substrate 6000 to the base 5900. The substrate 6000 may be electrically connected to the wire 5400.

The second coil 6300 may be mounted on the substrate 6000. The substrate 6000 may be electrically connected to the main substrate of the camera module. The substrate 6000 can receive current from the main substrate and transfer it to the wire 5400. The substrate 6000 may receive a current from the main substrate and transmit the current to the second coil 13000. In this case, the intensity, direction, and amplitude of the current transmitted from the substrate 6000 can be controlled by the control unit of the camera module.

The substrate 6000 may include a first substrate 6100 and a second substrate 6200. The first substrate 6100 may be a flexible printed circuit board (FPCB). The first substrate 6100 may be in the form of a square plate having a hole 6101 formed at the center thereof. The light transmitted through the lens module through the hole 6101 of the first substrate 6100 can be irradiated to the image sensor. The first substrate 6100 may be disposed under the second substrate 6200. The first substrate 6100 may be electrically connected to the second substrate 6200. The first substrate 6100 may include a first terminal 6110 and a second terminal 6120. The first terminal 6110 and the second terminal 6120 may be electrically connected to the main substrate of the camera module. The first substrate 6100 may be disposed on the base 5900. The first substrate 6100 may be disposed on the upper surface of the body 5910 of the base 5900. The first substrate 6100 may be disposed on the upper surface of the upper end portion U of the body 5910 of the base 5900. The second substrate 6200 may be a printed circuit board (PCB). The second substrate 6200 may be disposed under the housing 5200. And the second substrate 6200 may be disposed under the lower elastic member 5800. The second coil 6300 may be mounted on the second substrate 6200.

Meanwhile, in the lens driving device 5010 of the fourth embodiment, the first terminal 6110 and the second terminal 6120 can be arranged in various ways at design request. Either the first terminal 6110 or the second terminal 6120 may be omitted and both the first terminal 6110 and the second terminal 6120 may be connected to the body 5910 of the base 5900 The sixth groove (5970, one side outer side surface), or the seventh groove (5980, the other side outer side surface). In this case, the first terminal 6110 and the second terminal 6120 may be disposed adjacent to each other.

The second coil 6300 may be a pattern coil mounted on the second substrate 6200. The second coil 6300 can face the magnet 5300. The second coil 6300 may electromagnetically interact with the magnet 5300 when a current is applied, thereby providing a driving force to the housing 5200. The second coil 6300 may include a 2-1 coil 6310, a 2-2 coil 6320, a 2-3 coil 6330, and a 2-4 coil 6340. The 2-1 coil 6310 may face the first magnet 5310 and may electromagnetically interact with the first magnet 5310. The 2-2 coil 6320 can face the second magnet 5320 and can electromagnetically interact with the second magnet 5320. The 2-3 coil 6330 can face the third magnet 5330 and can electromagnetically interact with the third magnet 5330. The 4-4 coil 6340 may face the fourth magnet 5340 and may electromagnetically interact with the first magnet 5340.

The sensor 6400 may be a Hall sensor. The sensor 6400 can sense the magnetic force of the magnet 5300. The sensor 6400 senses the magnetic force of the magnet 5300, thereby sensing the position of the housing 5200. The position information of the housing 5200 sensed by the sensor 6400 may be transmitted to the control unit of the camera module. The control unit can drive the housing 5200 according to the position information of the housing 5200 sensed by the sensor 6400. That is, the position information of the housing 5200 is fed back by the sensor 6400 so that the optical image stabilization function can be performed.

The sensor 6400 may be mounted on the first substrate 6100. The sensor 6400 may be disposed on the lower surface of the first substrate 6100 and may be accommodated in the base 5900. In this case, the sensor 6400 can be accommodated in the sensor accommodating portion formed on the upper surface of the body 5910 of the base 5900. More specifically, the sensor 6400 may be accommodated in the sensor accommodating portion formed on the upper surface of the upper end portion U of the body 5910 of the base 5900.

The sensor 6400 may include a first sensor 6410 and a second sensor 6420. The first sensor 6410 and the second sensor 6420 can be mounted on the first substrate 6100 and can be accommodated in the base 5900.

The lens driving device 5010 of the fourth embodiment is structured such that the first to fourth protruded portions 5121, 5122, 5131, and 5132 of the cover 5100 are disposed in the first to fourth grooves 5920, 5930, 5940, and 5950 of the base 5900, so that the cover 5100 can be secured to the base 5900. As a result, the cover 5100 can be stably fixed to the base 5900 in the lens driving device 5010 of the fourth embodiment.

In the lens driving device 5010 of the fourth embodiment, the first to fourth protruded portions 5121, 5122, 5131, and 5132 of the cover 5100 and the first to fourth grooves 5920, 5930, 5940, and 5950 of the base 5900, can have various forms.

For one example, any one of the first and second protruded portions 5121 and 5122, and any one of the third and fourth protruded portions 5131 and 5132 of the cover 5100 may be omitted, and two of the first to fourth grooves 5920, 5930, 5940, and 5950 of the corresponding base 5900 may be omitted.

Also, any one of the first to fourth protruded portions 5121, 5122, 5131, and 5132 of the cover 5100 may be omitted and any one of the first to fourth grooves 5920, 5930, 5940, and 5950 may be omitted.

Further, one or more protruded portions may be located on either a third sidewall 5140 of the cover 5100 and a fourth sidewall 5150 of the cover 5100. The protruded portions may be located on one or two or more of both the third sidewall 5140 of the cover 5100 and the fourth sidewall 5150 of the cover 5100.

Furthermore, three protruded portions may be disposed on one sidewall of the cover 5100 instead of two, and a plurality thereof may be disposed on all the side walls of the cover 5100.

In other words, it has various forms within a range that can be easily derived by simple design change of an ordinary person skilled in the art.

The case where the lens driving device 5010 of the fourth embodiment can perform both the autofocus function and the optical image stabilization function has been described as in the above examples. Hereinafter, the lens driving device 5010 of the fourth embodiment in which the optical image stabilization function is omitted will be described.

In this case, the wire 5400, the substrate 6000, the second coil 6300, and the sensor 6400 for the optical image stabilization function may be omitted. In this case, the first coil 5600 and the lower elastic member 5800 can be electrically connected, and the lower elastic member 5800 can be electrically connected to the main substrate of the camera module.

To this end, the lower elastic member 5800 may include two spaced apart first lower elastic members and a second lower elastic member (positive conductive line and negative conductive line, voltage terminal and ground terminal). In this case, the first lower elastic member may include a first terminal electrically connected to the main substrate of the camera module, and the second lower elastic member may include a second terminal electrically connected to the main substrate of the camera module. The first terminal and the second terminal may be disposed together in the sixth groove 5970 or the seventh groove 5980 of the body 5910 of the base 5900 or may be disposed spaced apart from each other in the sixth groove 5970 and the seventh groove 5980, respectively. Meanwhile, one end portion of the first coil 5600 may be soldered to the first lower elastic member, and the other end portion of the first coil 5600 may be soldered to the second lower elastic member.

When a driving current is applied from the main substrate, it may be transmitted to the first coil 5600 through the lower elastic member 5800. An electromagnetic force (driving force) is generated in the first coil 5600 by the electromagnetic interaction between the first coil 5600 and the magnet 5300, and accordingly, the bobbin 5500 is moved to the one side (one direction, upper side and lower side) of the optical axis direction, or the other side (both directions, upper side and lower side) of the optical axis direction and the autofocus function can be performed thereby.

The lens driving device 5010 performing the autofocus function may omit at least one of the housing 5200, the upper elastic member 5700, and the lower elastic member 5800 according to the optical, structural, and electrical design. For example, when the housing 5200 is omitted, the magnet 5300 may be disposed at the inner side of the first lateral plate 5120, the second lateral plate 5130, the third lateral plate 5140, and the fourth lateral plate 5150 of the cover 5100 so that it may be coupled with the inner side surfaces of the first lateral plate 5120, the second lateral plate 5130, the third lateral plate 5140, and the fourth lateral plate 5150 of the cover 5100.

Further, in the lens driving device 5010 performing the autofocus function, the arrangement of the first coil 5600 and the magnet 5300 may be reversed. In one example, a first coil 5600 may be disposed in the housing 5200 or the cover 5100, and the magnet 5300 may be disposed in the bobbin 5500.

At least some of the configurations in the fourth embodiment may be replaced with the configurations of the first to third embodiments described above. In addition, the remaining configurations except for the detailed configuration of the cover 5100, the base 5900, and the like, and the combined or corresponding detailed configurations for requiring a high pulling out force for separating the cover 5100 can be replaced with the respective configurations of the first to third embodiments.

In the above, to have been described as all the components that make up the embodiments of the present invention may operate in combination, or combined into one, the present invention is not necessarily limited to all the components of the embodiments. That is, within the purpose of this invention, all of its components may operate selectively in combination with one or more. In addition, the term "include," "comprise," "have," described above means that the corresponding components can be embedded unless there is an opposite description therefore it should be interpreted that other components may further be comprised in addition to those corresponding components. All terms, including technical and scientific terms, have the same meaning as commonly understood by one of ordinary skill in the art to which this invention belongs, unless otherwise defined. Commonly used terms, such as terms defined in a dictionary, should be interpreted to be consistent with the contextual meanings of the related art, and are not to be construed as ideal or excessively formalistic, unless expressly defined to the contrary. The above description is only to those described as the technical idea of the present invention by way of example, those skilled in the art that various modifications, additions and substitutions will be possible without departing from the essential characteristics of the present invention. Accordingly, the disclosed invention embodiments is for illustrative and not intended to limit the technical idea of the present invention, not by such an embodiment is the technical scope of the present invention is not limited. The scope of protection of the invention is to be interpreted by the following claims, all spirits within a scope equivalent will be construed as included in the scope of the present invention.

The invention claimed is:

1. A lens driving device comprising:
a base;
a cover disposed on the base and comprising an upper plate and a lateral plate extending from the upper plate;
a bobbin disposed in the cover and configured to move in an optical axis direction;
a coil disposed on the bobbin; and
a magnet disposed in the cover and facing the coil,
wherein the bobbin comprises a first surface facing upwards, a second surface facing upwards and disposed lower than the first surface, first and second protrusions protruding from the first surface and spaced apart from each other, and a groove recessed from the second surface,
wherein the first protrusion of the bobbin is overlapped with the upper plate of the cover in the optical axis direction, and
wherein at least a portion of the groove is disposed between the first protrusion and the second surface.

2. The lens driving device of claim 1, wherein the groove comprises a first groove comprising a third surface facing upwards and disposed lower than the second surface, and a second groove recessed from the third surface of the first groove.

3. The lens driving device of claim 2, wherein the second groove comprises a plurality of second grooves disposed on the first groove and spaced apart from each other.

4. The lens driving device of claim 2, wherein, in the optical axis direction, a depth of the first groove is smaller than a depth of the second groove.

5. The lens driving device of claim 1, comprising an upper elastic member coupled to the bobbin,
wherein the upper elastic member comprises an outer side portion, an inner side portion coupled to the bobbin, and a connecting portion connecting the outer side portion and the inner side portion, and
wherein the inner side portion of the upper elastic member is fixed to the first surface of the bobbin by an adhesive.

6. The lens driving device of claim 5, wherein the groove is overlapped with the connecting portion of the upper elastic member in the optical axis direction.

7. The lens driving device of claim 5, wherein the bobbin comprises a third protrusion protruding from the first surface of the bobbin,
wherein the third protrusion is spaced apart from the first and second protrusions, and
wherein a portion of the inner side portion of the upper elastic member is disposed between the second protrusion and the third protrusion.

8. The lens driving device of claim 1, wherein the first protrusion upwardly extends from an outer edge of the first surface of the bobbin.

9. The lens driving device of claim 8, wherein the second protrusion upwardly extends from the outer edge of the first surface of the bobbin.

10. The lens driving device of claim 1, wherein at least a portion of the first groove is overlapped with the coil in the optical axis direction.

11. The lens driving device of claim 1, comprising a dust trap disposed on the groove.

12. The lens driving device of claim 1, comprising a housing disposed between the cover and the bobbin,
wherein the magnet is disposed on the housing.

13. The lens driving device of claim 1, wherein the first protrusion is contacted with an inner surface of the upper plate of the cover when the bobbin moved in the optical axis direction.

14. The lens driving device of claim 1, wherein at least a portion of the second surface of the bobbin is overlapped with the coil in the optical axis direction.

15. A camera device comprising:
a printed circuit board (PCB);
an image sensor disposed on the PCB;
the lens driving device of claim 1 disposed on the PCB; and
a lens coupled to the bobbin of the lens driving device and disposed at a position corresponding to that of the image sensor.

16. An optical device comprising:
a main body;
the camera device of claim 15 disposed on the main body; and
a display disposed on the main body and configured to output an image photographed by the camera device.

17. A lens driving device comprising:
a base;
a cover disposed on the base and comprising an upper plate and a lateral plate extending from the upper plate;
a bobbin disposed in the cover and configured to move in an optical axis direction;
a coil disposed on the bobbin; and
a magnet disposed in the cover and facing the coil,
wherein the bobbin comprises a first surface facing upwards, a second surface facing upwards and disposed lower than the first surface, first and second protrusions protruding from the first surface and spaced apart from each other, and a groove recessed from the second surface, and
wherein the groove is disposed between the first surface and the second surface when viewed from above.

18. The lens driving device of claim 17, wherein the first protrusion of the bobbin is overlapped with the upper plate of the cover in the optical axis direction, and
wherein at least a portion of the groove is disposed between the first protrusion and the second surface when viewed from above.

19. The lens driving device of claim 17, wherein the groove comprises a first groove comprising a third surface facing upwards and disposed lower than the second surface, and a second groove recessed from the third surface of the first groove.

20. The lens driving device of claim 17, comprising an upper elastic member coupled to the bobbin,
wherein the upper elastic member comprises an outer side portion, an inner side portion coupled to the bobbin, and a connecting portion connecting the outer side portion and the inner side portion, and
wherein the inner side portion of the upper elastic member is fixed to the first surface of the bobbin by an adhesive.

* * * * *